United States Patent
Isokawa et al.

(10) Patent No.: US 8,041,787 B2
(45) Date of Patent: Oct. 18, 2011

(54) APPLICATION SOFTWARE AND DATA MANAGEMENT METHOD, MANAGEMENT SYSTEM, AND THIN CLIENT TERMINAL, MANAGEMENT SERVER AND REMOTE COMPUTER USED THEREFOR

(75) Inventors: Hiromi Isokawa, Sagamihara (JP); Takashi Tsunehiro, Ebina (JP)

(73) Assignee: Hitachi, Ltd., Tokyo (JP)

( * ) Notice: Subject to any disclaimer, the term of this patent is extended or adjusted under 35 U.S.C. 154(b) by 779 days.

(21) Appl. No.: 12/010,967

(22) Filed: Jan. 31, 2008

(65) Prior Publication Data
US 2008/0183841 A1    Jul. 31, 2008

(30) Foreign Application Priority Data
Jan. 31, 2007   (JP) ................................ 2007-020456

(51) Int. Cl.
G06F 15/177     (2006.01)
G06F 15/16      (2006.01)
G06F 15/173     (2006.01)
(52) U.S. Cl. ................. 709/220; 709/201; 709/223
(58) Field of Classification Search .............. 709/223, 709/203
See application file for complete search history.

(56) References Cited

U.S. PATENT DOCUMENTS

| | | | | |
|---|---|---|---|---|
| 6,003,065 A * | 12/1999 | Yan et al. | ....................... | 709/201 |
| 6,195,432 B1 * | 2/2001 | Takahashi et al. | .............. | 380/277 |
| 6,212,564 B1 * | 4/2001 | Harter et al. | .................... | 709/228 |
| 6,233,577 B1 * | 5/2001 | Ramasubramani et al. | .......... | 1/1 |
| 6,477,543 B1 * | 11/2002 | Huang et al. | .......................... | 1/1 |
| 7,185,145 B2 | 2/2007 | Mizushima et al. | | |
| 7,188,179 B1 * | 3/2007 | Hanson et al. | ................ | 709/227 |
| 7,440,995 B2 * | 10/2008 | Morgan, III | ................... | 709/203 |
| 7,685,253 B1 * | 3/2010 | Valia | .............. | 709/217 |
| 7,735,127 B1 * | 6/2010 | Rive et al. | ........................ | 726/12 |
| 2002/0026474 A1 * | 2/2002 | Wang et al. | .................... | 709/203 |
| 2002/0065879 A1 * | 5/2002 | Ambrose et al. | ............... | 709/203 |
| 2002/0129054 A1 * | 9/2002 | Ferguson et al. | ............. | 707/503 |
| 2002/0174010 A1 * | 11/2002 | Rice, III | .......................... | 705/14 |
| 2003/0140089 A1 * | 7/2003 | Hines et al. | ................... | 709/202 |
| 2004/0024688 A1 * | 2/2004 | Bi et al. | ......................... | 705/37 |
| 2004/0064570 A1 * | 4/2004 | Tock | ............................. | 709/228 |
| 2004/0088377 A1 * | 5/2004 | Henriquez | ..................... | 709/219 |
| 2004/0162125 A1 * | 8/2004 | Tarlie | ................................. | 463/3 |
| 2005/0149847 A1 * | 7/2005 | Chandler | ...................... | 715/500 |
| 2006/0026182 A1 * | 2/2006 | Takeda et al. | .................. | 707/100 |
| 2006/0200681 A1 | 9/2006 | Kato et al. | | |
| 2006/0224897 A1 | 10/2006 | Kikuchi et al. | | |

(Continued)

FOREIGN PATENT DOCUMENTS

JP   2004145647 A * 5/2004

(Continued)

Primary Examiner — David Lazaro
Assistant Examiner — Robert Shaw
(74) Attorney, Agent, or Firm — McDermott Will & Emery LLP

(57) ABSTRACT

A thin client terminal that can perform information processing in an off-line state is provided. A thin client terminal 101a sends a request for registration of data to be used off-line and designation of application software to be used off-line to a management server 107 through a remote computer 104. The management server 107 registers the data and application software according to the request. The thin client terminal 101 requests the management server 107 to acquire the requested data and application software, receives the data and application software, and stores the received data and application software into a storage medium 110.

4 Claims, 41 Drawing Sheets

U.S. PATENT DOCUMENTS

| | | | |
|---|---|---|---|
| 2006/0230132 A1* | 10/2006 | Dogra et al. | 709/223 |
| 2007/0220120 A1 | 9/2007 | Tsunehiro et al. | |
| 2008/0086540 A1* | 4/2008 | Scott et al. | 709/217 |
| 2009/0119408 A1* | 5/2009 | Teze et al. | 709/231 |
| 2009/0299793 A1* | 12/2009 | Guzel | 705/8 |

FOREIGN PATENT DOCUMENTS

| | | |
|---|---|---|
| JP | 2005-235159 | 9/2005 |
| JP | 2005-327233 | 11/2005 |
| JP | 2006-309698 | 11/2006 |
| JP | 2006303462 A * | 11/2006 |

* cited by examiner

FIG. 6

| USER ID | APPROVER USER ID LIST | USER NAME | E-MAIL ADDRESS |
|---------|----------------------|-----------|----------------|
| 00000001 | 00000004 | TANAKA, ICHIRO | tanaka@domain.jp |
| 00000002 | 00000004,00000001 | SAITO, TARO | saito@domain.jp |
| 00000003 | 00000004 | KATO, JIRO | kato@domain.jp |
| 00000004 | 00000001 | SATO, HANAKO | sato@domain.jp |
| ⋮ | ⋮ | ⋮ | ⋮ |
| 601 | 602 | 603 | 604 |

FIG. 7

| APPLICATION SOFTWARE ID | PERMITTED OPERATION LIST | APPLICATION SOFTWARE VERSION | APPLICATION SOFTWARE NAME |
|---|---|---|---|
| 0001 | ADD, DELETE, BROWSE, PRINT | 1.1 | PRESENTATION DISPLAY |
| 0002 | ADD, EDIT, DELETE, COPY, BROWSE, PRINT, DOWNLOAD | 2.0 | NOTE PAD |
| 0003 | ADD, DELETE, BROWSE, PRINT | 1.5 | ANIMATION DISPLAY |
| .. | .. | .. | .. |

FIG. 8

| APPLICATION SOFTWARE ID | PERMITTED OPERATION LIST | APPROVAL STATUS | SENDING STATUS | LICENSE PERIOD | APPROVER USER ID |
|---|---|---|---|---|---|
| 0001 | ADD, DELETE, BROWSE, PRINT | PERMITTED | SENT | ~2006/9/1 00:00 | 00000004 |
| 0002 | ADD, EDIT, DELETE, COPY, BROWSE, PRINT, DOWNLOAD | PERMITTED | SENT | 2006/7/1 00:00~ 2006/8/1 00:00 | 00000004 |
| 0003 | ADD, DELETE, BROWSE, PRINT | UNAPPROVED | UNSENT | UNLIMITED | 00000004 |
| ... | ... | ... | ... | ... | ... |

| DATA ID | PERMITTED OPERATION LIST | APPROVAL STATUS | SENDING STATUS | LICENSE PERIOD | APPROVER USER ID | APPLICATION SOFTWARE ID | DATA NAME |
|---|---|---|---|---|---|---|---|
| 20060719131000S | DELETE, BROWSE, PRINT | REJECTED | UNSENT | 2006/6/30 00:00~2006/7/30 00:00 | 00000004 | 0001 | PROJECT PROPOSAL |
| 20060720162010C | EDIT, DELETE, BROWSE, DOWNLOAD | PERMITTED | SENT | ~2006/7/27 12:00 | 00000004 | 0002 | 7/20 MINUTES |
| 20060720183030S | DELETE, BROWSE | PERMITTED | SENT | UNLIMITED | 00000004 | 0001 | PRODUCT INTRODUCTION |
| ... | ... | ... | ... | ... | ... | ... | ... |

| USER ID | APPLICATION SOFTWARE ID | PERMITTED OPERATION LIST | LICENSE PERIOD | APPROVER USER ID LIST |
|---|---|---|---|---|
| 00000001 | 0001 | ADD, DELETE, BROWSE, PRINT | UNLIMITED | 00000004 |
| 00000002 | 0002 | ADD, EDIT, DELETE, BROWSE, DOWNLOAD | ~2006/8/1 00:00 | 00000004, 00000001 |
| 00000001 | 0003 | ADD, DELETE, BROWSE | UNLIMITED | 00000004 |
| ... | ... | ... | ... | ... |

| USER ID | DATA ID | PERMITTED OPERATION LIST | LICENSE PERIOD | APPROVER USER ID LIST | APPLICATION SOFTWARE ID | DATA NAME |
|---|---|---|---|---|---|---|
| 00000001 | 20060619131000 | DELETE, BROWSE, PRINT | 2006/7/30 00:00~ 2006/7/30 00:00 | 00000004 | 0001 | PROJECT PROPOSAL |
| 00000002 | 20060620162010 | DELETE, BROWSE, PRINT | ~2006/8/1 12:00 | 00000004, 00000001 | 0003 | PRODUCT STUDY ANIMATION |
| 00000001 | 20060620183030 | DELETE, BROWSE | NONE | 00000004 | 0001 | PRODUCT INTRODUCTION |
| ... | ... | ... | ... | ... | ... | ... |

APPLICATION SOFTWARE AND DATA MANAGEMENT METHOD, MANAGEMENT SYSTEM, AND THIN CLIENT TERMINAL, MANAGEMENT SERVER AND REMOTE COMPUTER USED THEREFOR

INCORPORATION BY REFERENCE

This application claims a priority based on a Japanese Patent Application No. 2007-020456 filed on Jan. 31, 2007, the entire content of which is incorporated herein by reference.

BACKGROUND OF THE INVENTION

The present invention relates to a thin client system, and particularly to a technique of managing application programs (hereinafter, referred to as application software) and data used in a thin client terminal.

A problem in information management in an organization is that information recorded in a computer or a storage medium such as a Universal Serial Bus (USB) memory leaks out when the computer or the storage medium is lost or stolen.

As a method of preventing such information leakage, there is system architecture in which the minimum necessary processing is performed on a client terminal used by a user and most kinds of processing are concentratedly performed on a server. In this architecture, information and programs for dealing with the information are placed in a computer (a conventional personal computer (PC), a conventional server, a blade PC, a virtual PC in a server, or the like) within an organization such as a business enterprise, and the minimum necessary information and programs dealing with the minimum necessary information are installed on a thin client terminal. When the user uses the thin client terminal, the thin client terminal is subject to restrictions such as inhibition of data writing to a main body storage medium, restriction on enabling (connecting to) or disabling (disconnecting) an external device, a peripheral device or a storage medium, inhibition of rewriting an execution program, inhibition of activating an unauthorized program, and the like. In a thin client system, such a thin client terminal is used for remote control of a computer (hereinafter, referred to as a remote computer) placed in an organization such as a business enterprise through a network, to perform information processing.

Japanese Un-examined Patent Application, Laid-Open No. 2005-235159 discloses a remote access system in which a storage device equipped with a tamper resistant device having authentication information is connected to a client terminal and the authentication information is used for remote control of a server through a network. This can reduce secret information remaining in the client terminal and improve security.

SUMMARY OF THE INVENTION

Use of a thin client system can reduce risk of information leakage. However, in a state (hereinafter, referred to as an off-line state) where a network cannot be used effectively, such as under the ground or during high-speed moving, a thin client terminal cannot remotely control a remote computer and information processing becomes difficult.

The present invention provides a technique that enables off-line use of a thin client terminal of a thin client system, in a state in which information leakage does not easily occur.

To solve the above problem, a first mode of the present invention provides a management server that uses management data to manage data and application software required for using a thin client terminal for information processing in an off-line state. The first mode uses a storage medium that stores the data and application software to be used by the thin client terminal in an off-line state and the management data for managing the data and application software. The storage medium is used in a state in which the medium is connected to the thin client terminal.

First, receiving input of an instruction from a user, the thin client terminal sends information indicating a request for registration of data to be used off-line and a request for designating application software that performs processing on the data, to the management server through the remote computer. The management server acquires the data whose registration has been requested, from the remote computer, and stores the acquired data into its own storage device, and registers information indicating the received requests into the management data of its own storage device.

Next, receiving an instruction from the user, the thin client terminal sends the management data stored in the storage medium to the management server. Further, the thin client terminal requests the management server to acquire the data and application software that have been requested in the instruction of the user.

The management server refers to the management server received from the thin client terminal. When the management server judges that data generated by the thin client terminal in an off-line state exist, the management server acquires the data from the storage medium connected to the thin client terminal, and stores the acquired data into its own storage device. Further, in reply to a request from the thin client terminal, the management server sends the data and application software that has been previously requested and their management data, from its own storage device to the thin client terminal that has made the request.

The thin client terminal stores the received data and application software as well as the management data into the connected storage medium.

At the time of off-line execution, receiving an instruction from the user, the thin client terminal reads the data and application software stored in the storage medium onto its own storage device, and allows the user to perform information processing. During the information processing, input and output to and from the storage medium and devices other than the minimum necessary devices are disabled. When the information processing is ended, the disabled input and output are enabled, and the generated data are stored into the storage medium. Further, the management data of the storage medium are updated depending on the result of the information processing.

In the first mode, it may be arranged such that approval is required for off-line execution concerning the data and application software stored in the management server, i.e. the data whose registration has been requested from the thin client terminal and the application software whose designation has been requested from the thin client terminal.

To approve off-line execution, the thin client terminal receives an instruction from a user having authority for approval, and sends information indicating a request for approval or rejection of off-line execution concerning the data and application stored in the management server, to the management server through the remote computer.

Receiving the information indicating the request, the management server updates the corresponding information in the management data of its storage device. When the off-line execution is approved, then, in response to a request from the thin client terminal, the data and application software whose use in an off-line state has been approved and their management data are sent from the storage device of the management server to the thin client terminal that has requested the approval.

As a second mode of the present invention, the processing performed by the management server in the first mode may be performed on the remote computer that is remotely controlled by the thin client terminal, realizing a configuration without the management server.

In the second mode, it may be arranged such that approval is required for off-line execution concerning the data and application stored in the remote computer, i.e. the data whose registration has been requested from the thin client terminal and the application software whose designation has been requested from the thin client terminal.

As a third mode of the present invention, a log management server may be provided in addition to the configuration of the second mode so that the log management server collects and manages logs of the thin client terminal.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 6 is an explanatory diagram showing a configuration of a user table according to the first embodiment;

FIG. 7 is an explanatory diagram showing a configuration of an application software table according to the first embodiment;

FIG. 8 is an explanatory diagram showing a configuration of a user application software table according to the first embodiment;

FIG. 9 is an explanatory diagram showing a configuration of a user data table according to the first embodiment;

FIG. 10 is an explanatory diagram showing a configuration of a pending application software table according to the first embodiment;

FIG. 11 is an explanatory diagram showing a configuration of a pending data table according to the first embodiment;

DETAILED DESCRIPTION OF THE EMBODIMENTS

Now, a first embodiment will be described referring to FIGS. 1, 5, 21 and 36-39. Here, in the first embodiment of the present invention, each means in the invention according to the scope of the claims is implemented by a hardware resource or when a program is executed in cooperation with hardware resources including a processor. For the sake of convenience of description, sometimes each means is expressed as a "unit". In that case, each means corresponds to the unit in question.

Figure 1:
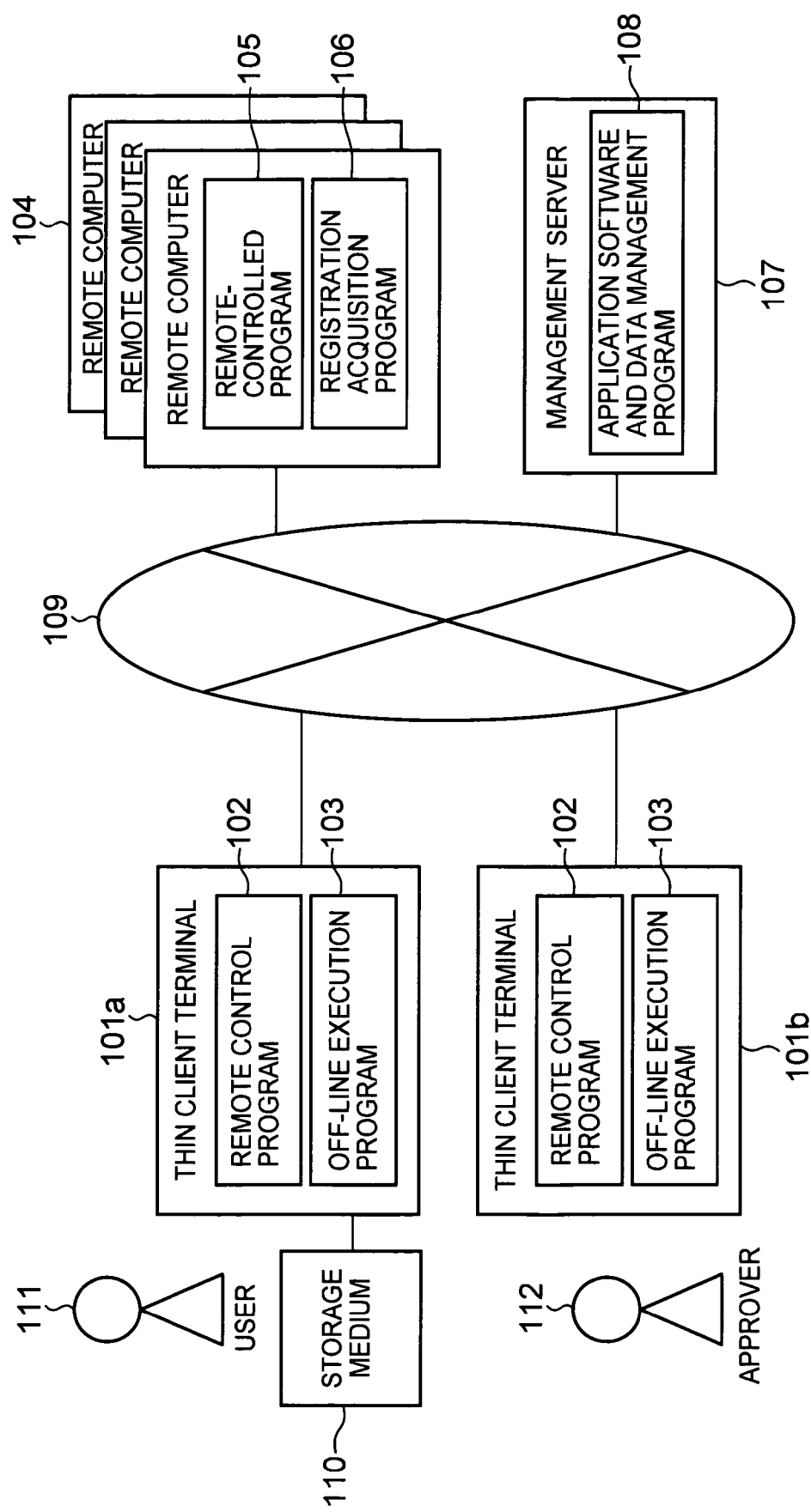
FIG. 1 is a block diagram showing a general configuration of a system according to a first embodiment.

FIG. 1 shows a system configuration of a thin client system to which an application software and data management system according to the first embodiment of the present invention is applied. The thin client system shown in FIG. 1 comprises one or more thin client terminals 101*a*, 101*b* (simply referred to as 101 when it is not necessary to differentiate one from another), one or more remote computers 104, and a management server 107. These component apparatuses are connected through a network 109. The present system further comprises a storage medium 110 that stores application software and data used for execution of the application software. This storage medium is connected to a thin client terminal 101. Although the thin client terminals 101 are differentiated as 101*a*, 101*b* as a matter of convenience, it is not required that these thin client terminals be different from one another as apparatuses.

Next, a functional configuration of a thin client terminal 101 will be described referring to FIGS. 5, 37, 38 and 39.

A thin client terminal 101 comprises a control unit 3701, a storage unit 3704, an input unit 3705, an output unit 3706, a read/write unit 3707, and a communication unit 3708. A storage medium 110 is connected to the thin client terminal 101 through the read/write unit 3707.

The control unit 3701 is implemented, for example, when an Operating System (OS) program 208 stored beforehand in a storage device 202 (see FIG. 2) is read into a memory 201 and executed by a processor 204 on the thin client terminal 101. The control unit 3701 controls the thin client terminal 101 by controlling the storage unit 3704, the input unit 3705, the output unit 3706, the read/write unit 3707 and the communication unit 3708. On the control unit 3701, a remote control unit 3702 and an off-line execution unit 3703 are realized.

The remote control unit 3702 and the off-line execution unit 3703 are implemented, for example, by storing a remote control program 102 and an off-line execution program 103 beforehand in the storage device 202 and being read into the memory 201 and executed by the processor 204 on the thin client terminal 101. These programs can be installed from the outside. For example, they can be installed through a storage medium or a network.

The storage unit 3704 is implemented, for example, by the storage device 202 for storing data and the like continuously, and by the memory 201 for storing data and the like temporarily. The input unit 3705 is implemented, for example, by I/O hardware 205 and an input device 211 such as a mouse and a keyboard. The output unit 3706 is implemented, for example, by the I/O hardware 205 and a display device 210 such as a monitor. The read/write unit 3707 is implemented, for example, by a reader/writer complying with the standard of the storage medium 110, the I/O hardware 205, and the like. The communication unit 3708 is implemented, for example, by communication hardware 206 such as a network interface.

The remote control unit 3702 is activated by operation of an operator of the thin client terminal 101, and remotely controls a remotely controlled unit 3802 on a remote computer 104. The remote control unit 3702 sends, for example, information on the operator's operation to the remotely controlled unit 3802, and makes the output unit 3706 display, for example, screen information sent from the remotely controlled unit 3802.

The off-line execution unit 3703 is activated by operation of the operator of the thin client terminal 101. When a synchronization processing instruction is received from the operator, the off-line execution unit 3703 connects and logs in to an application software and data management unit 3902 on the management server, to synchronize the information stored in the storage medium 110 with information on the management server 107. Further, when an off-line execution instruction is received from the operator through the input unit 3705, the off-line execution unit 3703 reads the data and application software stored in the storage medium 110, and makes the control unit 3701 execute the application software with respect to the data.

Figure 37:
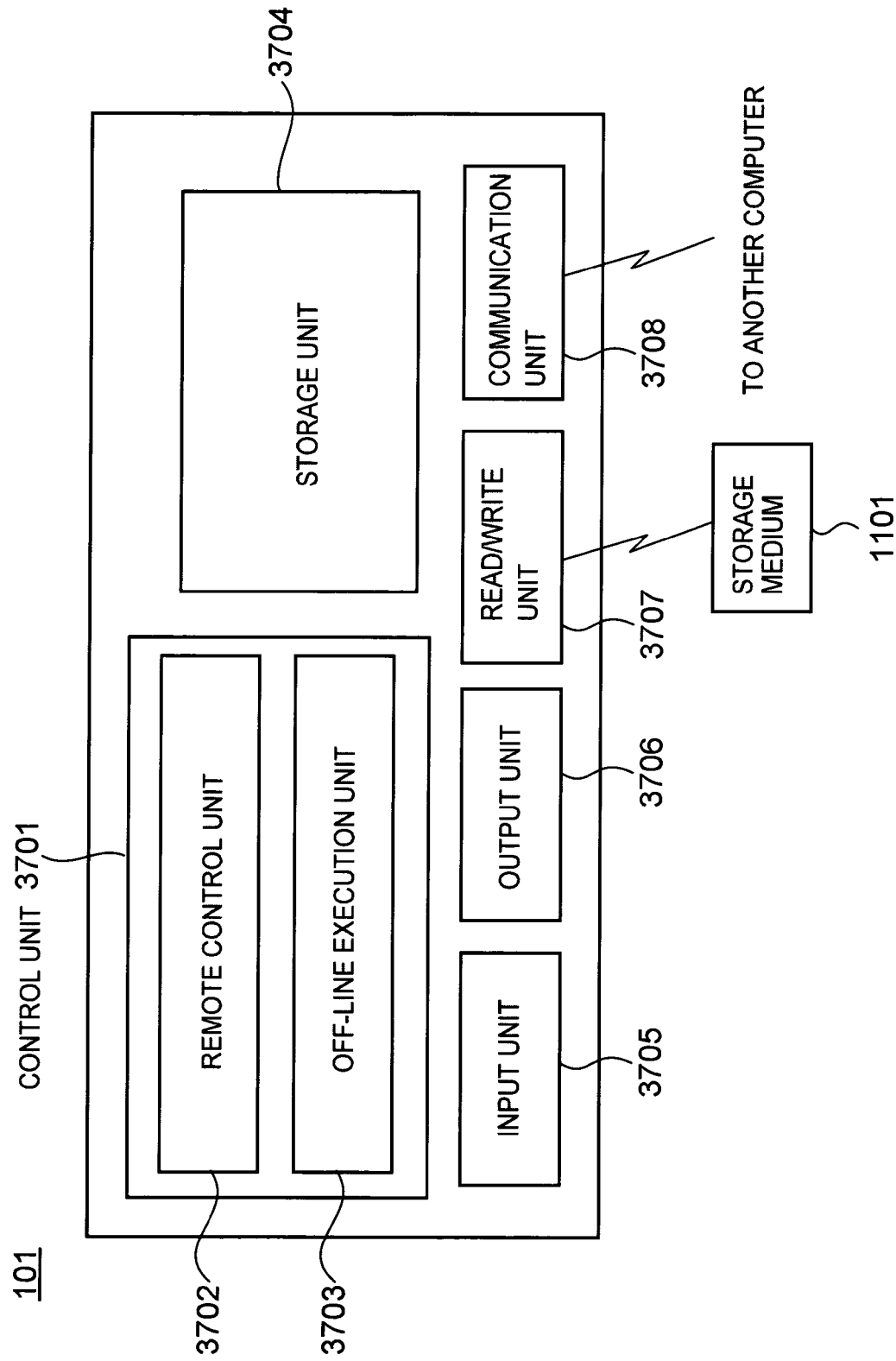
FIG. 37 is a block diagram showing a functional configuration of the thin client terminal according to the first embodiment.

Next, a remote computer 104 will be described referring to FIGS. 37, 38 and 39.

A remote computer 104 comprises a control unit 3801, a storage unit 3804 and a communication unit 3808.

The control unit 3801 is implemented, for example, when an OS program 307 stored beforehand in a storage device 302 (see FIG. 3) is read into a memory 301 and executed by a processor 304 on the remote computer 104. The control unit 3801 controls the remote computer 104 by controlling the storage unit 3804 and the communication unit 3808. On the control unit 3801, a remotely controlled unit 3802 and a registration and acquisition unit 3803 (hereinafter, referred to as a registration acquisition unit 3803) are realized.

The remotely controlled unit 3802 and the registration acquisition unit 3803 are implemented, for example, by storing a remotely controlled program 105 and a registration and acquisition program 106 (hereinafter, referred to as a registration acquisition program 106) beforehand in the storage device 302 and reading into the memory 301 and executed by the processor 304 on the remote computer 104. These programs can be installed from the outside. For example, they can be installed through a storage medium or a network.

The storage unit 3804 is implemented, for example, by the storage device 302 for storing data and the like continuously, and by the memory 301 for storing data and the like temporarily. The communication unit 3808 is implemented, for example, by communication hardware 305 such as a network interface.

The remotely controlled unit 3802 is remotely controlled by the remote control unit 3702 on a thin client terminal 101. According to the remote control, application software on the remote computer 104 is executed in response to a request from the remote control unit 3702. Then, the remotely controlled unit 2802 sends, for example, screen information to be displayed by the executed application software, to the remote control unit 3702.

The registration acquisition unit 3803 is activated in response to a request received from the remote control unit 3702 through the remotely controlled unit 3802. When activated, the registration acquisition unit 3803 sends screen information for requesting input of an ID and a password to be used for log-in to the application software and data management unit 3902 on the management server 107, to the thin client terminal 101 through the remotely controlled unit 3802. Receiving the ID and the password, the registration acquisition unit 3803 uses the ID and the password to connect and to log in to the application software and data management unit 3902 on the management server 107. As a result, the thin client terminal 101 can communicate with the application software and data management unit 3902 on the management server 107.

Next, the management server 107 will be described referring to FIGS. 37, 38 and 39.

The management server 107 comprises a control unit 3901, a storage unit 3904 and a communication unit 3908.

The control unit 3901 is implemented, for example, when an OS program 406 stored beforehand in a storage device 402 (see FIG. 4) is read into a memory 401 and executed by a processor 404 on the management server 107. The control unit 3901 controls the management server 107 by controlling the storage unit 3904 and the communication unit 3908. On the control unit 3901, the application software and data management unit 3902 is realized.

The application software and data management unit 3902 is implemented, for example, by storing an application software and data management program 108 beforehand in the storage device 402 and being read into the memory 401 and executed by the processor 404 on the management server 107. This program can be installed from the outside. For example, it can be installed through a storage medium or a network.

The storage unit 3904 is implemented, for example, by the storage device 402 for storing data and the like continuously, and by the memory 401 for storing data and the like temporarily. The communication unit 3908 is implemented, for example, by communication hardware 405 such as a network interface.

The storage unit 3904 comprises a management data area 3940, an application program area 408, a user data area 409, and a log data area 410. The management data area 3940 stores information for managing application software and data, which is required for using a thin client terminal 101 for information processing in an off-line state. The information in question is: information that specifies application software and data used in off-line execution; statuses that indicate their approval statuses and sending statuses; and use conditions that indicate their permitted operations and license periods. The application program area 408 stores the application software used in off-line execution. The user data area 409 stores the data used in off-line execution. The log data area 410 stores a log and the like of a thin client terminal 101.

As described above, to the application software and data management unit 3902, the remote control unit 3702 on a thin client terminal 101 connects and logs in through a remote computer 104. Then, according to an instruction of a user of the thin client terminal 101 in question, the application software and data management unit 3902 receives a request for registration of data and designation of application software to be used in an off-line state, and registers the information indicated by the request. Further, to the application software and data management unit 3902, the off-line execution unit 3703 of a thin client terminal 101 connects and logs in at the time of performing the above-mentioned synchronization processing, and the application software and data management unit 3902 performs the synchronization processing.

Next, a storage medium 110 will be described, referring to FIG. 5.

A storage medium 110 has a management data area 4040, an application program area 408, a user data area 409, a log data area 410, and an execution time recording area 501. The management data area 4040 stores information used for managing application software and data required for off-line execution. The information has been acquired from the management server 107 as a result of the synchronization processing. The application program area 408 stores the application software to be used in off-line execution. The application software has been acquired from the management server 107 as a result of the synchronization processing. The user data area 409 stores the data used in off-line execution. The data have been acquired from the management server 107 as a result of the synchronization processing, or have been generated by off-line execution. The log data area 410 stores a log and the like of the thin client terminal 101. The execution time recording area 501 stores, for example, an execution time at which off-line execution was executed.

Figure 21:
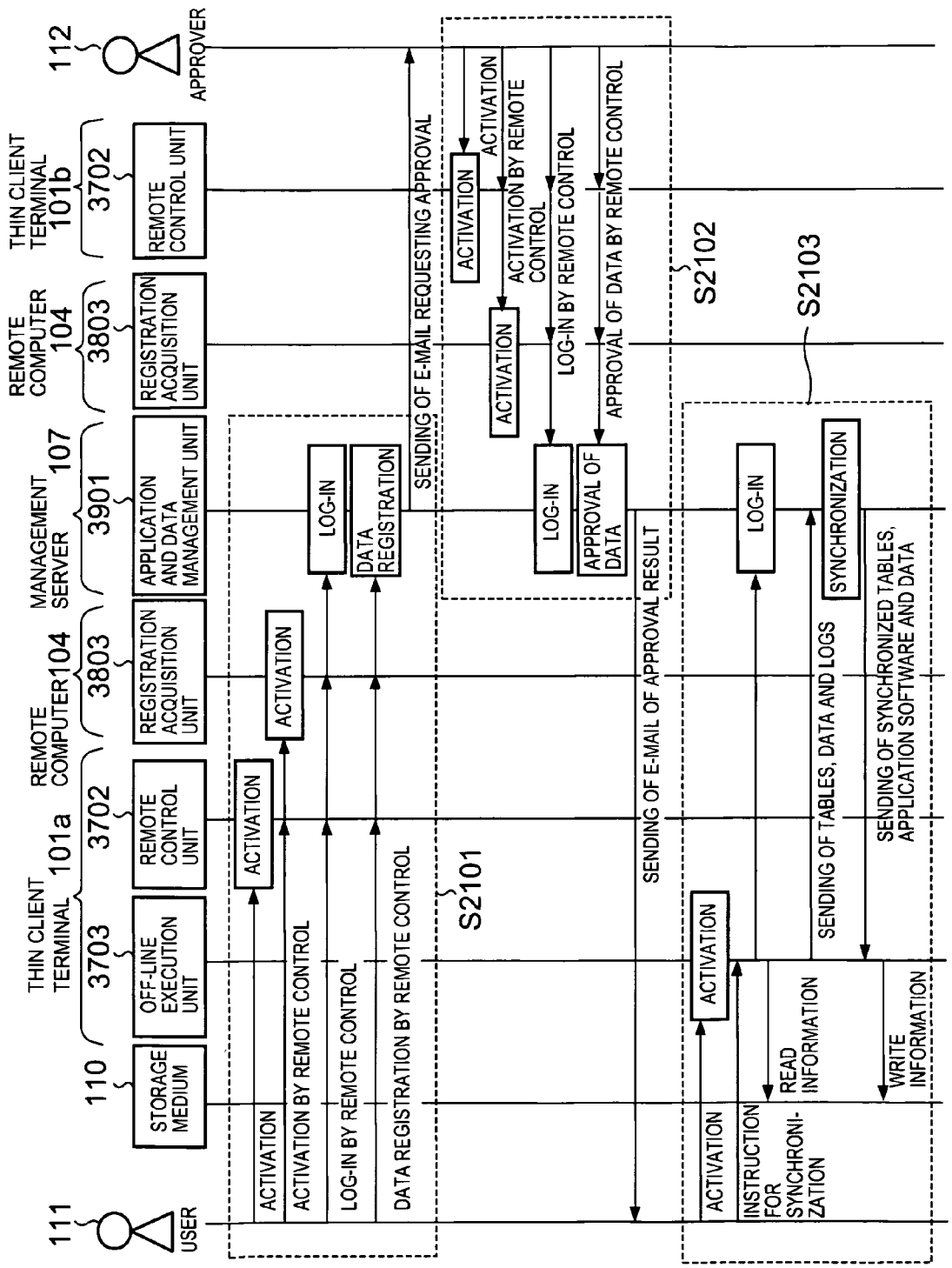
FIG. 21 is an explanatory chart showing processing between apparatuses in the flowcharts of FIGS. 12, 15 and 18, according to the first embodiment.
Figure 36:
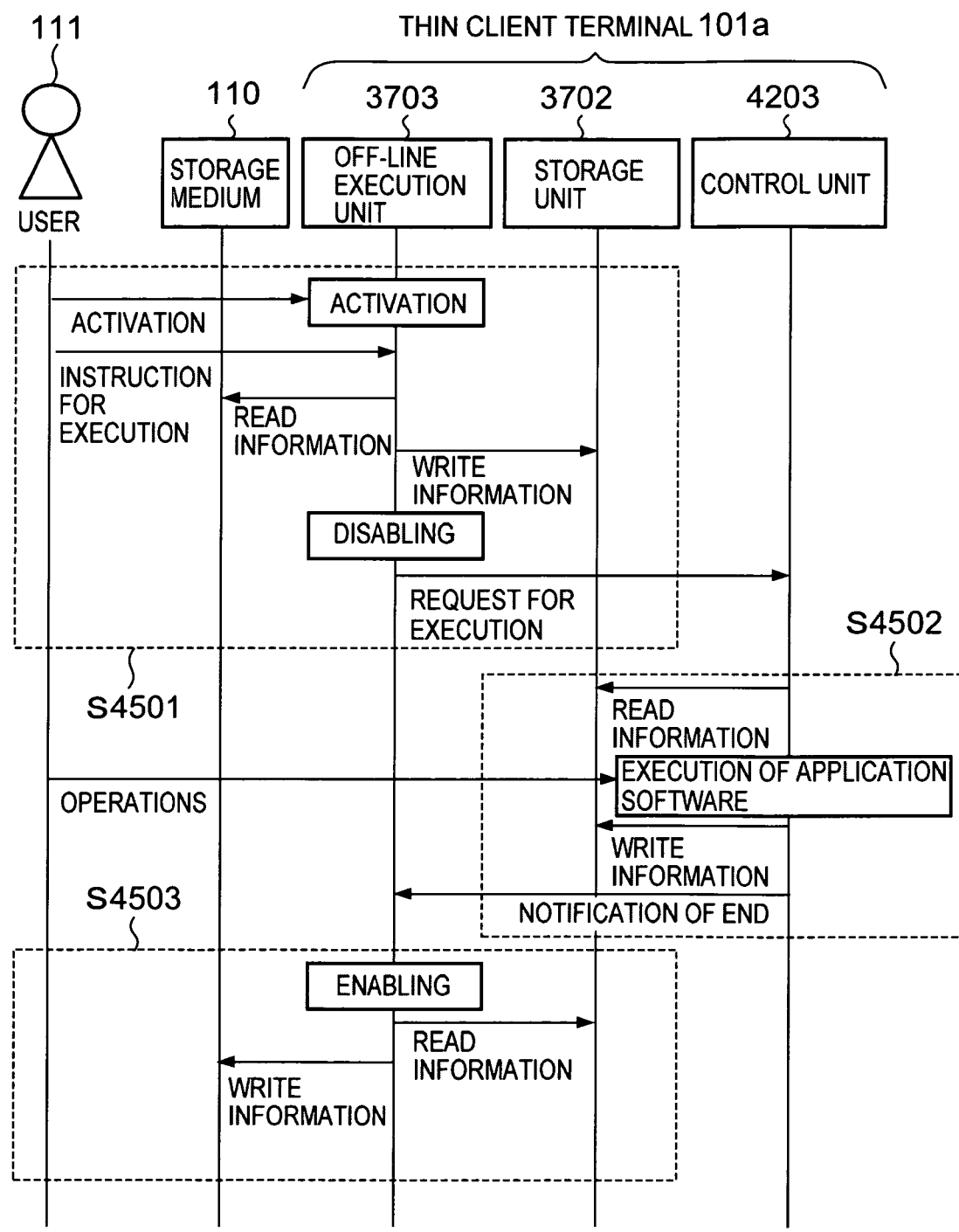
FIG. 36 is an explanatory chart showing flow of processing for the client terminal to use application software and data stored in the storage medium by the user.

Next, operation of the thin client system to which the application software and data management system of the first embodiment is applied will be described referring to FIGS. 5, 21 and 36-39. FIGS. 21 and 36 are charts showing flow of processing between apparatuses and their functions.

Processing up to registration of data used by a user on the thin client terminal 101a in off-line state will be described referring to FIGS. 21 (S2101) and 37-39.

First, receiving an instruction from the user through the input unit 3705, the control unit 3701 on the thin client terminal 101a activates the remote control unit 3702. Then, the remote control unit 3702 connects to the remotely controlled unit 3802 of a remote computer 104 so that the remote control unit 3702 can remotely control the remote computer 104. When the registration acquisition unit 3803 on the remote computer 104 is activated by remote control, the remote control unit 3702 sends a user ID and a password (which have been inputted through the input unit 3705) to the registration acquisition unit 3803. Using the user ID and the password, the registration acquisition unit 3803 connects and logs in to the application software and data management unit 3902 on the management server 107. Thus, the remote control unit 3702 and the application software and data management unit 3902 can communicate with each other through the remote computer 104.

When the user authentication is successful, the application software and data management unit 3902 sends the thin client terminal 101a screen information for inducing registration of data to be used in an off-line state, designation of application software to be used for processing the data, and designation of use conditions of the data and the application software. The remote control unit 3702 makes the output unit 3706 display the screen information.

The remote control unit 3702 sends a request for registration of data to be used in an off-line state, a request for designation of application software to be used for processing the data, and a request for designation of use conditions of the data and the application software to the application software and data management unit 3902 on the management server 107. The requests are inputted through the input unit 3705 and hereinafter will be referred to as registration information.

The application software and data management unit 3901 acquires, from the remote computer 104, the data whose registration has been requested in the registration information, and stores the acquired data into the user data area 409 on the storage unit 3904. Further, the application software and data management unit 3901 stores information that includes the received registration information, information specifying the designated data and application software, and statuses of the designated data and application software, into the management data area 3940. These statuses are set to "unapproved" and "unsent".

Further, with respect to the registration information stored in the management data area 3940, the application software and data management unit 3901 generates approval information to be referred to by an approver in charge of approval of the registration information, and stores the approval information into the management data area 3940. Then, the application software and data management unit 3901 sends an approval request to the address of the approver who is in charge of approval of the registration information.

Thus, the thin client terminal 101*a* can register the data to be used by the user in an off-line state.

Next, will be described processing up to approver's approval of the registration information for which the approval request has been received, referring to FIG. 21 (S2102) and FIGS. 37-39.

First, receiving an instruction from the approver through the input unit 3705, the control unit 3701 on the thin client terminal 101*b* activates the remote control unit 3702. Then, the remote control unit 3702 connects to the remotely controlled unit 3802 of the remote computer 104 so that the remote control unit 3702 can remotely control the remote computer 104. When the registration acquisition unit 3803 on the remote computer is activated by remote control, the remote control unit 3702 sends a user ID and a password inputted through the input unit 3705. Then, using the user ID and password, the registration acquisition unit 3803 connects and logs in to the application software and data management unit 3902 on the management server 107. Thus, the remote control unit 3702 and the application software and data management unit 3902 can communicate with each other through the remote computer 104.

When the user authentication is successful, the application software and data management unit 3902 sends screen information for inducing approval of permission or rejection, to the thin client terminal 101*b*. Here, the screen information is constructed on the basis of the approval information that is stored in the management data area 3940 and relates to the registration information of the data and application software used in an off-line state. The remote control unit 3702 makes the output unit 3706 display the screen information.

The remote control unit 3702 sends information (which is inputted through the input unit 3705) on a request for designation of permission or rejection of the registration information to the application software and data management unit 3901.

Referring to the received information, the application software and data management unit 3901 changes the statuses of the registered data and application software in the registration information into "permitted" or "rejected". Further, the application software and data management unit 3901 deletes the approval information that is stored in the management data area 3940 and corresponds to the registration information that is to be approved. Then, the application software and data management unit 3901 sends the result of the approval to the address of the user who is the applicant for approval.

Thus, the approver on the thin client terminal 101*b* can permit or reject the user's application for approval.

Next, referring to FIGS. 5, 21 (S2103), 37 and 39, processing will be described that starts from sending of the application software and data to be used on the thin client terminal 101*a* in an off-line state, from the management server 107 to the storage medium 110, and extends to uploading of data generated in the thin client terminal 101*a* in an off-line state from the storage medium 110 to the management server 107.

First, receiving an instruction from the user through the input unit 3705, the control unit 3701 on the thin client terminal 101*a* activates the off-line execution unit 3703.

Then, in the case where registration information stored in the management data area of the storage medium 110 exists, the off-line execution unit 3703 refers to the registration information and checks the data and application software use conditions stored in the storage medium 110. According to a result of the check, the off-line execution unit 3703 restricts operations relating to the data and application software if necessary.

Then, the off-line execution unit 3703 makes the output unit 3706 display screen information for receiving an instruction to perform processing of synchronization of the information stored in the storage medium 110 with the information stored in the management server 107, or to execute off-line the data and application software stored in the storage medium.

Receiving an instruction to perform synchronization processing from the user through the input unit 3705, the off-line execution unit 3703 connects and logs in to the application software and data management unit 3902 on the management server 107, using the user ID and password inputted through the input unit 3705.

After the log-in, the off-line execution unit 3703 sends the registration information stored in the management data area 4040 of the storage medium 110 and the log stored in the log data area 410 to the application software and data management unit 3902.

Based on the received registration information, the application software and data management unit 3902 performs the synchronization processing. In the synchronization processing, data whose status is "un-uploaded" are acquired from the storage medium and stored in the user data area 409 on the management server 107. The status of the registration information corresponding to the acquired data is updated to "sent". Here, the status in question is stored in the management data area 3940 on the management server 107. Further, the application software and data management unit 3902 stores the received log into the log data area 410 on the management server 107.

The application software and data management unit 3902 refers to the registration information stored in the management data area 3940 on the management server 107, and sends the data and application software whose statuses are "unsent", i.e. the data and application software that have been registered previously, to the thin client terminal 101*a* while checking their use conditions. Further, the application software and data management unit 3902 sends the registration information, which has been subjected to the above synchronization processing, to the thin client terminal 101*a*.

The off-line execution unit 3703 stores the received data, application software and registration information into the user data area 409, the application program area 408 and the management data area 404 of the storage medium 110, respectively.

Thus, the storage medium 110 can store the data and application software that are used on the thin client terminal 101 in an off-line state. In the first embodiment (and also in the other embodiments), it is not necessary that the synchronization processing be executed according to an instruction of the operator of the thin client terminal 101. For example, the synchronization processing may be performed when the off-line execution unit 3703 is activated.

Next, processing of off-line execution on the thin client terminal 101a using the data and application software stored in the storage medium 110 will be described referring to FIGS. 5, 36 and 37. Processing extending until the off-line execution unit 3703 makes the output unit 3706 display screen information for receiving an instruction to start off-line execution is similar to the above processing, and its description will be omitted.

The off-line execution unit 3703 receives an instruction to start off-line execution of application software from the user through the input unit 3705. Receiving the instruction, the off-line execution unit 3703 refers to the registration information stored in the management data area 4040 of the storage medium 110 and checks the use conditions of the application software and data as the objects of the instruction. Further, according to a result of the check, the off-line execution unit 3703 restricts operations relating to the data and application software if necessary.

Next, the off-line execution unit 3703 disables the screen information displayed on the output unit 3706 and the communication unit 3708, and thereafter reads out the data stored in the user data area 409 of the storage medium 110 and the application software stored in the application program area 409 onto the storage unit 3704. Then, the off-line execution unit 3703 stores the log and the execution time into the log data area 410 and the execution time recording area 501 respectively, and thereafter, disables the read/write unit 3707. The off-line execution unit 3703 makes the control unit 3701 perform information processing using the application software and data of the storage unit 3704 (hereinabove, S4501 has been described).

When the execution of the application software in question comes to an end (S4502), the off-line execution program 103 enables the read/write unit 3707 and stores the data after the information processing in the user data area 409. Further, with respect to the registration information stored in the management data area 4040, the status corresponding to the data in question is changed to "un-uploaded". Then, the data of the storage unit 3704 are erased. The log and the execution time are stored in the log data area 410 and the execution time recording area 501. Further, the communication unit 3708 is enabled and the screen information displayed on the output unit 3706 is enabled (hereinabove, S4503 has been described).

Thus, receiving an instruction from the user, the thin client terminal 101a can execute the approved application software and data in an off-line state.

In the following, the first embodiment will be described in greater detail referring to FIGS. 1-22. In the first embodiment (and also in the other embodiments) of the present invention, each specific means is implemented when a program cooperates with hardware resources including the processor or, particularly, when a program is read into the memory and executed by the processor. For the sake of convenience of description, sometimes each specific implemented means is expressed as a name of a program that is used for implementing the means in question.

First, a system configuration of the first embodiment will be described referring to FIGS. 1-5. FIG. 1 shows a system configuration of a thin client system to which the application software and data management system according to the first embodiment of the present invention is applied. The thin client system shown in FIG. 1 comprises one or more thin client terminals 101, one or more remote computers 104, and a management server 107. These component apparatuses are connected through a network 109. The present system further comprises a storage medium 110 that stores application software and data used for the application software. This storage medium is connected to a thin client terminal 101. Although the thin client terminals 101 are differentiated as 101a, 101b as a matter of convenience, these thin client terminals are not different from one another as apparatuses.

Each thin client terminal 101 is an apparatus in which a remote control program 102 operates, and the remote control program 102 cooperates with a remotely controlled program operating on a remote computer 104 so that a user 111 or an approver 112 can use the thin client terminal 101 for remotely controlling the remote computer 104. Further, each thin client terminal 101 stores the remote control program 102 and an off-line execution program 103. Further, using a registration acquisition program 106 of a remote computer 104, the remote control program registers application software and data used off-line in an application software and data management program 108 of the management server 107 and stores the approved application software and data in the storage medium 110, so that information processing can be performed even in an off-line state. As the storage medium 110, a portable USB memory, a hard disk, a memory card, a CD-RW, DVD-RW/+RW/-RAM, a flexible disk, an MO, a built-in memory of a mobile telephone, a built-in hard disk of a thin client terminal, or a flash memory, for example, may be used.

Figure 2:
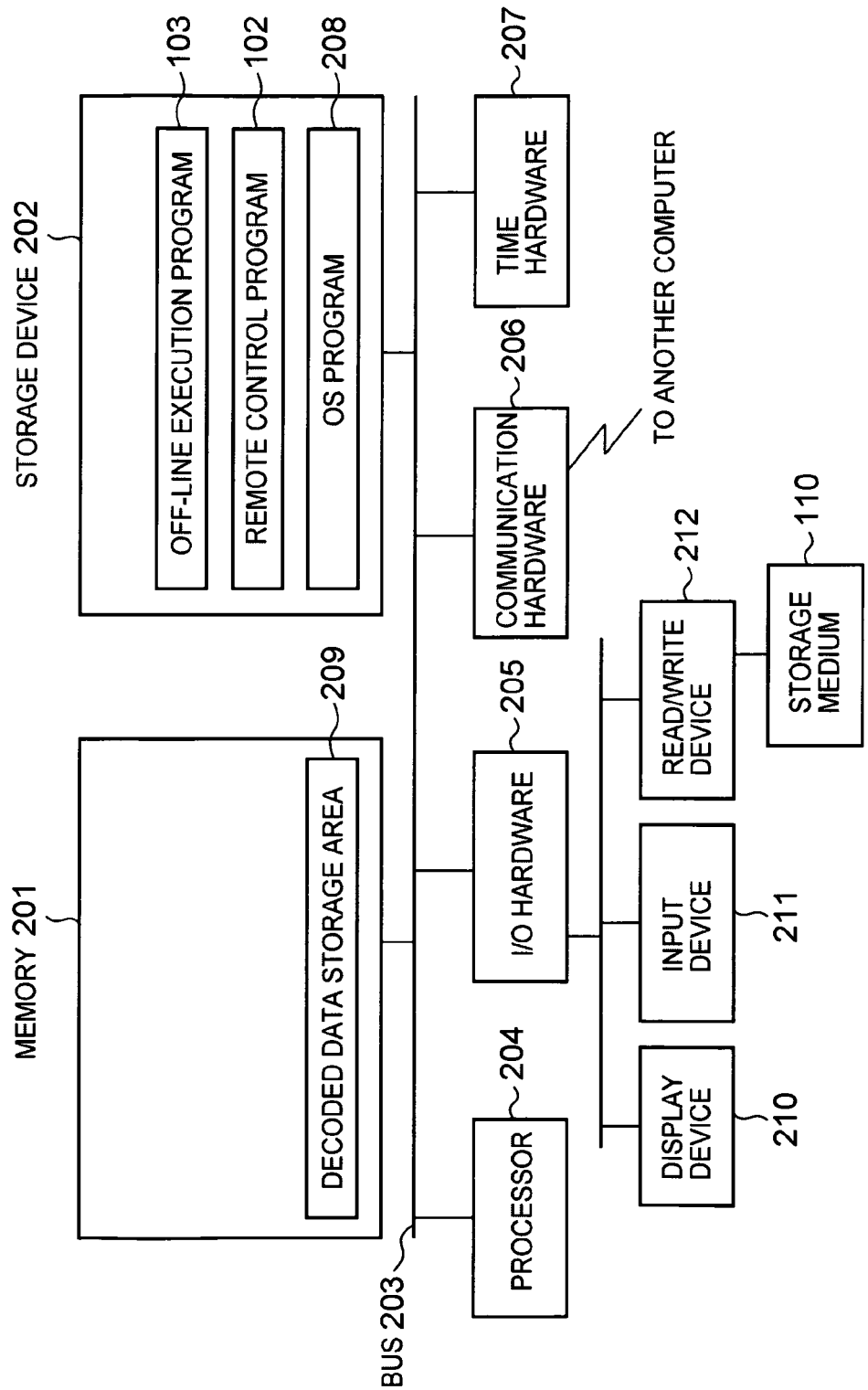
FIG. 2 is a block diagram showing an internal configuration of a thin client terminal according to the first embodiment.

Each thin client terminal has an internal configuration as shown in FIG. 2. Each thin client terminal 101 comprises a memory 201, a storage device 202, a communication line (hereinafter, referred to as a bus) 203 such as a bus, a processor 204, I/O hardware 205, communication hardware 206, time hardware 207, a display device 210, an input device 211, and a read/write device 212.

The processor 204 is a device that processes a program. The storage device 202 is an auxiliary storage device for storing programs and data. In the case of a thin client terminal, the storage device 202 may not have a rewriting function in order to improve security.

The memory 201 is a storage device for storing a program to be executed and temporary data. The I/O hardware 205 is a device that controls output to the display device 210, input from the input device 211, and input and output to and from the read/write device 212. The read/write device 212 is a device that reads and writes from and to the storage medium 110. The communication hardware 205 is a device that controls a network line to another computer. The time hardware is a device that holds the time and outputs time information in response to a request from a program.

The storage device 202 stores, as programs, an OS program 208, the remote control program 102, and the off-line execution program 103.

The OS program 208 on the storage device 202 is loaded onto an OS program area (not shown) of the memory 201 and executed. The OS program 208 performs processing such as control of the I/O hardware 205, the communication hardware 206 and the read/write device 212, and loading of data from the storage device 202. Further, the OS program 208 loads the remote control program 102 and the off-line execution program 103 from the storage device 202 onto the memory 201, and executes these programs. The off-line execution program 103 loads the application software and data from the storage medium 110 onto a decoded data storage area 209 at the time of off-line execution, and executes them.

Figure 3:
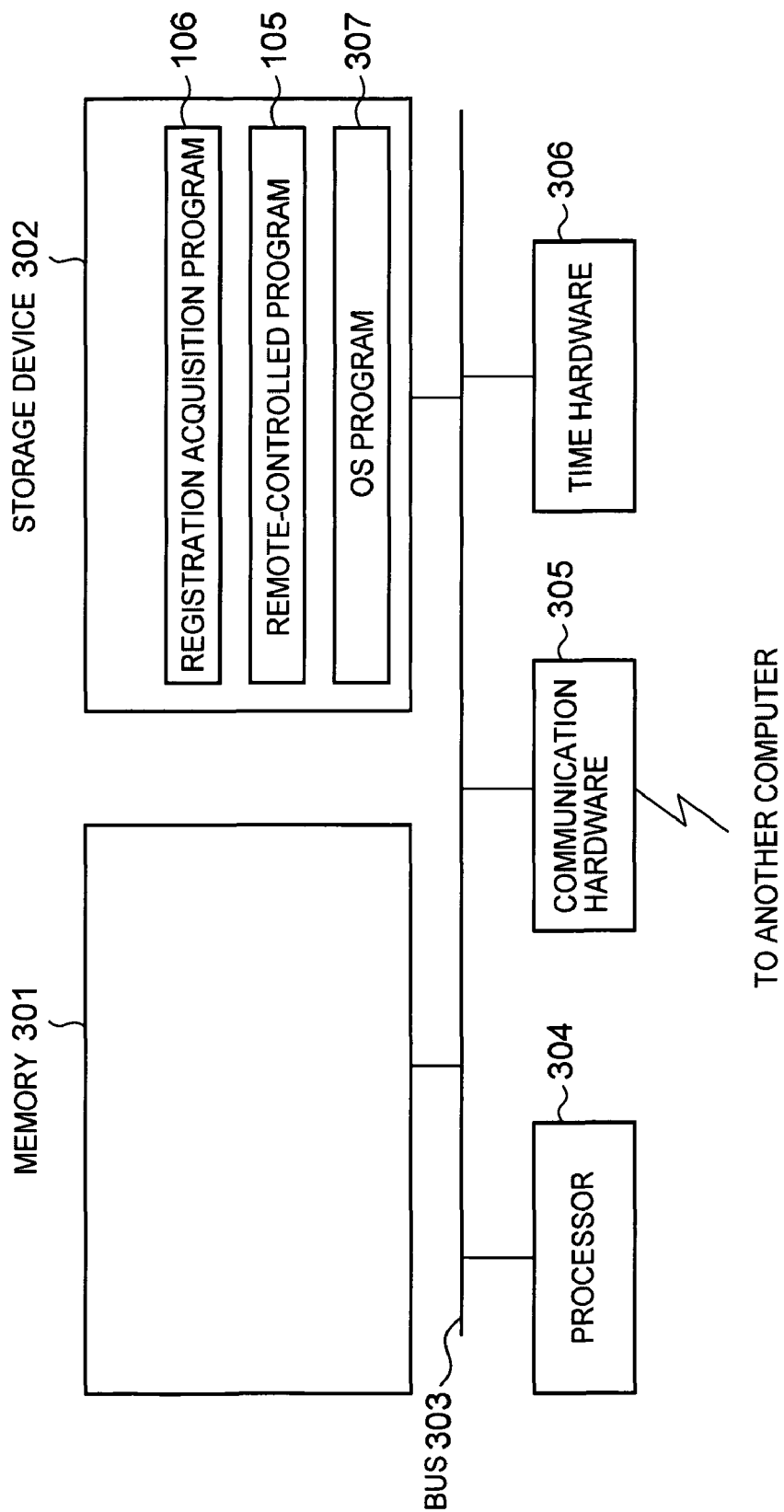
FIG. 3 is a block diagram showing an internal configuration of a remote computer according to the first embodiment.

Each remote computer 104 has an internal configuration as shown in FIG. 3. Each remote computer 104 comprises a memory 301, a storage device 302, a communication line (hereinafter, referred to as a bus) 303 such as a bus, a processor 304, communication hardware 305, and time hardware 306.

The processor 304 is a device that processes a program. The storage device 302 is an auxiliary storage device for storing programs and data.

The memory 301 is a storage device for storing a program to be executed and temporary data. The communication hardware 305 is a device that controls a network line to another computer. The time hardware is a device that holds the time and outputs time information in response to a request from a program.

The storage device 302 stores, as programs, an OS program 307, a remotely controlled program 105, and a registration acquisition program 106.

The OS program 307 on the storage device 302 is loaded onto an OS program area (not shown) of the memory 301 and executed. The OS program 307 performs processing such as control of the communication hardware 305 and loading of data from the storage device 302. Further, the OS program 307 loads the remotely controlled program 105 and the registration acquisition program 106 from the storage device 302 onto the memory 301, and executes them.

Figure 4:
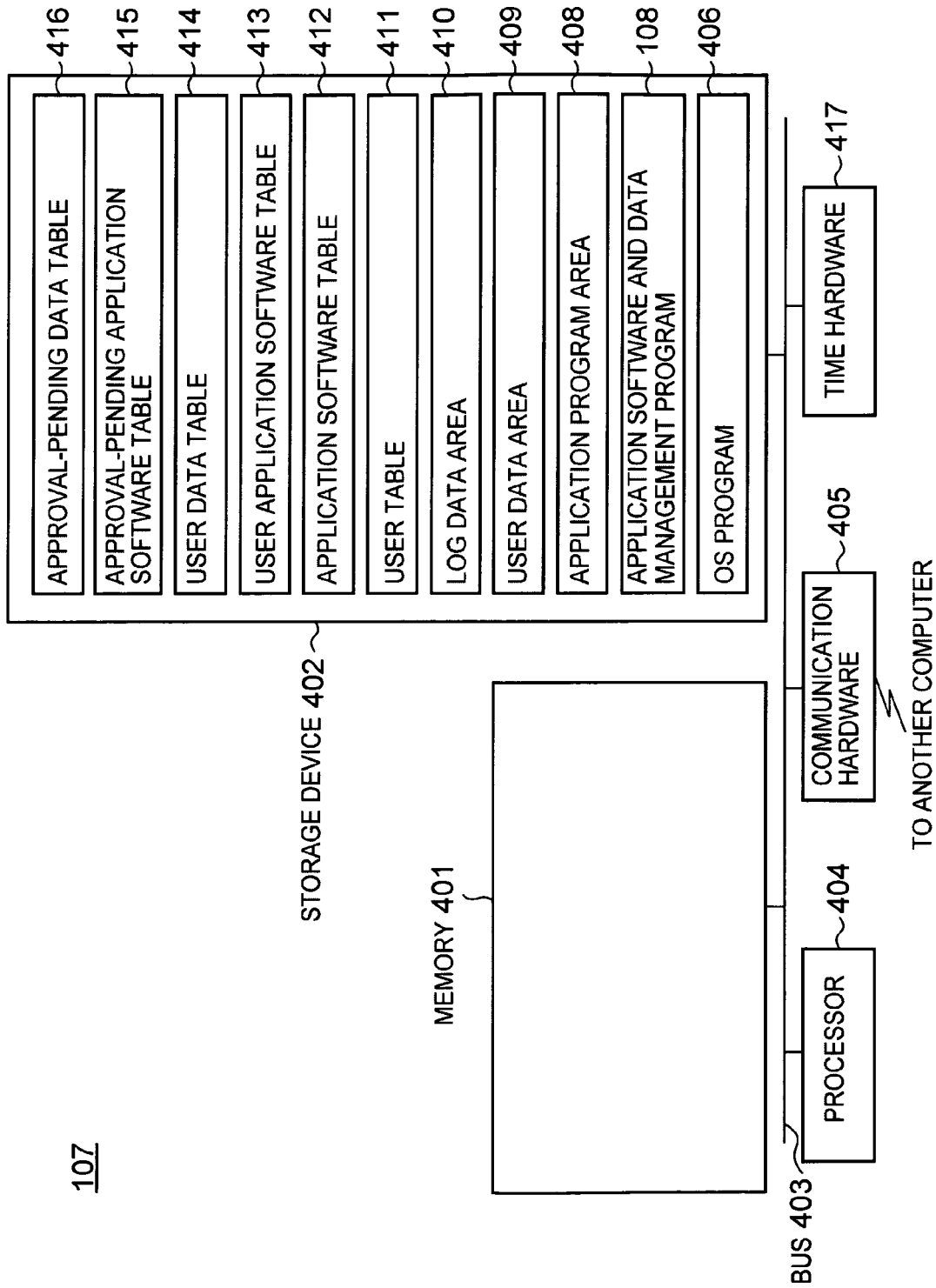
FIG. 4 is a block diagram showing an internal configuration of a management server according to the first embodiment.

The management server 107 has an internal configuration as shown in FIG. 4. FIG. 4 shows a hardware configuration of the management server 107 and programs and data inside the management server 107. The management server 107 comprises a memory 401, a storage device 402, a communication line (hereinafter, referred to as a bus) 403 such as a bus, a processor 404, communication hardware 405 and time hardware 417.

The processor 404 is a device that processes a program. The storage device 402 is an auxiliary storage device for storing programs and data.

The memory 401 is a storage device for storing a program to be executed and temporary data. The communication hardware 405 is a device that controls a network line to another computer. The time hardware 417 holds the time and outputs time information in response to a request from a program.

The storage device 402 stores programs and various kinds of data for realizing application software and data management. As programs, an OS program 406 and an application software and data management program 108 are stored. As data, application programs, user data, log data and the like are stored. As management data, a user table 411, an application software table 412, a user application software table 413, a user data table 414, an approval-pending application software table 415, an approval-pending data table 416 and the like are stored.

Further, the storage device 402 has an application program area 408, a user data area 409 and a log data area 410. The application program area 408 is an area for holding an application program that is executed off-line by a user on a thin client terminal. The user data area 409 is an area for holding data used off-line by a user. The log data area 410 is an area for holding a history of off-line execution by a user. The user table 411 is a data table for holding a list of users. The application software table 412 is a data table for holding a list of application software that is executed off-line. Further, the user application software table 413, the user data table 414, the approval-pending application software table 415 and the approval-pending data table 416 are held for each user or approver. The user application software table 413 is a storage area for holding user permission or prohibition for application software. The user data table 414 is a storage area for holding a list of user's data. The approval-pending application software table 415 is a storage area for holding a list of application software that will be used by a user and wait for approval. The approval-pending data table 416 is a data table for holding a list of data that will be used by a user and wait for approval.

The OS program 406 on the storage device 402 is loaded onto the memory 401 and executed. The OS program 406 performs processing such as control of the communication hardware 405 and load of data from the storage device 402. Further, the OS program 406 loads the application software and data management program 108 from the storage device 402 onto the memory 401, and executes the application software and data management program 406.

Figure 5:
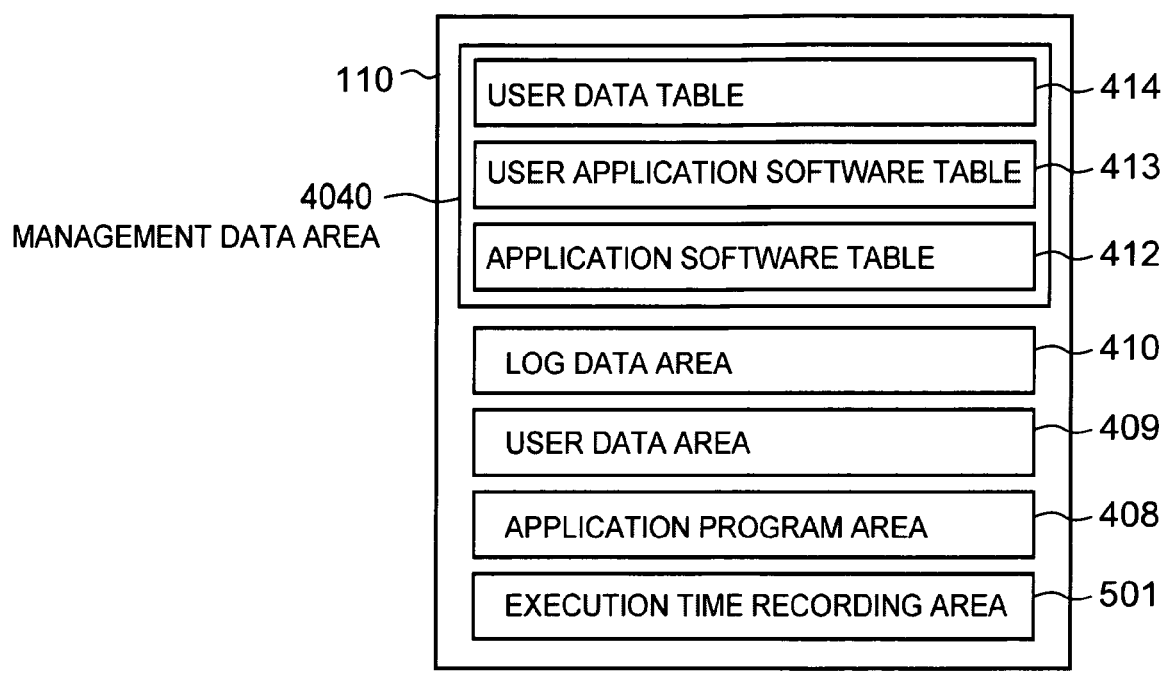
FIG. 5 is an explanatory diagram showing an internal configuration of a storage medium.

Each storage medium 110 has an internal configuration as shown in FIG. 5. Each storage medium 110 stores programs and various kinds of data that can be used on the thin client terminal concerned even in an off-line state. As programs, application programs are stored in an application program area 408. As data, an execution time, user data, log data and the like are stored. As management data, an application software table 412, a user application software table 413, a user data table 414, and the like are stored.

An execution time recording area 501 is an area for recording the latest time among times when the off-line execution program performed processing on the thin client terminal in the past. This area is used for confirming whether illegal time set-back has not occurred.

Next, data table structures in the application software and data management system according to the first embodiment will be described referring to FIG. 6-11. FIG. 6 shows the user table 411, FIG. 7 the application software table 412, FIG. 8 the user application software table 413, FIG. 9 the user data table 414, FIG. 10 the approval-pending application software table 415, and FIG. 11 the approval-pending data table 416.

As shown in FIG. 6, the user table 411 has fields of user ID 601, approver user ID list 602, user name 603 and E-mail address 604.

The user ID 601 is a field describing an identifier of a user. The approver user ID list 602 is a field describing user IDs of approvers corresponding to the user ID 601. The user name 603 is a field describing a name of the user corresponding to the user ID 601. The E-mail address 604 is a field describing an E-mail address of the user corresponding to the user ID 601. A list of users is set in this table in advance in the application software and data management system.

As shown in FIG. 7, the application software table 412 has fields of application software ID 701, permitted operation list 702, application software version 703 and application software name 704. Contents of this table are applied to all the users.

The application software ID 701 is a field describing an identifier of application software. The permitted operation list 702 is a field describing a list of operations that a user can perform in using the application software corresponding to the application software ID 701. The application software version 703 is a field describing an application program version of the application software corresponding to the application software ID 701. The application program in question is stored in the application program area 408. The application software name 704 is a field describing a name of the application software corresponding to the application software ID 701. A list of application software is set in the application software table 412 in advance, and the application programs concerned are stored in the application program area 408 in advance. Further, when an application program is upgraded, the application software table 412 and the application program stored in the application program area 408 are updated when necessary.

As shown in FIG. 8, the user application software table 413 has fields of application software ID 801, permitted operation list 802, approval status 803, sending status 804, license period 805 and approver user ID 806. Contents of this table are applied to a user whom this user application software table 413 concerns.

The application software ID 801 is a field describing an identifier of application software used by the user on the thin client terminal. The permitted operation list 802 is a field describing a list of operations that the user can perform in using the application software corresponding to the application software ID 801. The approval status 803 is a field describing status of approval for using the application software corresponding to the application software ID 801. An approval status is "unapproved", "rejected", "permitted" or "being re-approved after approval". The sending status 804 is a field describing status of sending the application software corresponding to the application software ID 801 from the management server 107 to the storage medium 110. A sending status is "unsent", "erased" or "sent". The license period 805 is a field describing a period in which the application software corresponding to the application software ID 801 can be used. The approver user ID 806 is a field describing a user ID of an approver who has performed approval processing with respect to the application software corresponding to the application software ID 801.

As shown in FIG. 9, the user data table 414 has fields of data ID 901, permitted operation list 902, approval status 903, sending status 904, license period 905, approver user ID 906, application software ID 907 and data name 908. Contents of this table are applied to a user whom this user data table 414 concerns.

The data ID 901 is a field describing an identifier of data used by the user on the thin client terminal. The permitted operation list 902 is a field describing a list of operations that the user can perform in using the data according to the data ID 901. The approval status 903 is a field describing status of approval for using the data corresponding to the data ID 901. An approval status is "unapproved", "rejected", "permitted" or "being re-approved after approval". The sending status 904 is a field describing a status of sending the data corresponding to the data ID 901 from the management server 107 to the storage medium 110 or status of upload from the storage medium 110 to the management server 107. A sending status is "unsent", "erased", "sent" or "un-uploaded". The license period 905 is a field describing a period in which the data corresponding to the data ID 901 can be used. The approver user ID 906 is a field describing a user ID of an approver who has performed approval processing with respect to the data corresponding to the data ID 901. The application software ID 907 is a field describing an application software ID of application software that is executed for using the data corresponding to the data ID 901. The data name 908 is a field describing a name of the data corresponding to the data ID 901.

As shown in FIG. 10, the approval-pending application software table 415 has fields of user ID 1101, application software ID 1102, permitted operation list 1003, license period 1004 and approver user ID list 1005. Contents of this table are applied to an approver whom this approval-pending application software table 415 concerns.

The user ID 1001 is a field describing a user ID of a user who has applied for approval. The application software ID 1002 is a field describing an application software ID of application software that is the object of the approval. The permitted operation list 1003 is a field describing a list of operations that the user corresponding to the user ID 1001 can perform in using the application software corresponding to the application software ID 1002. The license period 1004 is a field describing a period in which the user corresponding to the user ID 1001 can use the application software corresponding to the application software ID 1002. The approver user ID list 1005 is a field describing a list of approvers to whom the user corresponding to the user ID 1001 has applied for approval of the application software corresponding to the application software ID 1002.

As shown in FIG. 11, the approval-pending data table 416 has fields of user ID 1101, data ID 1102, permitted operation list 1103, license period 1104, approver user ID list 1105, application software ID 1106 and data name 1107. Contents of this table are applied to an approver whom this approval-pending data table 416 concerns.

The user ID 1101 is a field describing a user ID of a user who has applied for approval. The data ID 1102 is a field describing a data ID of data which is the object of the approval. The permitted operation list 1103 is a field describing a list of operations that the user corresponding to the user ID 1001 can perform in using the data corresponding to the data ID 1002. The license period 1104 is a field describing a period in which the user corresponding to the user ID 1101 can use the data corresponding to the data ID 1102. The approver user ID list 1105 is a field describing a list of approvers to whom the user corresponding to the user ID 1101 has applied for approval of the data corresponding to the data ID 1102. The application software ID 1106 is a field describing an application software ID of application software that is used for using the data corresponding to the user ID 1101 and the data ID 1102. The data name 1107 is a field describing a name of the data corresponding to the user ID 1101 and the data ID 1101.

Figure 12:
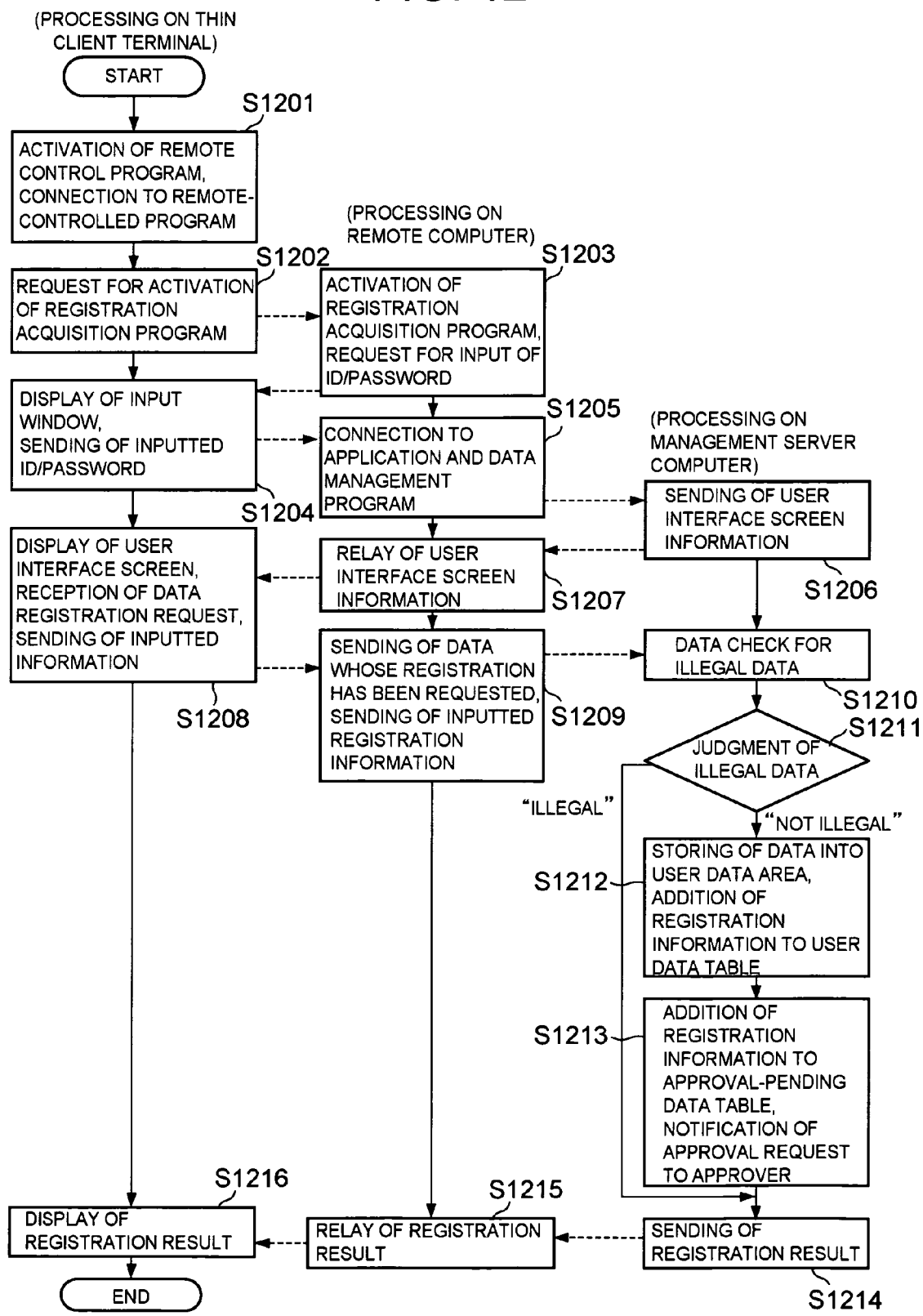
FIG. 12 is a flowchart showing flow of processing according to the first embodiment, extending until data to be used by a user on a thin client terminal in an off-line state are registered at the management server
Figure 13:
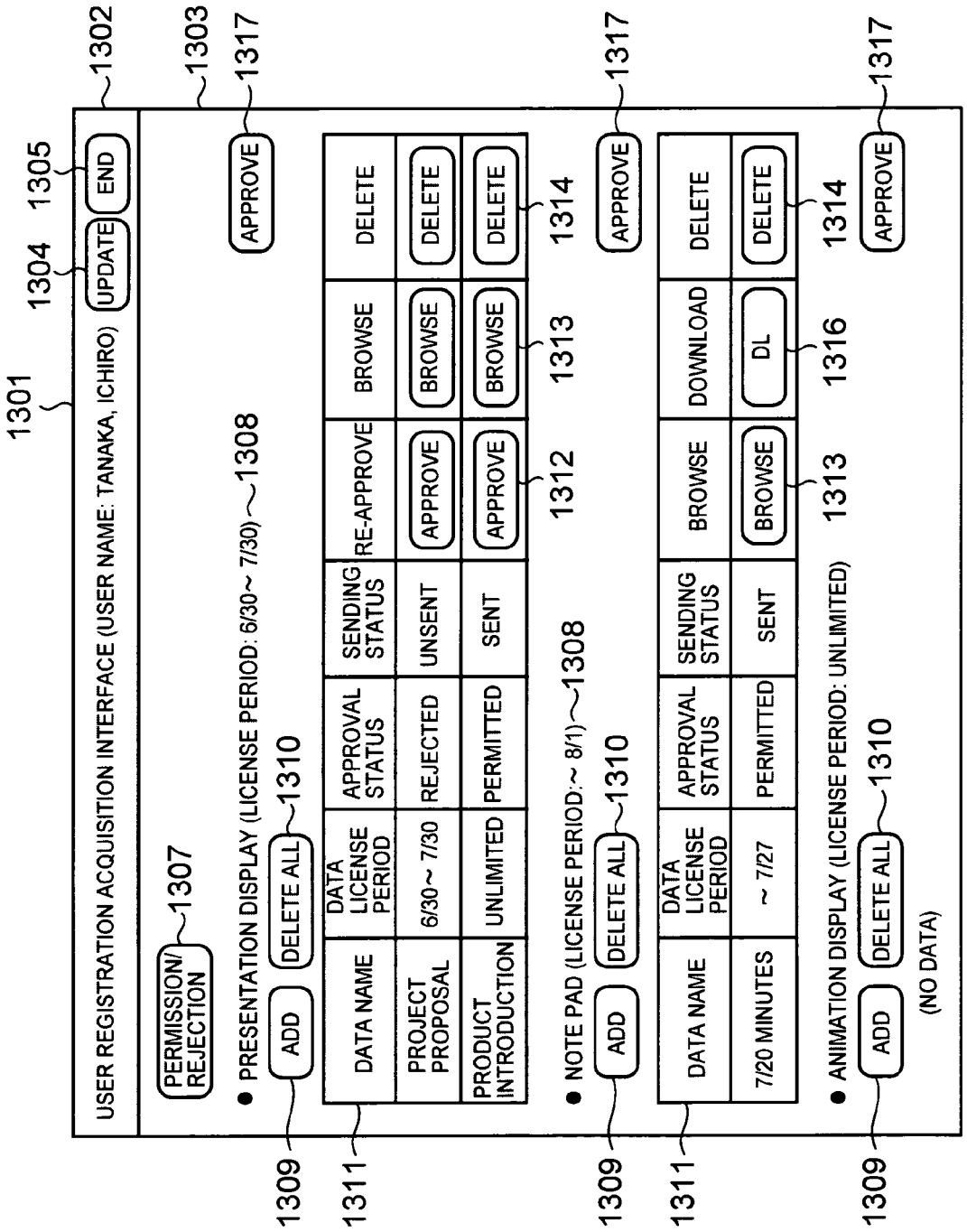
FIG. 13 is an explanatory view showing a user interface screen provided to the user in the flowchart of FIG. 12, according to the first embodiment.
Figure 14:
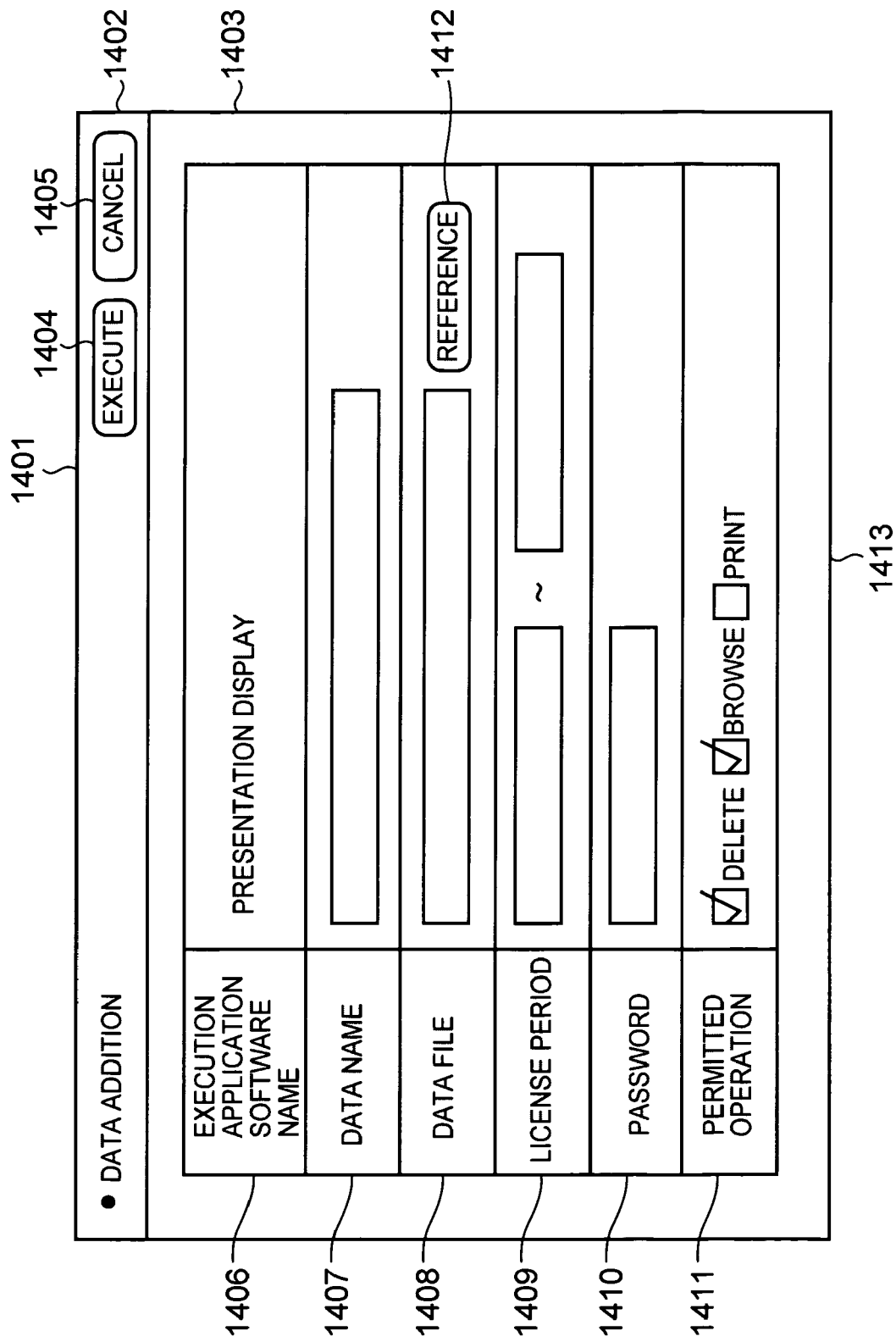
FIG. 14 is an explanatory view showing a user interface screen provided to the user in the flowchart of FIG. 12, according to the first embodiment.
Figure 15:
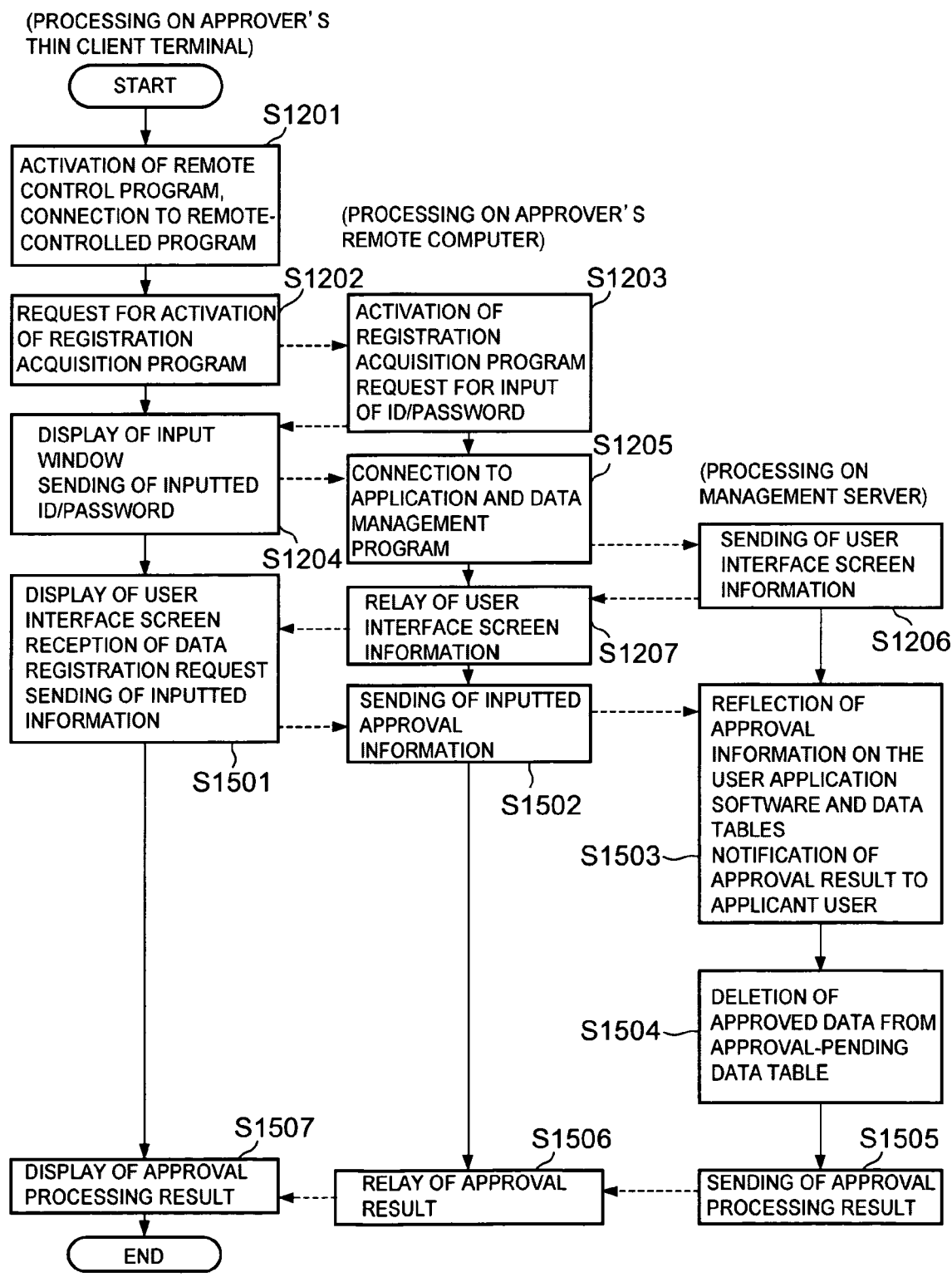
FIG. 15 is a flowchart showing flow of processing extending until an approver approves a case for which the user has requested approval, according to the first embodiment.
Figure 16:
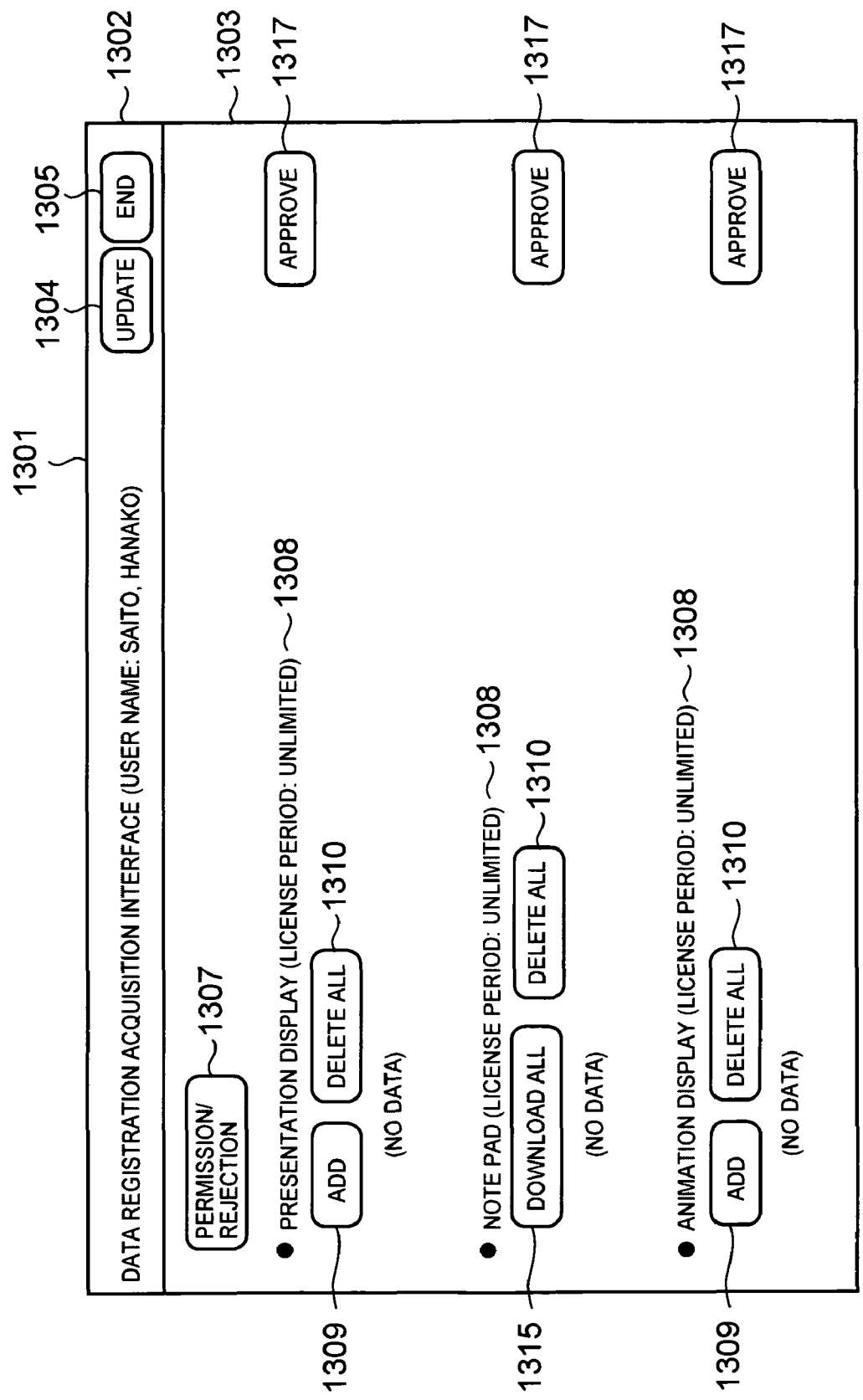
FIG. 16 is an explanatory view showing a user interface screen provided to the approver in the flowchart of FIG. 15, according to the first embodiment.
Figure 17:
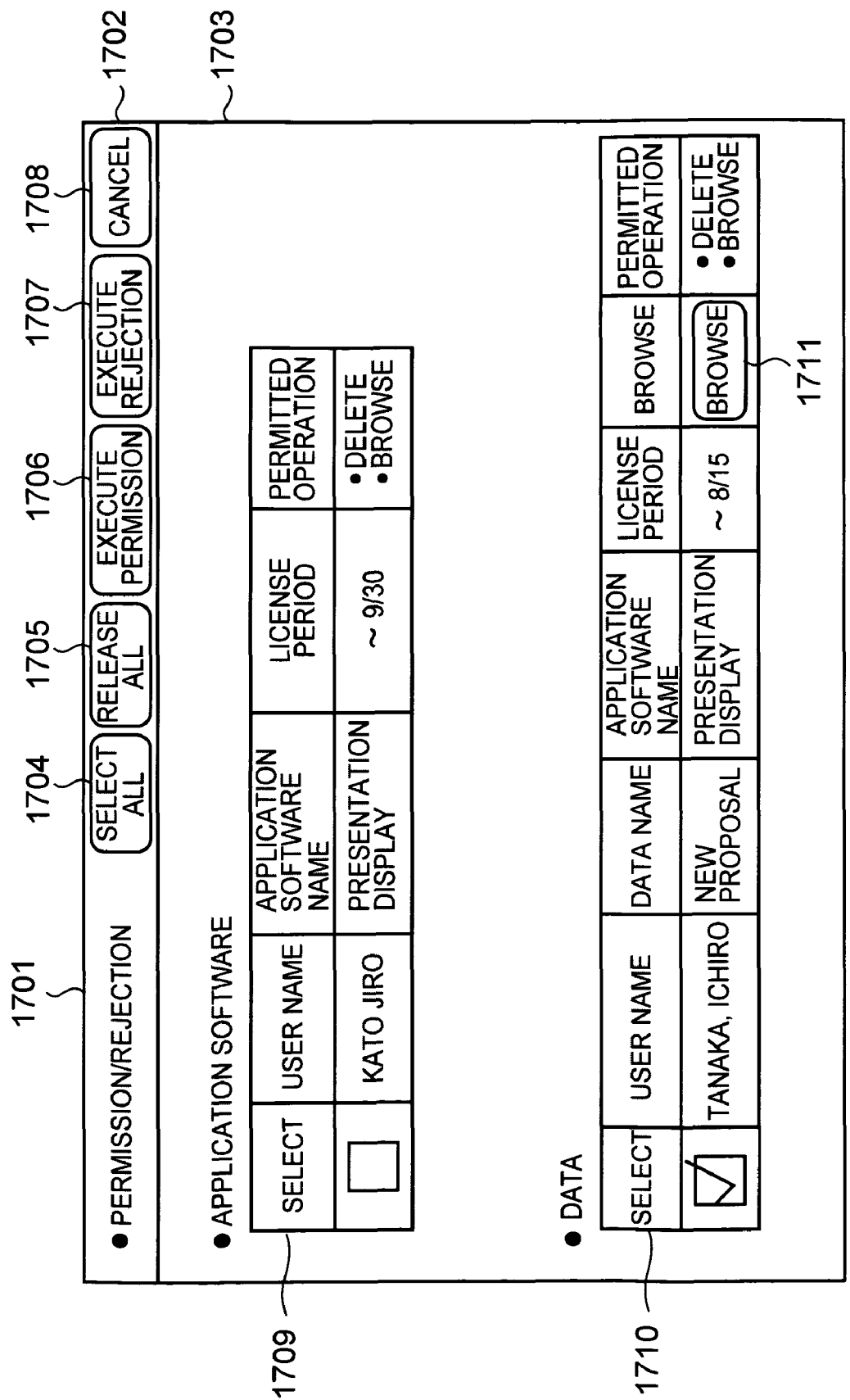
FIG. 17 is an explanatory view showing a user interface screen provided to the approver in the flowchart of FIG. 15, according to the first embodiment.
Figure 18:
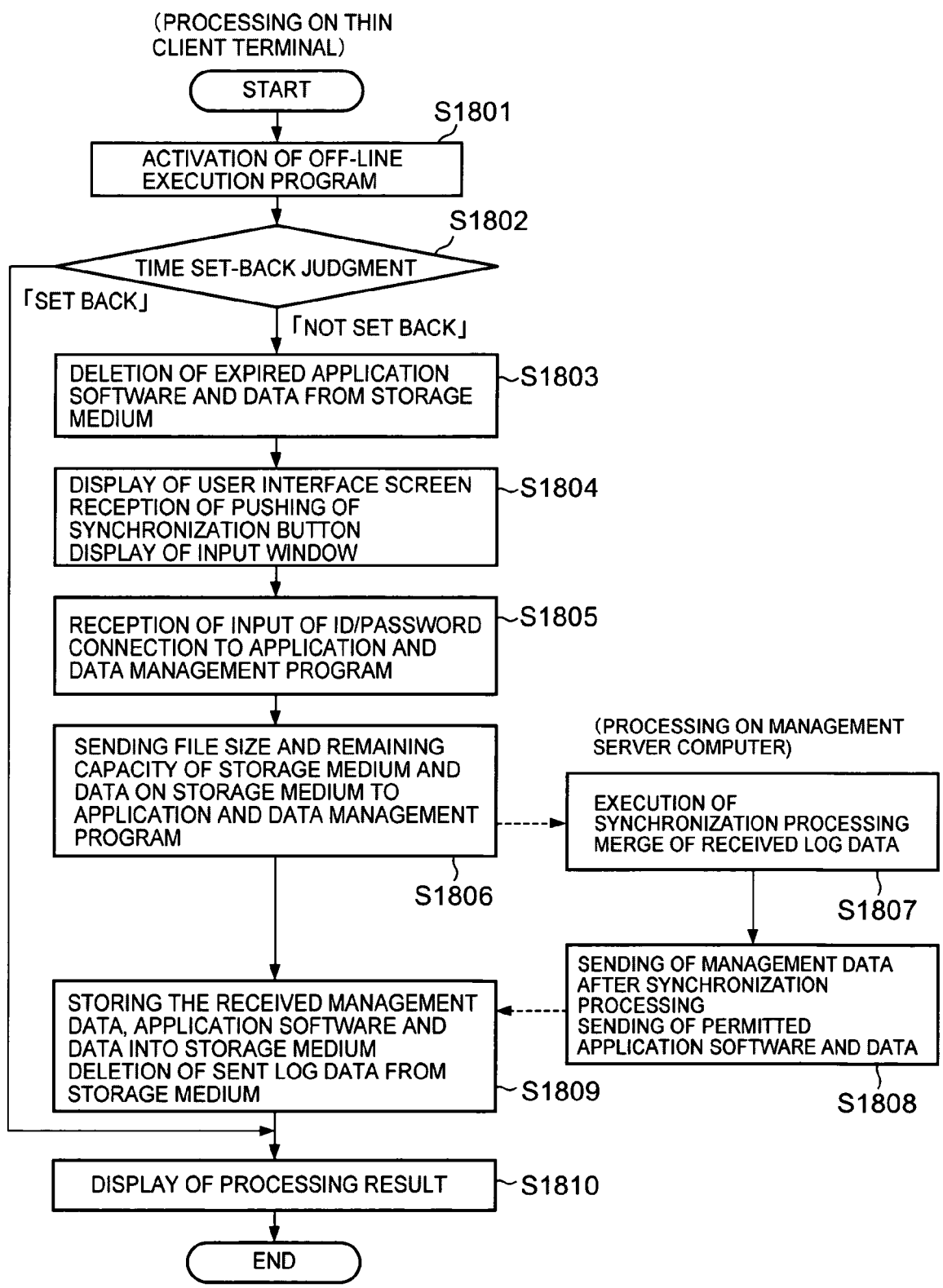
FIG. 18 is a flowchart showing flow of processing for sending application software and data used on a thin client terminal in an off-line state from the management server to the storage medium, up to upload of data generated on the thin client terminal in the off-line state from the storage medium to the management server, according to the first embodiment.
Figure 19:
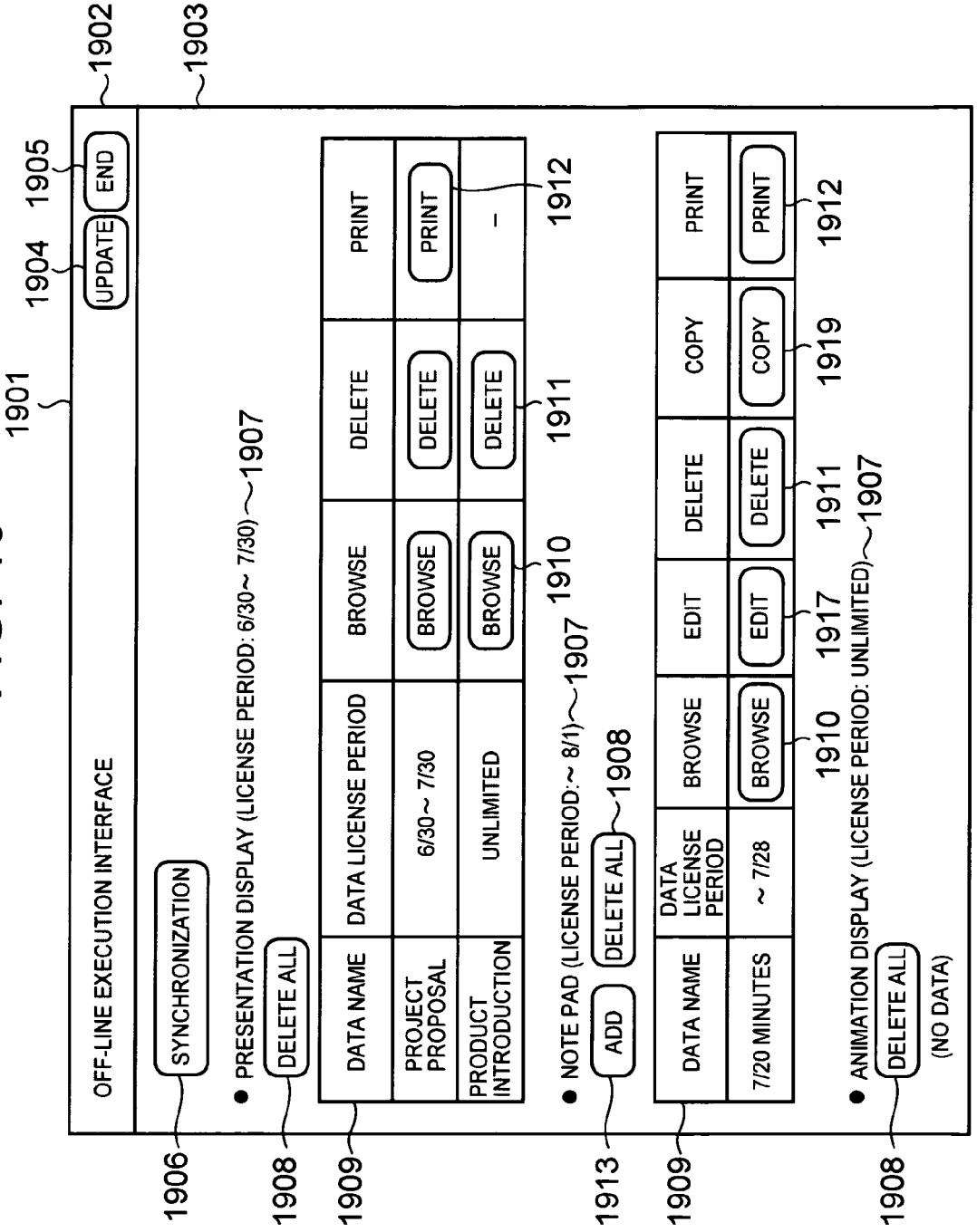
FIG. 19 is an explanatory view showing a user interface screen provided to the user in the flowchart of FIG. 18, according to the first embodiment.
Figure 20:
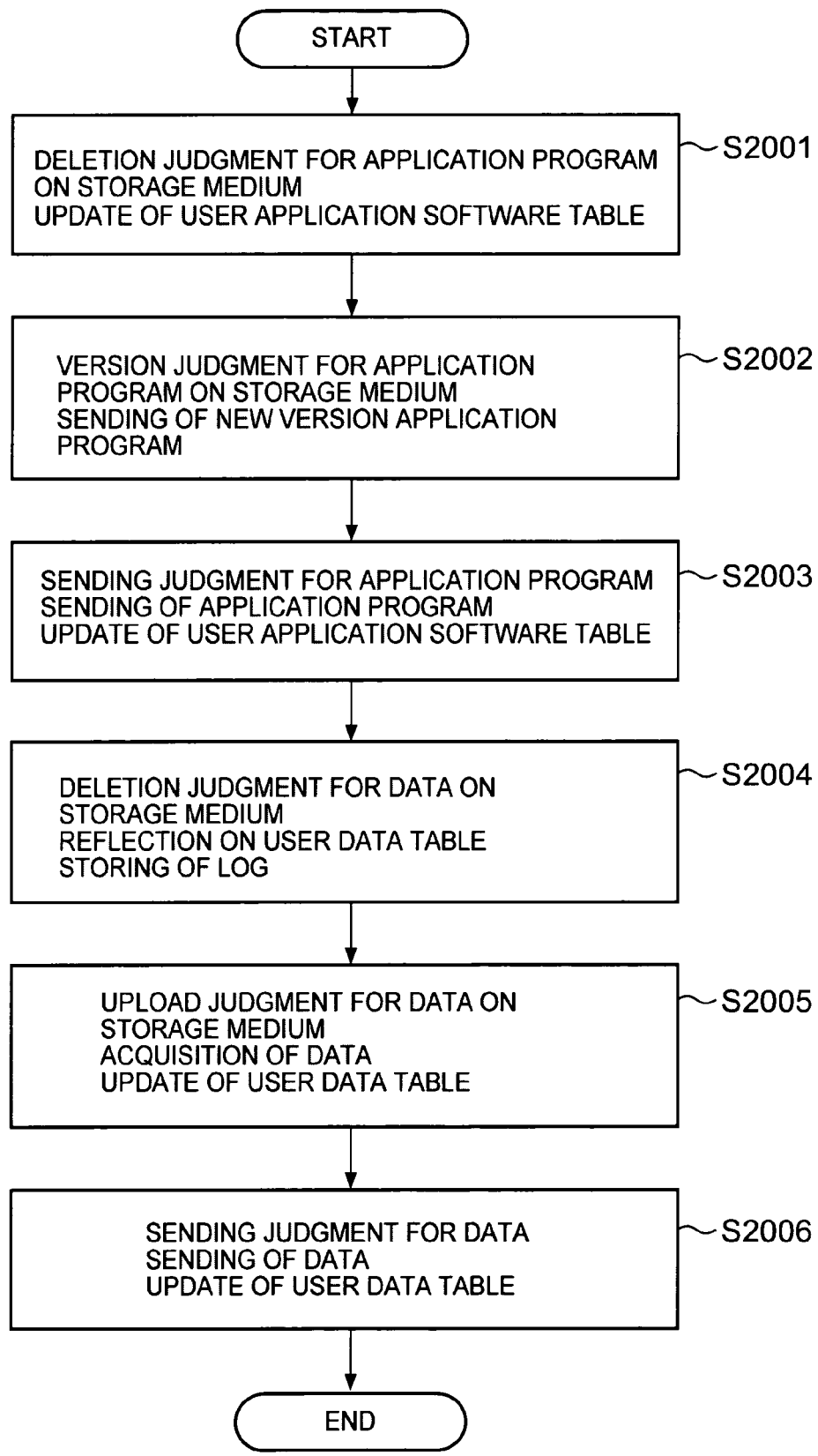
FIG. 20 is a flowchart showing flow of synchronization processing according to the first embodiment.
Figure 22:
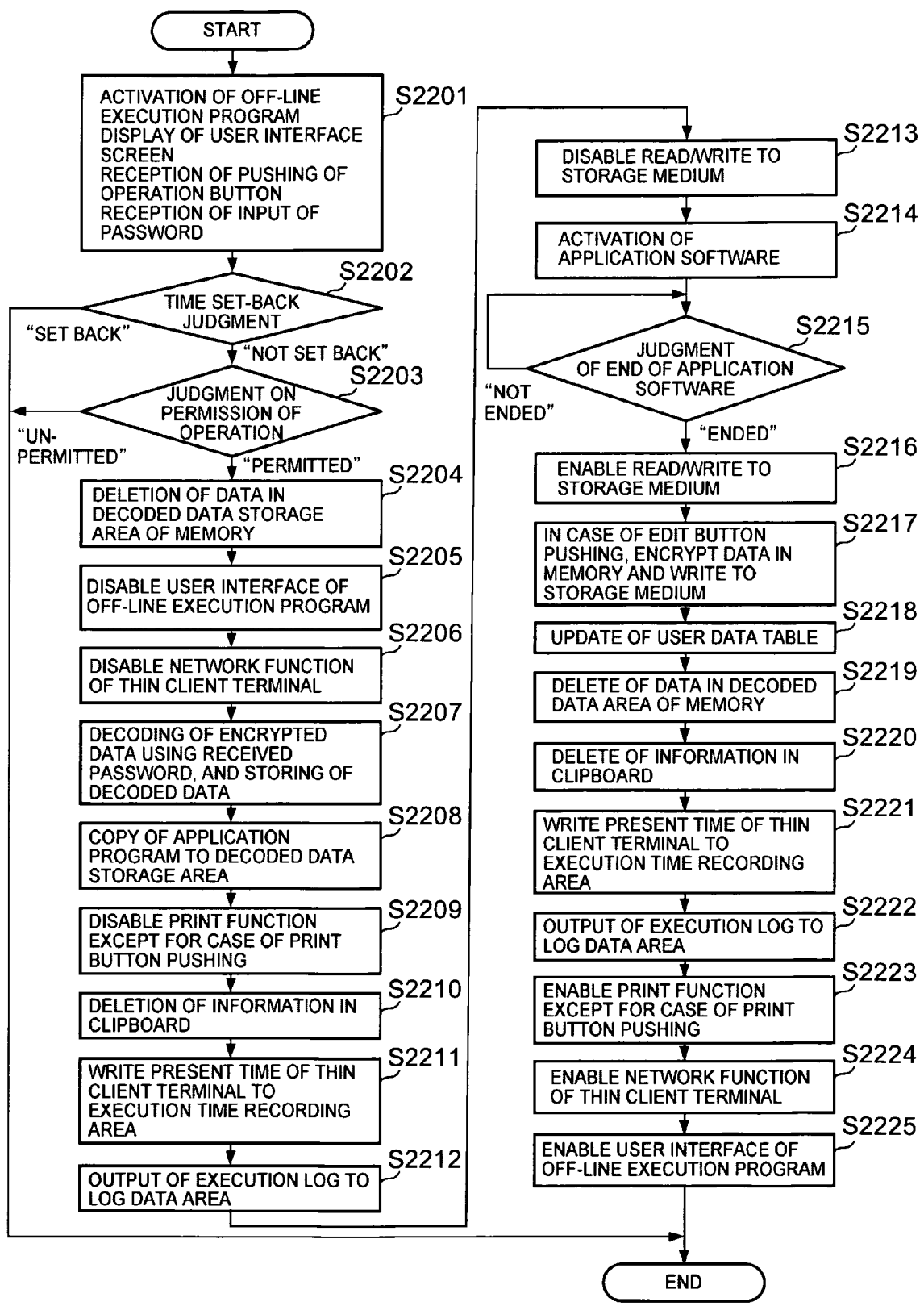
FIG. 22 is a flowchart showing flow of processing for the thin client terminal to use application software and data stored in the storage medium by the user, according to the first embodiment.

Next, processing in the application software and data management system according to the first embodiment will be described referring to FIGS. 12-22 as well as the above-mentioned FIG. 1. FIG. 12 is a flowchart showing processing extending until data to be used by a user on a thin client terminal in an off-line state are registered at the management server. FIGS. 13 and 14 are views showing user interface screens provided to the user in the flowchart of FIG. 12. FIG. 15 is a flowchart showing flow of processing extending until an approver approves a case for which the user has requested approval. FIGS. 16 and 17 are views showing user interface screens provided to the approvers in the flowchart of FIG. 15. FIG. 18 is a flowchart showing flow of processing for sending application software and data used on a thin client terminal in an off-line state from the management server 107 to the storage medium 110, up to upload of data generated on the thin client terminal in the off-line state from the storage medium 110 to the management server 107. FIG. 19 is a view showing a user interface screen provided to the user in the flowchart of FIG. 18. FIG. 20 is a flowchart showing details of synchronization processing executed in the flowchart of FIG. 18. FIG. 21 is a chart showing processing between apparatuses in the flowcharts of FIGS. 12, 15 and 18. FIG. 22 is a flowchart showing processing performed when the user uses the application software and data stored in the storage medium 110 on the thin client terminal.

Processing up to registration of data to be used in a thin client terminal in an off-line state will be described referring to FIG. 12.

First, the thin client terminal 101a makes the display device 210 display a screen for activating the remote control program, receives an instruction from the user through the input device 211, and activates the remote control program 102. Further, the thin client terminal 101a uses the remote control program 102 to connect to the remotely controlled program 105 of a remote computer 104 so that the thin client terminal 101a can remotely control the remote computer 104 (S1201).

Next, receiving an instruction from the user through the input device 211, the thin client terminal 101a uses the remote control program 102 to request the remote computer 104 to activate the registration acquisition program 106 (S1202).

Receiving the request, the remote computer 104 activates the registration acquisition program 106. Further, the registration acquisition program 106 uses the remotely controlled program 105 to request the thin client terminal 101a to input a user ID and a password to log in to the application software and data management program 108 (S1203).

Receiving the request, the thin client terminal 101a displays an appropriate window on the display device 210, to receive, through the input device 211, the user ID and password to log in to the application software and data management program 108, and sends the received user ID and password to the registration acquisition program 106 (S1204). The registration acquisition program 106 uses the received user ID and password to connect and log in to the application software and data management program 108 (S1205).

When the user authentication is successful, the application software and data management program 108 sends the remote computer 104 information to be used for displaying a user interface, i.e. a data registration acquisition interface screen 1301 shown in FIG. 13 (S1206). The remote computer 104 relays the information for displaying the data registration acquisition interface screen 1301 to the thin client terminal 101a (S1207).

The thin client terminal 101a displays the data registration acquisition interface screen 1301 on the display device 210.

This data registration acquisition interface screen 1301 has a title area 1302 and a main area 1303. The title area 1302 displays a screen title and buttons for the whole screen, i.e. an update button 1304 for updating contents of the screen and an end button 1305 for terminating the screen.

The main area 1303 displays a permission/rejection button 1307 for an approver to start approval processing, and, for each piece of application software, an application software title 1308 that displays a application software name and an application software license period, an application software approval button 1317 for applying for use of the application software, a data addition button 1309 for adding data used in the application software, an all data erase button 1310 for erasing all data registered for the application software, and a data table 1311 that displays a list of data registered for the application software.

The data table 1311 displays a data name, a data license period, an approval status, a sending status, and data operation buttons, i.e. a data approval button 1312 for applying for re-approval, a browsing button 1313 for displaying the contents of the data by using the application software, a deletion button 1314 for erasing the data, and a download button 1316 for downloading data that are generated on the thin client terminal and uploaded to the management server 107, from the management server 107 to the remote computer 104.

Contents of the main area 1303 are displayed based on the contents of the application software table 412 that affects all the users and each user's user application software table 413 and user data table 414 that affect the user concerned. Further, among the operation buttons, those relating to the permitted operations are displayed. Further, data deleted by the all data erase button 1310 or a deletion button f1314 are data whose sending status is "unsent" or "erased". In the case where the sending status of data is "sent", the data cannot be deleted from the management server 107.

Next, for registering data to be used off-line, the thin client terminal 101a receives, through the input device 211, an operation on the data addition button 1309 in the column of the application software corresponding to the data on the data registration acquisition interface screen 1301. Then, the thin client terminal 101a sends the remote computer 104 the addition instruction given by the received operation on the data addition button 1309. The remote computer 104 sends the received addition instruction to the management server 107. Then, the application software and data management program 108 sends, to the thin client terminal 101a, a user interface, i.e. a data addition interface screen 1401 shown in FIG. 14, to make the thin client terminal 10a display the screen 1401 on the display device 210.

The data addition interface screen 1401 has a title area 1402 and a main area 1403. The title area 1402 displays a screen title and buttons for the whole screen, i.e. an execution button 1404 for executing the data addition after the user's input to the main area, and a cancel button 1405 for canceling the data addition and terminating the screen.

The main area 1403 displays an input table 1413 that displays input areas and information on data to be added. In detail, the input table 1413 displays an execution application software name 1406 relating to the data to be added, a data name input area 1407 for the user to input a data name, a data file input area 1408 for designating a data file to be sent from the remote computer 104 to the management server 107 while using a reference button for displaying a list of files on the remote computer 104, a use period input area 1409 for inputting a period of using the data to be added, a password 1410 used for encrypting the data to be added, and a permitted operation input area 1411 for designating operations that can be performed with respect to the data to be added.

After that, on the data addition interface screen 1401, the thin client terminal 101a receives, through the input device 211, the user's input of information on the data to be used off-line. Further, the thin client terminal 101a receives an operation that pushes the execution button 1404 on the data addition interface screen 1401, via the input device 211. Receiving the operation, the thin client terminal 101a requests the application software and data management program 108 to add the data, through the remote computer 104 (S1208).

Receiving the information inputted in the thin client terminal 101a, the remote computer 104 sends the information in question and the data designated by the information to the application software and data management program 108 (S1209).

The application software and data management program 108 checks whether the data whose registration has been requested by the user are illegal data or not, for example by checking for viruses (S1210). When the data is judged to be illegal data, the data addition is aborted and the processing is ended (S1211).

When the data are not illegal, the data whose registration has been requested are stored in the user data area 409. As the data, the data encrypted using the password inputted by the user on the data addition interface screen 1401 are stored in addition to the unencrypted data. Further, the application software concerned is added to the user application software table 413 of the user in question and the data in question are added to the user data table 414 on the management server 107 (S1212).

In detail, a row having the fields 801-806 describing the following information is added to the user application software table 413. That is, the application software ID 801 of the row is the application software ID of the application software corresponding to the data addition button pushed by the user in the data registration acquisition interface screen 1301 for displaying the data addition interface screen 1401. The permitted operation list 802 includes the permitted operations inputted by the user in the data addition interface screen 1401. The approval status is "unapproved". The sending status 804 is "unsent". The license period 805 is the license period inputted by the user in the data addition interface screen 1401. The approver user ID 806 of the row is empty.

Further, a row having the fields 901-908 describing the following information is added to the user data table 414. That is, the data ID 901 of the row is a unique character string consisting of, for example, the registration date and the like. The permitted operation list 902 is the permitted operations inputted by the user in the data addition interface screen 1401. The approval status 903 is "unapproved". The sending status 904 is "unsent". The license period 905 is the license period inputted by the user in the data addition interface screen 1401. The approver ID 906 is empty. The application software ID 907 is the application software ID of the application software corresponding to the data addition button pushed by the user in the data registration acquisition interface screen 1302 for displaying the data addition interface screen 1401. The data name 908 is the data name inputted by the user in the data addition interface screen 1401.

Then, for each of the approvers described in the approver user ID list 602 corresponding to the user in question, the application software and data management program 108 adds the designated application software and the data whose registration has been requested respectively to the approval-pending application software table 415 and the approval-pending data table 416, and sends an E-mail requesting approval to the approver in question (S1213).

In detail, the application software and data management program 108 adds a row having the fields 1001-1005 describing the following information to the approval-pending application software table 415. That is, the user ID 1001 of the row is the user ID of the user in question who has applied for the approval. The application software ID 1002 is the application software ID registered as the application software ID 801 in the previous procedure. The permitted operation list 1003 includes the permitted operations registered as the permitted operation list 802 in the previous procedure. The license period 1004 is the license period registered as the license period 805 in the previous procedure. The approver user ID list 1005 is the approver user ID list described in the approver user ID list 602 of the user in question in the user table 411.

Further, a row having the fields 1101-1107 describing the following information is added to the approval-pending data table 416. That is, the user ID 1101 of the row is the user ID of the user in question who has applied for the approval. The data ID 1102 is the data ID registered as the data 901 in the previous procedure. The permitted operation list 1103 is the permitted operations registered as the permitted operation list 902 in the previous procedure. The license period 1104 is the license period registered as the license period 905 in the previous procedure. The approver user ID list 1105 is the approver user ID list described in the approver user ID list 602 of the user in question in the user table 411. The application software ID 1106 is the application software ID registered in the application software ID 907 in the previous procedure. The data name 1107 is the data name registered in the data name 908 in the previous procedure.

Then, the application software and data management program 108 sends information on the registration result of the data to be used off-line to the remote computer 104 (S1215). The remote computer 104 relays the information to the thin client terminal 101a (S1216). Then, the thin client terminal 101a displays the information on the display device 210 (S1216).

Thus, according to the procedure shown in the flowchart of FIG. 12, the thin client terminal 101a can register the data to be used off-line, following the instruction from the user.

Here, the unencrypted data of the two types of data stored in the user data area 409 are used when an approver confirms the contents of the data or confirms the execution history later. On the other hand, the encrypted data are used for sending to the thin client terminal and storing in the storage medium 110.

Next, processing extending until an approver approves the application software and data for which the user has requested approval will be described referring to FIG. 15. Here, processing steps common to those shown in FIG. 12 are given the same step numbers respectively, and their description will be omitted or simplified.

First, the thin client terminal 101b displays a screen for activating the remote control program on the display device 210, receives an instruction from an approver through the input device 211, and activates the remote control program 102. Further, the thin client terminal 101b uses the remote control program 102 to connect to the remote controlled program 105 of a remote computer 104 so that the thin client terminal 101b can remotely control the remote computer 104 (S1201).

Next, receiving an instruction from the approver through the input device 211, the thin client terminal 101b uses the remote control program 102 to request the remote computer 104 to activate the registration acquisition program 106 (S1202).

Receiving the request, the remote computer 104 activates the registration acquisition program 106. Further, the registration acquisition program 106 requests the thin client terminal 101b to input a user ID and a password to log in to the application software and data management program 108 (S1203).

Receiving the request, the thin client terminal 101b displays an appropriate window on the display device 210, to receive, through the input device 211, the user ID and password to log in to the application software and data management program 108, and sends the received user ID and password to the registration acquisition program 106 (S1204). The registration acquisition program 106 uses the received user ID and password to connect and log in to the application software and data management program 108 (S1205).

When the user authentication is successful, the application software and data management program 108 sends the remote computer 104 information to be used for displaying a user interface, i.e. a data registration acquisition interface screen 1301 shown in FIG. 16 (S1206). The remote computer 104 relays the information for displaying the data registration acquisition interface screen 1301 to the thin client terminal 101b (S1207).

The thin client terminal 101b displays the data registration acquisition interface screen 1301 on the display device 210.

The data registration acquisition interface screen 1301 is similar to the interface screen for a user shown in FIG. 13, and includes also information and buttons used by the approver as a user. Buttons having the same function are given the same symbol, and their description will be omitted or simplified.

Next, the thin client terminal 101*b* receives an approver's push operation on the permission/rejection button 1307 on the data registration acquisition interface screen 1301 through the input device 211. The thin client terminal 101*b* sends a permission/rejection instruction given by the received operation on the permission/rejection button 1307 to the remote computer 104. The remote computer 104 sends the instruction to the management server 107. Receiving the instruction, the application software and data management program 108 sends, as a user interface, a permission/rejection interface screen 1701 shown in FIG. 17 to the client terminal 101*b*, to make the interface screen 1701 displayed on the display device 210

The permission/rejection interface screen 1701 has a title area 1702 and a main area 1703. The title area 1702 displays a screen title and buttons for the whole screen, i.e. an all selection button 1704 for selecting all pieces of application software and all pieces of data as the objects of permission or rejection, an all release button 1705 for releasing all pieces of application software and data as the objects of permission or rejection, a permission execution button 1706 for executing permission of selected application software and data, a rejection execution button 1707 for executing rejection of selected application software and data, and a cancel button 1708 for canceling permission/rejection and terminating the screen.

The main area 1703 displays the application software and data for which the request for approval has been received, in forms of an approval wait application software table 1709 and an approval wait data table 1710. The approval wait application software table 1709 displays a user name of an applicant for approval, an application software name, an application software license period and permitted operations in the application software, according to the approval-pending application software table 415. The approval wait data table 1710 displays a user name of an applicant for approval, a data name, an application software name, a data license period, a browsing button 1711 for the approver to confirm the contents of the data, and permitted operations on the data, according to the approval-pending data table 416.

Then, the thin client terminal 101*b* receives the approver's operation for selecting permitted or rejected application software and data on the permission/rejection interface screen 1701 through the input device 211. Further, the thin client terminal 101*b* receives a push operation on the permission execution button 1706 or the rejection execution button 1707 on the permission/rejection interface screen 1701 through the input device 211. Receiving the operation, the thin client terminal 101*b* requests the application software and data management program 108 to permit or reject the application software and data in question, through the remote computer 104 (S1501).

The remote computer 104 sends the information inputted in the thin client terminal 101*b* to the application software and data management program 108 (S1502).

The application software and data management program 108 registers the result of approval or rejection by the approver with respect to the application software and data for which the approver has requested approval, to the user application software table 413 and the user data table 414 of the user as the applicant for approval. Further, the application software and data management program 108 sends the approval result to the user as the applicant for approval by E-mail (S1503).

In detail, in the case of approval of application software, the application software and data management program 108 changes the approval status 803 corresponding to the application software ID concerned in the user application software table 413 to "permitted" or "rejected", and the approver user ID 806 to the user ID of the approver. In the case of approval of data, the application software and data management program 108 changes the approval status 903 corresponding to the data ID concerned in the user data table 414 to "permitted" or "rejected", and the approver user ID 906 to the user ID of the approver.

Then, for each piece of the application software and data that are the objects of the approval, the application software and data management program 108 deletes the row of the application software or data subject to the approval processing from the approval-pending application software table 415 or the approval-pending data table 416 of each approver described in the approver user ID list 1005 in the case of application software, or the approver user ID list 1105 in the case of data (S1504).

Then, the application software and data management program 108 sends the information on the above approval result to the remote computer 104 (S1505). The remote computer 104 relays the information to the thin client terminal 101*b* (S1506). Then, the thin client terminal 101*b* displays the information on the display device 210 (S1507).

Thus, according to the procedure shown in the flowchart of FIG. 15, the thin client terminal 101*b* can permit or reject the user's application for approval, following the instruction from the approver.

Next, the application software and data to be used off-line on the thin client terminal are sent from the management server 107 to the storage medium, and data generated off-line on the thin client terminal are uploaded from the storage medium 110 to the management server 107.

First, as shown in FIG. 18, the thin client terminal 101*a* activates the off-line execution program 103 according to an instruction from the user (S1801). The off-line execution program 103 acquires the time from the time hardware 207, and compares it with the time in the execution time recording area 501 that records the latest time among times at which the off-line execution program has performed processing on the thin client terminal in the past. In the case where the time acquired from the time hardware 207 is older than the time in the execution time recording area 501, then it is judged that the time of the time hardware 207 has been illegally set back, and the off-line execution program is ended (S1802).

Next, the off-line execution program 103 compares the time from the time hardware 207 with the license periods of the user application software table 413 and the user data table 414 on the storage medium 110, and deletes expired application software and data from the storage medium 110 if such application software and data exist. As for the deleted application software and data, the off-line execution program 103 changes the sending statuses of the relevant rows in the user application software table 413 and the user data table 414 on the storage medium 110 to "erased" (S1803).

After performing the above processing, the off-line execution program 103 makes the thin client terminal 101*a* display a user interface, i.e. an off-line execution interface screen 1901 as shown in FIG. 19 on the display device 210.

The off-line execution interface screen 1901 has a title area 1902 and a main area 1903. The title area 1902 displays a screen title and buttons for the whole screen, i.e. an update button 1904 for updating screen contents and an end button 1905 for terminating the screen.

The main area 1903 displays a synchronization button 1906 for starting data sending and receiving between the management server 107 and the storage medium 110, and, for each piece of application software, an application software title 1907 that displays a name of application software and an application software license period, a data addition button 1913 for adding data used in the application software, an all data erase button 1908 for erasing all data registered for the application software, and a data table 1909 that displays a list of data registered for the application software.

The data table 1909 displays a data name, a data license period, and data operation buttons, i.e. a browsing button 1910 for displaying the contents of the data by using the application software, a deletion button 1911 for erasing the data, a print button 1912 for printing the data, an edit button 1917 for editing the data, and a copy button 1919 for copying the data. Contents of the main area 1903 are displayed based on the contents of the application software table 412, the user application software table 413 and the user data table 414 on the storage medium 110. Further, among the operation buttons, those relating to the permitted operations are displayed.

Further, the application software and data to be used off-line on the thin client terminal 101a are sent from the management server 107 to the storage medium 110. Data generated off-line on the thin client terminal 101a are uploaded from the storage medium 110 to the management server 107. To this end, the thin client terminal 101a receives, through the input device 211, a push operation on the synchronization button 1906 displayed on the off-line execution interface screen 1901, and displays a window for logging in to the application software and data management program 108 through the network 109 (S1804). When the off-line execution program 103 receives input of a user ID and a password through the input device 211, the off-line execution program 103 uses the received user ID and password to connect and log in to the application software and data management program 108 (S1805).

Then, the off-line execution program 103 sends, to the application software and data management program 108, the file size and remaining capacity of the storage medium 110, the application software table 412, the user application software table 413 and the user data table 414 on the storage medium 110, the log data of the log data area 410, and data whose sending statuses are "un-uploaded" in the user data table 414 among the data in the user data area 409 (S1806).

The application software and data management program 108 performs processing of synchronization of the received user application software table 413 and user data table 414 with the user application software table 413 and the user data table 414 on the management server 107 (S1807).

FIG. 20 is a flowchart showing details of the synchronization processing performed in the flowchart of FIG. 18. First, in the synchronization processing, with respect to each piece of application software whose sending status 804 is "erased" in the user application software table 413 sent from the storage medium 110, the application software and data management program 108 changes the sending status 804 in the user application software table 413 on the management server 107 to "erased" (S2001).

Next, with respect to each piece of application software for which the sending status 804 in the user application software table 413 sent from the storage medium 110 is "sent" and the application software version 703 in the application software table 412 sent from the storage medium 110 is older than the application software version 703 in the application software table 412 on the management server 107, the application software and data management program 108 sends the relevant application program in the application program area 408 to the storage medium 110 (S2002).

Further, with respect to each piece of application software for which the approval status 803 is "permitted", the sending status 804 is "unsent", and the license period 805 has not elapsed in the user application software table 413 on the management server 107, the application software and data management program 108 sends the application program in the application program area 408 to the storage medium 110 and changes the sending status 804 in the user application software table 413 to "sent" (S2003).

Next, with respect to data for which the sending status 904 in the user data table 414 sent from the storage medium 110 is "erased", the application software and data management program 108 moves the unencrypted data in the user data area 409 on the management server 107 to the log data area 410, erases the encrypted data in the user data area 409, and deletes the data row concerned from the user data table 414 on the management server 107 (S2004).

Further, with respect to data for which the sending status 904 in the user data table 414 sent from the storage medium 110 is "un-uploaded", the application software and data management program 108 acquires the data from the storage medium 110 and stores the data in the user data area 409 on the management server 107, and changes the sending status 904 in the user data table 414 on the management server 107 to "sent" (S2005).

Further, with respect to data for which the approval status 903 is "permitted", the sending status 904 is "unsent", the license period 905 has not elapsed in the user data table 414 on the management server 107, and, in addition, the approval status 803 of the application software corresponding to the application software ID 907 is "permitted" and the license period 805 of that application software has not elapsed in the user application software table 413, the application software and data management program 108 sends the data to the storage medium 110 and changes the sending status 904 in the user data table 414 on the management server 107 to "sent" (S2006).

Further, the application software and data management program 108 stores the received uploaded data into the user data area 409 on the management server 107. Further, the application software and data management program 108 merges the received log data into the log data in the log data area 410 on the management server (S1807).

Then, the application software and data management program 108 returns the time information of the management server 107, the application software table 412 on the management server 107, the synchronized user application software table 413, and the synchronized user data table 414 to the off-line execution program 103. Further, as far as the capacity of the storage medium 110 allows judging from the received file size and remaining capacity of the storage medium 110, the application software and data management program 108 returns the permitted and unsent application programs and data to the off-line execution program 103 (S1808).

The off-line execution program 103 stores the received time information of the management server 107 into the execution time recording area 501 of the storage medium 110, the received application software table as the application software table 412 of the storage medium 110, the received user application software table as the user application software table 413 of the storage medium 110, the received user data table as the user data table 414 of the storage medium 110, the received application program into the application program area 408 of the storage medium 110, and the received data into the user data area of the storage medium 110. Further, the off-line execution program 103 erases the sent log data from the storage medium 110 (S1809). Then, the off-line execution program 103 shows the processing result to the user by displaying the result on the display device 210 of the thin client terminal 101a (S1810).

Thus, according to the procedure shown in the flowchart of FIG. 18, the thin client terminal 101a can store the application program, data and the like, to be used off-line, into the storage medium 110, following the instruction of the user.

In the first embodiment (and also in the other embodiments), the processing of erasing the expired application software and data from the storage medium 110 is performed when the thin client terminal 101 activates the off-line execution program 103, following the instruction of the user. However, the present invention is not limited to this. For example, the processing may be performed when the OS program 208 activates the off-line execution program 103 at the time of booting the thin client terminal 101. Alternatively, the processing may be performed when the OS program 208 activates the off-line execution program 103 at regular intervals using a timer or the like. Alternatively, the processing may be performed at regular intervals using a timer or the like while the off-line execution program 103 is running.

FIG. 21 is a chart showing processing between the user, the approver, the programs and the storage medium in a series of flowcharts covering registration of data, approval by the approver, and storing into the storage medium.

Processing by using application software and data off-line on the thin client terminal 101a is performed as follows. First, as shown in FIG. 22, receiving an operation instruction from the user, the off-line execution program 103 is activated. On the off-line execution interface screen 1901 provided by the off-line execution program 103, an operation instruction by an operation button such as a browsing button 1910, a print button 1912, an edit button 1917 or the like, is received through the input device 211. Further, a password for decoding data is inputted (S2201). Here, the same password as the one inputted on the management server at the time of data registration is inputted.

Receiving the password, the off-line execution program 103 performs a time set-back check by a method similar to the one in S1802. If it is judged that time set-back has occurred, the off-line execution program 103 is ended (S2202).

Further, with respect to the operation corresponding to the pushed operation button, it is judged whether the application software and data concerned are permitted, referring to the permitted operation list 702 of the application software table 412, the permitted operation list 802 of the user application software table 413, and the permitted operation list 902 of the user data table 414 in the storage medium 110. If there exists even one un-permitted item, the processing is ended. Further, with respect to the operation corresponding to the pushed operation button, it is judged whether the expiration dates of the application software and data concerned are within the respective license periods, referring to the license period 805 of the user application software table 413 and the license period 905 of the user data table 414 in the storage medium 110. If there exists even one that is not in the license period concerned, the processing is ended (S2203).

Then, the off-line execution program 103 erases the data in the decoded data storage area 209 of the memory 201 (S2204), disables the user interface of the off-line execution program 103. (S2205), and disables the communication hardware 206 of the thin client terminal 101a (S2206). After that, the off-line execution program 103 decodes the data in question in the user data area 409 of the storage medium 110 and stores the result in the decoded data storage area 209 (S2207). Further, the off-line execution program 103 copies the application program required for the data in question from the application program area 408 to the decoded data storage area 209 (S2208). Further, in the case where the pushed operation button is not the print button, the off-line execution program 103 disables the print function (S2209). Further, information in the clipboard is deleted (S2210). Then, the off-line execution program 103 writes the time held by the time hardware 207 of the thin client terminal 101a into the execution time recording area 501 (S2211), and outputs an execution history including the time, the kind of operation button, the application software ID, the data ID, and the data name, to the log data area 410 (S2212). Then, the off-line execution program 103 disables reading/writing of the storage medium 110 (S2213), and thereafter, activates the application software in question and makes the application software read the data in question (S2214).

After performing information processing using the activated application software, the application software is ended. The off-line execution program 103 waits for the end of the application software (S2215).

When the application software is ended, the off-line execution program 103 enables reading/writing of the storage medium 110 (S2216). In the case where the edit button has been pushed, the off-line execution program 103 encrypts the data in the memory, and writes the encrypted data to the user data area 409 of the storage medium 110 (S2217). The password inputted by the user in S2201 is used for the encryption. Further, in the case where the edit button has been pushed, the off-line execution program 103 changes the sending status 904 of the data in question in the user data table 409 to "un-uploaded" (S2218). Then, the data in the decoded data storage area 209 of the memory 201 are erased (S2219). Information in the clipboard is deleted (S2220). The time held by the time hardware 207 of the thin client terminal 101a is written to the execution time recording area 501 (S2221). As an execution history, the time, the kinds of operation button, the application software ID, the data ID, and the data name are outputted to the log data area 410 (S2222). Further, in the case where the pushed operation button is not the print button, the off-line execution program 103 restores the print function that was disabled in S2209 (S2223). Then, the communication hardware 206, which was disabled in S2206, of the thin client terminal 101a is restored (S2224). The user interface, which was disabled in S2205, of the off-line execution program 103 is enabled (S2225).

Thus, according to the procedure shown in the flowchart of FIG. 22, the thin client terminal 101a can safely use the approved application software and data with respect to the permitted operations in such a way that the output destination is restricted and the data cannot be copied for another piece of application software.

Hereinabove, the first embodiment has been described. According to the first embodiment, a thin client terminal as a component of a thin client system can be used off-line in a state in which information leakage does not easily occur. Further, it is possible to handle the minimum necessary data by arranging the system such that off-line execution of the designated application software and designated data requires approval. This improves safety from information leakage.

In the first embodiment, a thin client terminal performs the approval processing. However, an ordinary PC may be used for performing the approval processing. Alternatively, an arrangement in which the permission processing is not required may be employed. In that case, generation of approval information, sending of an approval request, statuses relating to approval, and checking of use conditions are not required.

Now, a second embodiment will be described referring to FIGS. 5, 23, 29, 36, 37 and 40. In the following, points that are different from the first embodiment will mainly be described.

Figure 23:
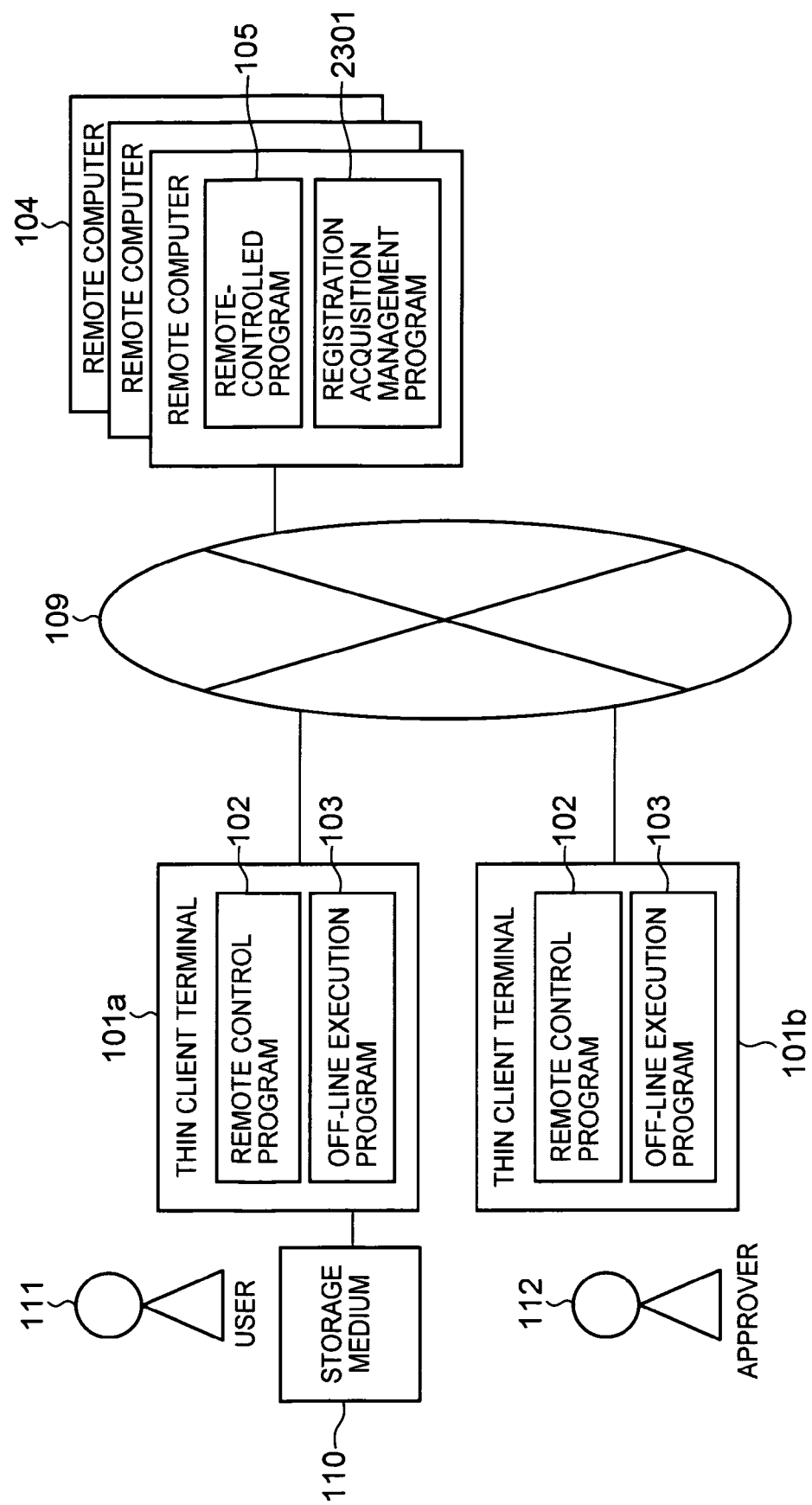
FIG. 23 is a block diagram showing a general configuration of a system according to a second embodiment.

As shown in FIG. 23, a configuration of the second embodiment differs from the system configuration of FIG. 1 in that the management server 107 is removed. That is, the thin client system shown in FIG. 23 comprises one or more thin client terminals 101a, 101b and one or more remote computers 104. The functions of the management server 107 are held by each remote computer 104.

A functional configuration of each thin client terminal 101 is the same as that of the first embodiment (FIG. 37), and descriptions thereof are omitted here.

Figure 39:
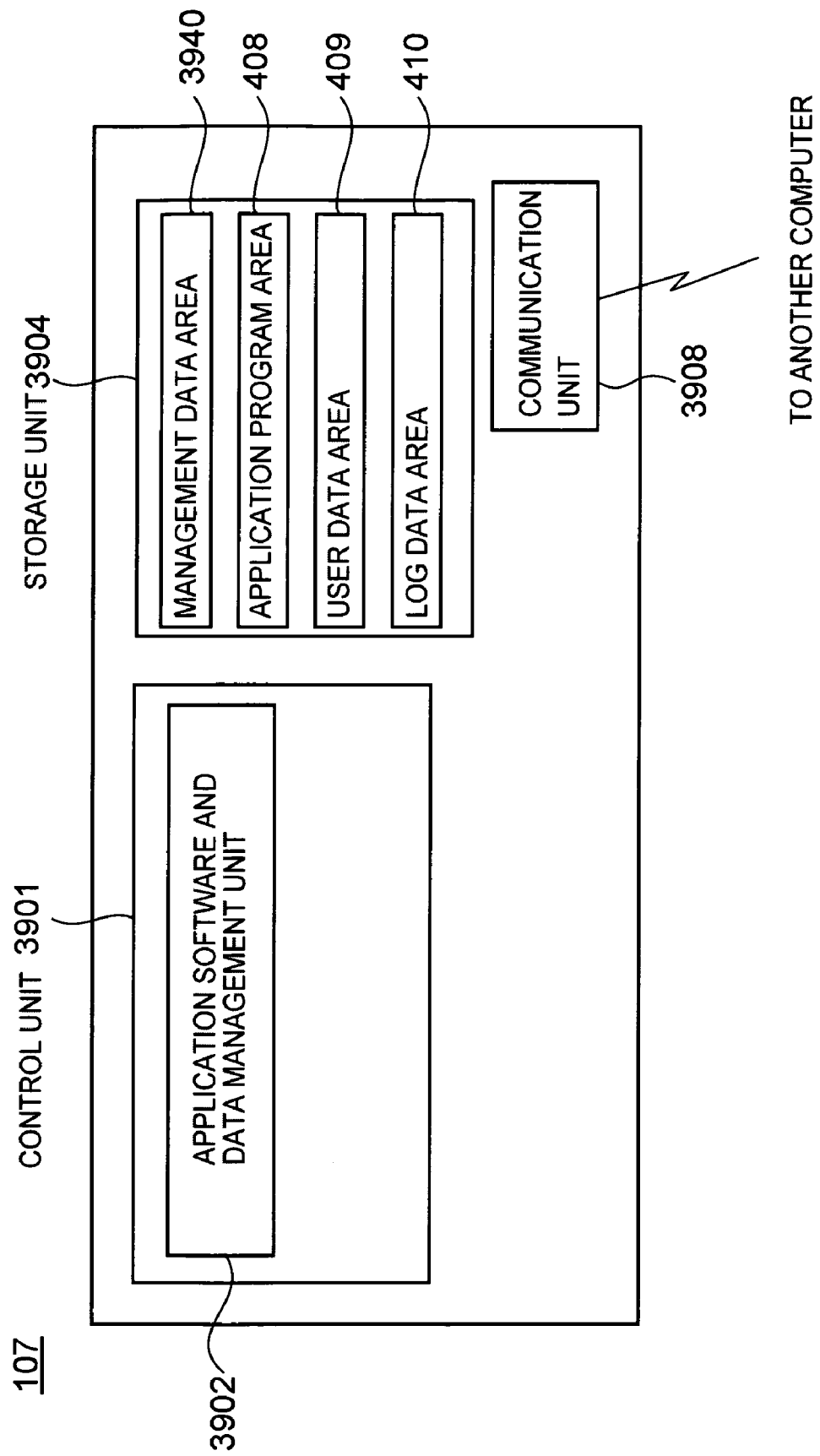
FIG. 39 is a block diagram showing a functional configuration of the management server according to the first embodiment.
Figure 40:
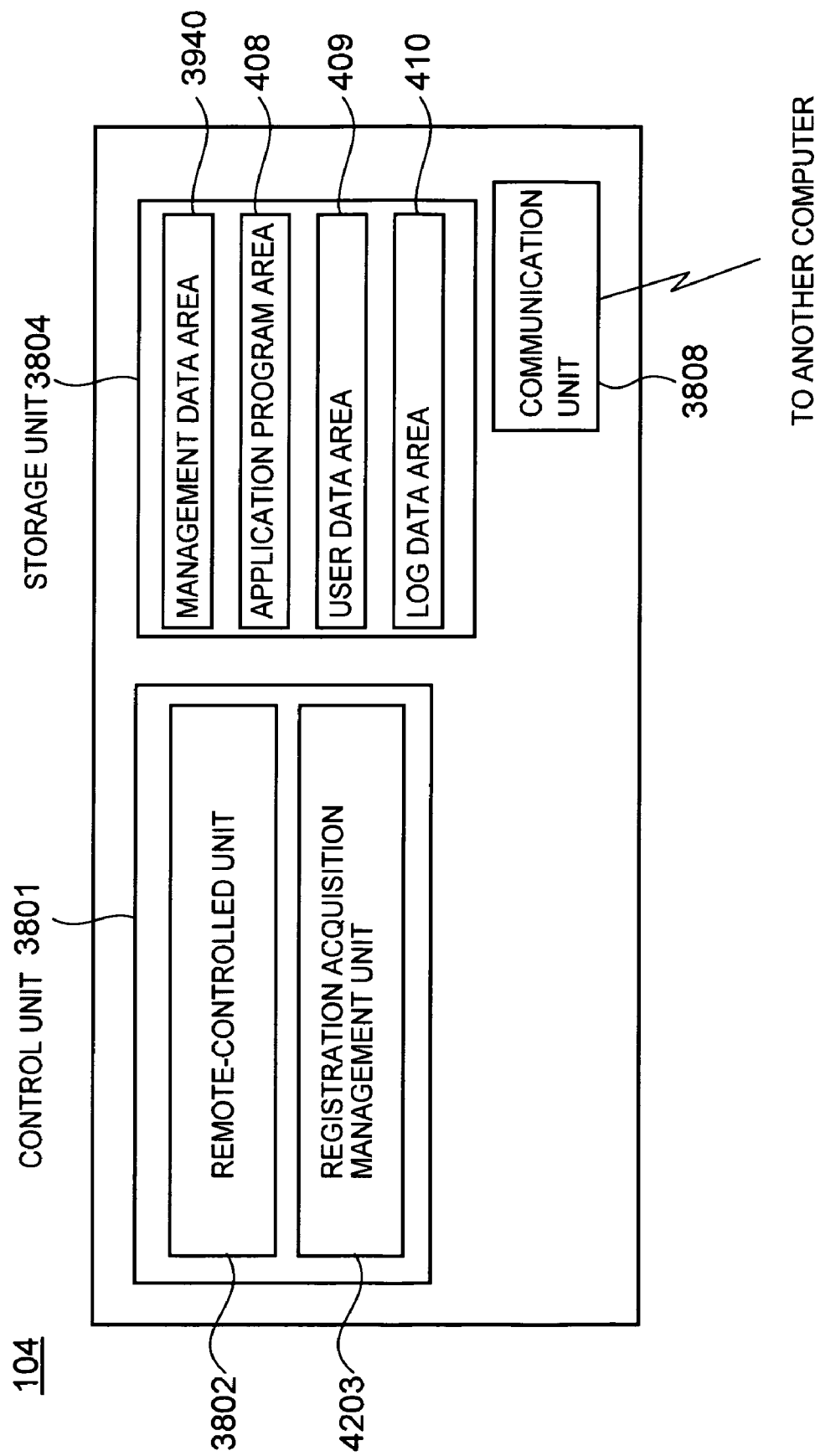
FIG. 40 is a block diagram showing a functional configuration of the remote computer according to the second embodiment.

Next, a remote computer 104 will be described referring to FIGS. 38, 39 and 40.

Figure 38:
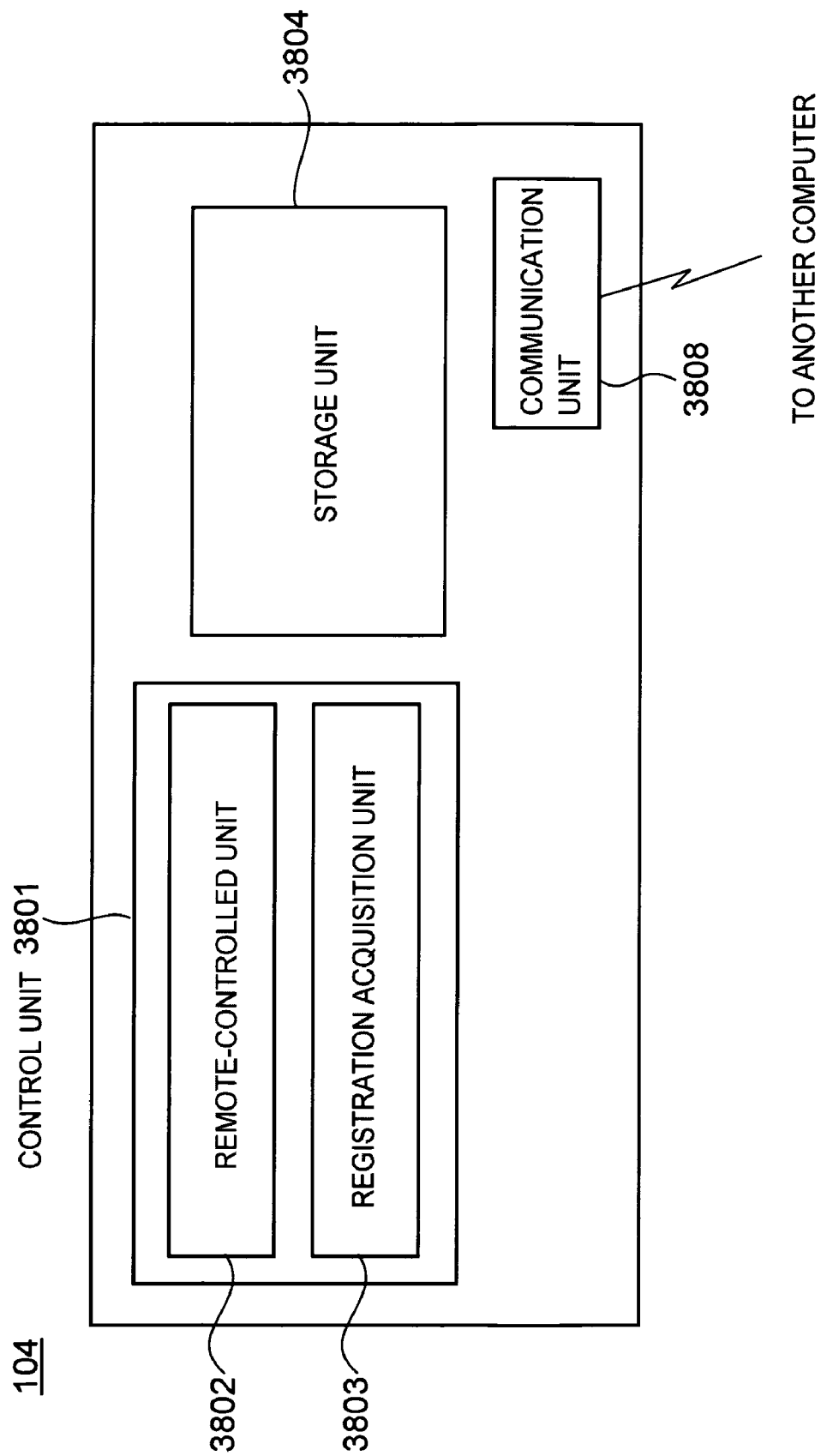
FIG. 38 is a block diagram showing a functional configuration of the remote computer according to the first embodiment.

Differently from FIG. 38, a registration acquisition management unit 4203 rather than the registration acquisition unit 3803 is implemented on a control unit 3801. Further, differently from FIG. 38, the storage unit 3804 has the management data area 3904, the application program area 408, the user data area 409 and the log data area 410 which are owned by the management server 107 in the first embodiment.

The registration acquisition management unit 4203 has the functions of the registration acquisition unit 3803 and the application software and data management unit 3901 of the first embodiment. The registration acquisition management unit 4203 is activated by the remote control unit 3702 on a thin client terminal 101 through the remotely controlled unit 3802. Then, according to an instruction of the user of the thin client terminal 101 in question, the registration acquisition management unit 4203 receives a request for registration of data and designation of application software to be used in an off-line state, and registers the information indicated by the request. Further, the off-line execution unit 3703 of the thin client terminal 101 logs in to the registration acquisition management unit 4203 at the time of performing the above-mentioned synchronization processing, and the registration acquisition management unit 4203 performs the synchronization processing.

A configuration of each storage medium 110 is the same as the one (FIG. 5) in the first embodiment, and its description is omitted here.

Figure 29:
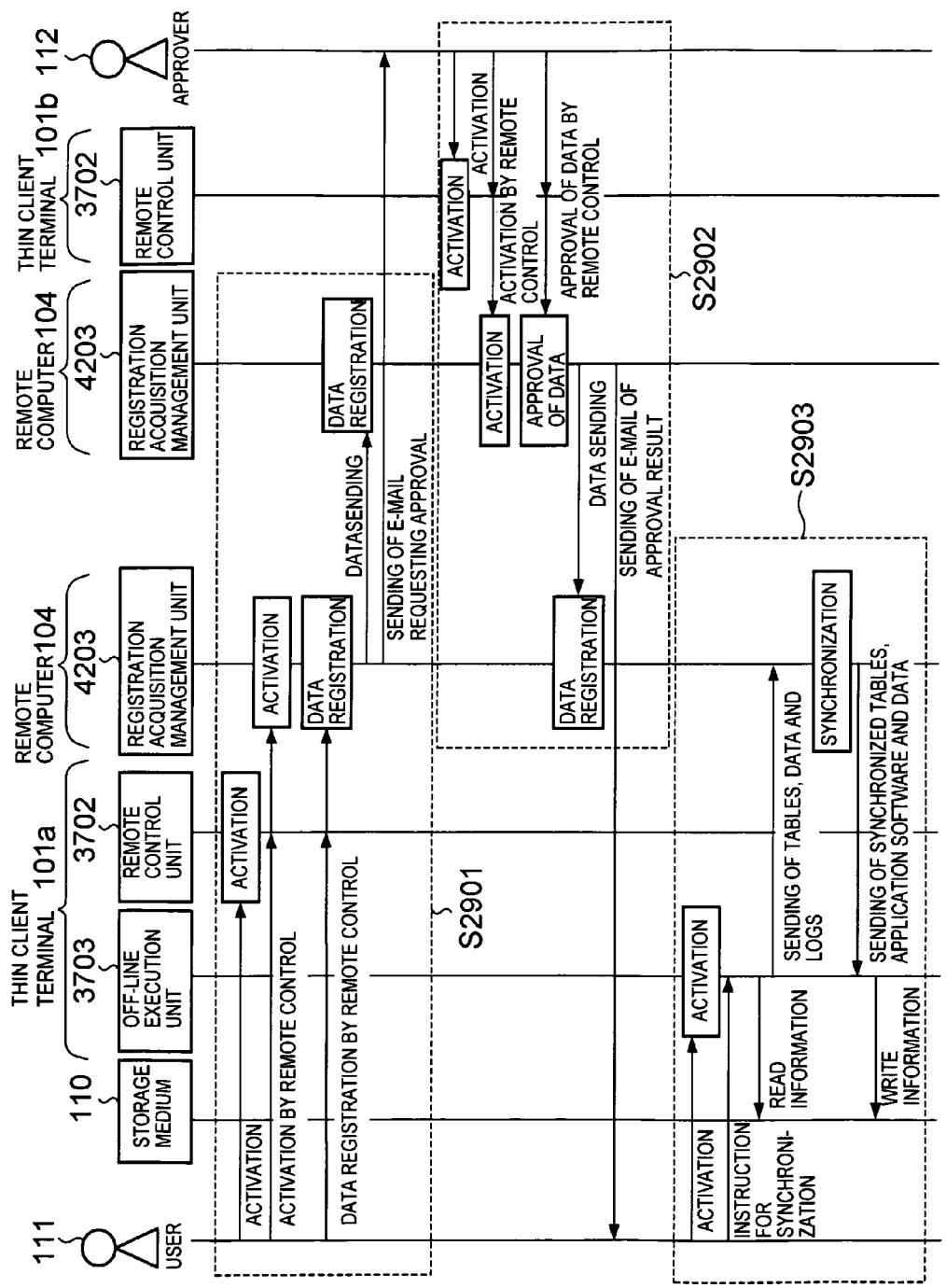
FIG. 29 is an explanatory chart showing processing between apparatuses in the flowcharts of FIGS. 25, 26 and 27, according to the second embodiment.

Next, operation of the thin client system to which the application software and data management system according to the second embodiment is applied will be described referring to FIGS. 5, 29, 36, 37 and 40. FIGS. 29 and 36 are charts showing flow of processing between apparatuses and functions of those apparatuses.

Processing extending until data to be used off-line by the user on the thin client terminal 101a are registered, will be described referring to FIGS. 29 (S2901), 37 and 40.

First, receiving an instruction from the user through the input unit 3705, the control unit 3701 on the thin client terminal 101a activates the remote control unit 3702. Then, the remote control unit 3702 connects to the remotely controlled unit 3802 of a remote computer 104 so that the remote control unit 3702 can remotely control the computer 104. By remote control, the registration acquisition management unit 4203 on the remote computer 104 is activated. Thus, the remote control unit 3702 and the registration acquisition management unit 4203 can communicate with each other.

When user authentication is successful, the registration acquisition management unit 4203 sends screen information for inducing registration of data to be used in an off-line state, designation of application software for processing the data, and designation of use conditions of the data and the application software, to the thin client terminal 101a. The remote control unit 3702 makes the output unit 3706 display the screen information.

The remote control unit 3702 sends a request for registration of the data to be used in an off-line state, request for designation of the application software for processing the data in question, and a request for designation of the use conditions of the data and the application software, to the registration acquisition management unit 4203 on the remote computer 104. These requests are inputted through the input unit 3705 and will be referred to as registration information.

The registration acquisition management unit 4203 stores the data whose registration has been requested in the registration information into the user data area 409 on the storage unit 3804. Further, the registration acquisition management unit 4203 stores information that includes the received registration information, information specifying the designated data and application software, and statuses of the designated data and application software, into the management data area 3940. These statuses are set to "unapproved" or "unsent".

Further, the registration acquisition management unit 4203 sends the registration information stored in the management data area 3940 and the data stored in the user data area 409 to the address of the remote computer 104 used by an approver who should approve the registration information.

The remote computer 104 of the approver receives the registration information, generates approval information that the approver refers to, and stores the approval information into its own management data area 3940. Further, the remote computer 104 stores the received data into its own user data area 409.

Then, the registration acquisition management unit 4203 of the applicant for approval sends an approval request to the address of the approver who should approve the registration information.

Thus, the thin client terminal 101a can register the data to be used off-line, following the instruction of the user. Further, the thin client terminal 101b can remotely control the remote computer 104 used by the thin client terminal 101b, to refer to the approval information, following an instruction of the approver.

Next, processing extending until the approver approves the registration information whose approval has been requested will be described referring to FIGS. 29 (S2902), 37 and 40.

First, receiving an instruction from the approver through the input unit 3705, the control unit 3701 on the thin client terminal 101b activates the remote control unit 3702. Then, the remote control unit 3702 connects to the remotely controlled unit 3802 of the remote computer 104 so that the remote control unit 3702 can control the remote computer 104. By remote control, the registration acquisition management unit 4203 on the remote computer 104 is activated. Thus, the remote control unit 3702 and the registration acquisition management unit 4203 can communicate with each other.

When user authentication is successful, the registration acquisition management unit 4203 sends screen information for inducing approval of permission or rejection to the thin client terminal 101b. The screen information is constructed on the approval information (which is stored in the management data area 3940) relating to the registration information of the data and application software to be used off-line. The remote control unit 3702 makes the output unit 3706 display the screen information.

The remote control unit 3702 sends information on a request for designating approval or rejection of the registration information to the registration acquisition management unit 4203. The request is inputted through the input unit 3705.

The registration acquisition management unit 4203 sends the received information to the remote computer 104 of the user as the applicant for approval.

Referring to the received approval information, the registration acquisition management unit 4203 of the applicant for approval changes the statuses of the data and application software registered in the registration information to "permitted" or "rejected".

Then, the registration acquisition management unit 4203 of the remote computer 104 of the approver deletes the already-approved approval information stored in its own management data area 3940. The registration acquisition management unit 4203 sends the approval result to the address of the user as the applicant for approval.

Thus, the thin client terminal 101b can permit or reject the user's application for approval, following the instruction of the approver.

Next, processing for sending the application software and data to be used off-line on the thin client terminal 101a from the remote computer 104 to the storage medium 110 until data generated on the thin client terminal 101a are uploaded from the storage medium 110 to the remote computer 104 will be described referring to FIGS. 5, 29 (S2903), 37 and 40.

First, receiving an instruction from the user through the input unit 3705, the control unit 3701 on the thin client terminal 101a receives activates the off-line execution unit 3703.

After that, in the case where the registration information, stored in the management data area of the storage medium 110, exists, the off-line execution unit 3703 refers to the registration information to check the use conditions of the data and application software stored in the storage medium 110. Further, according to a result of the check, the off-line execution unit 3703 restricts operations relating to the data and application software if necessary.

Then, the off-line execution unit 3703 makes the output unit 3706 display screen information for receiving instruction to perform synchronization processing of the information stored in the storage medium 110 with the information stored in the remote computer 104 and to perform off-line execution with respect to the data and application software stored in the storage medium 110.

Receiving an instruction to perform the synchronization processing from the user through the input unit 3705, the off-line execution unit 3703 uses a user ID and a password inputted through the input unit 3705 to connect and log in to the registration acquisition management unit 4203 on the remote computer 104.

After that, the off-line execution unit 3703 sends the registration information stored in the management data area 4040 of the storage medium 110 and the log stored in the log data area 410 to the registration acquisition management unit 4203.

The registration acquisition management unit 4203 performs the synchronization processing based on the received registration information. In the synchronization processing, data whose status is "un-uploaded" in the received registration information is acquired from the storage medium and stored into the user data area 409 on the remote computer 104. With respect to the statuses of the registration information stored in the management data area 3940 on the remote computer 104, the registration acquisition management unit 4203 updates the status corresponding to the acquired data to "sent". Further, the registration acquisition management unit 4203 stores the received log into the log data area 410 on the remote computer 104.

Then, the registration acquisition management unit 4203 refers to the registration information stored in the management data area 3940 on the remote computer 104, and sends the data and application software whose statuses are "unsent", i.e. the data and application software registered beforehand, to the thin client terminal 101a, while checking their use conditions. Further, the registration acquisition management unit 4203 sends the registration information subjected to the above-mentioned synchronization processing to the thin client terminal 101a.

The off-line execution unit 3703 stores the received data, application software and registration information into the user data area 409, the application program area 408, and the management data area 4040 on the storage medium 110, respectively.

Thus, receiving the instruction of the user, the thin client terminal 101a can store the data and application software to be used off-line into the storage medium 110.

Processing of off-line execution using the data and application software stored in the storage medium 110 on the thin client terminal 101a is similar to the processing in the first embodiment, and its description is omitted.

In the following, the second embodiment will be described in greater detail, referring to FIGS. 23-29.

FIG. 23 is a diagram showing a system configuration of the thin client system to which the application software and data management system according to the second embodiment is applied. The configuration differs from the first embodiment in that the management server 107 does not exist.

Similarly to the first embodiment, each thin client terminal 101 has an internal configuration as shown in FIG. 2.

Figure 24:
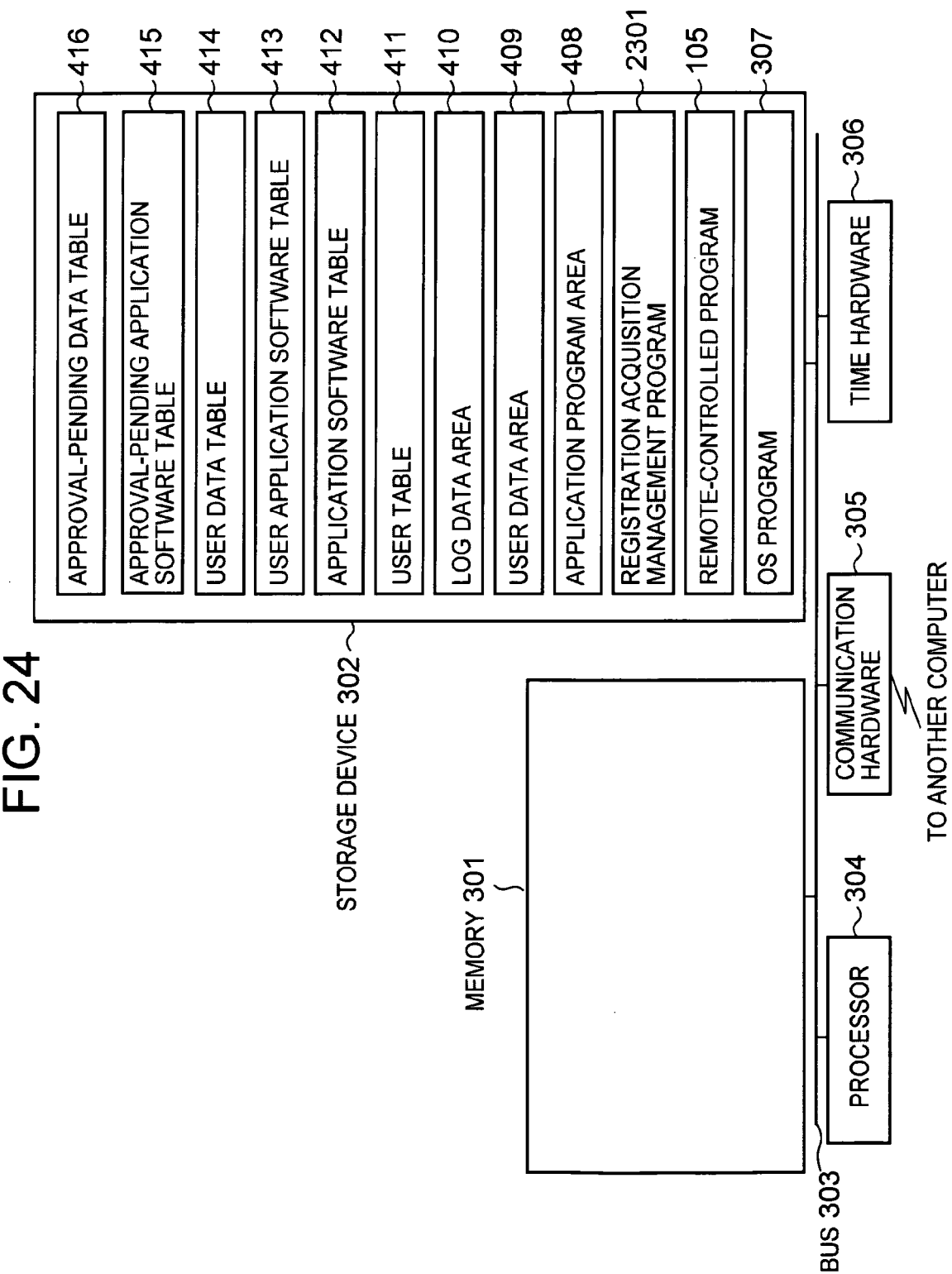
FIG. 24 is a block diagram showing an internal configuration of a remote computer according to the second embodiment.

Each remote computer 104 has an internal configuration as shown in FIG. 24. This configuration differs from the first embodiment in that the remote computer 104 has not the registration acquisition program 106 but a registration acquisition management program 2301 that also has the functions of the application software and data management program 108 on the management server 107.

Further, the storage device 302 stores programs and various kinds of data for realizing an application software and data management method of the second embodiment. In addition to the registration acquisition management program 2301, the storage device 302 stores application programs, user data, log data, the user table 411, the application software table 412, the user application software table 413, the user data table 414, the approval-pending application software table 415, the approval-pending data table 416 and the like, similar to the various kinds of data existing on the management server 107 of the first embodiment.

Each storage medium 110 has an internal configuration as shown in FIG. 5 similarly to the first embodiment.

Figure 25:
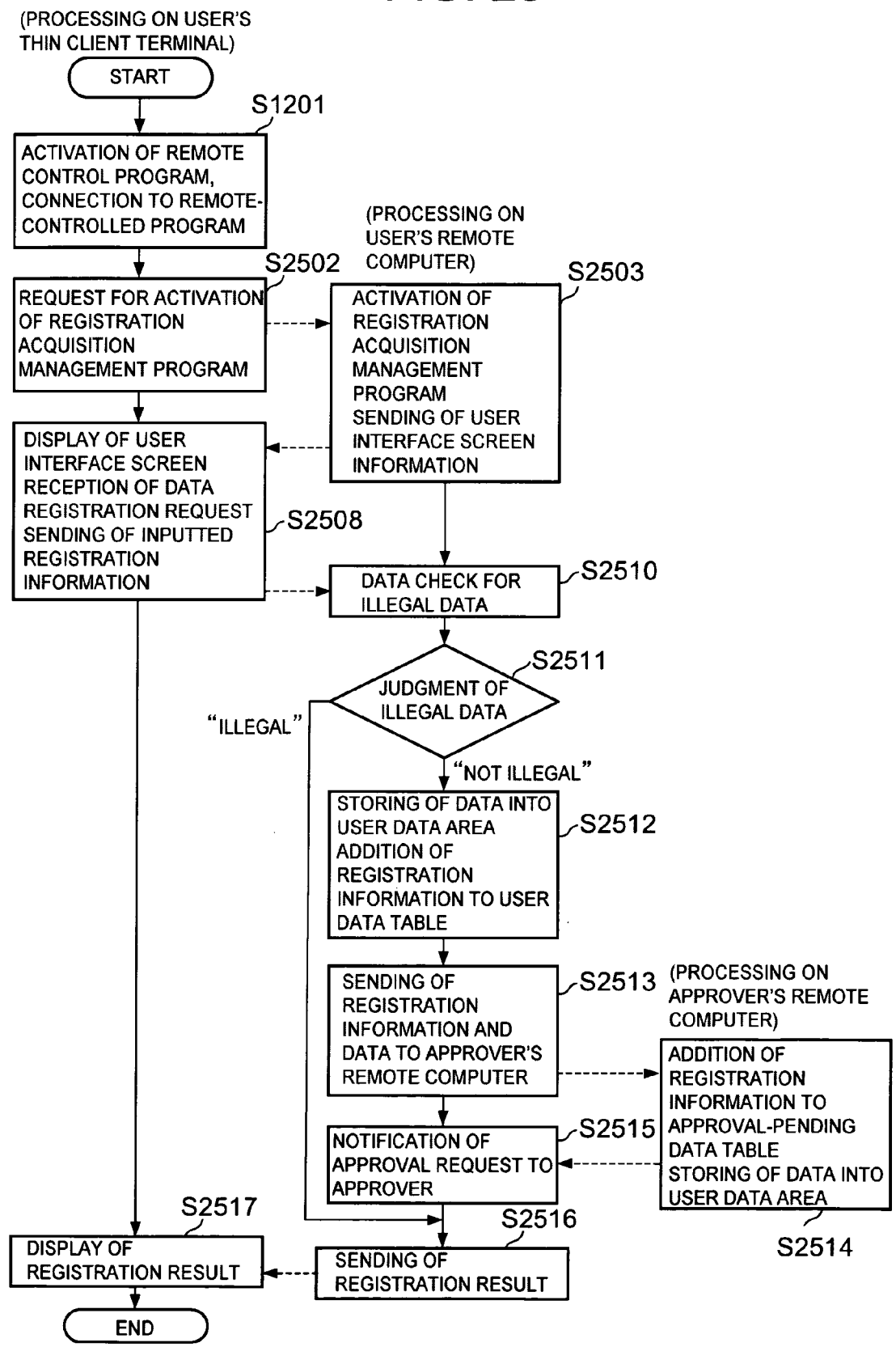
FIG. 25 is a flowchart showing flow of processing extending until data to be used by a user on a thin client terminal in an off-line state are registered at a remote computer, according to the second embodiment.
Figure 26:
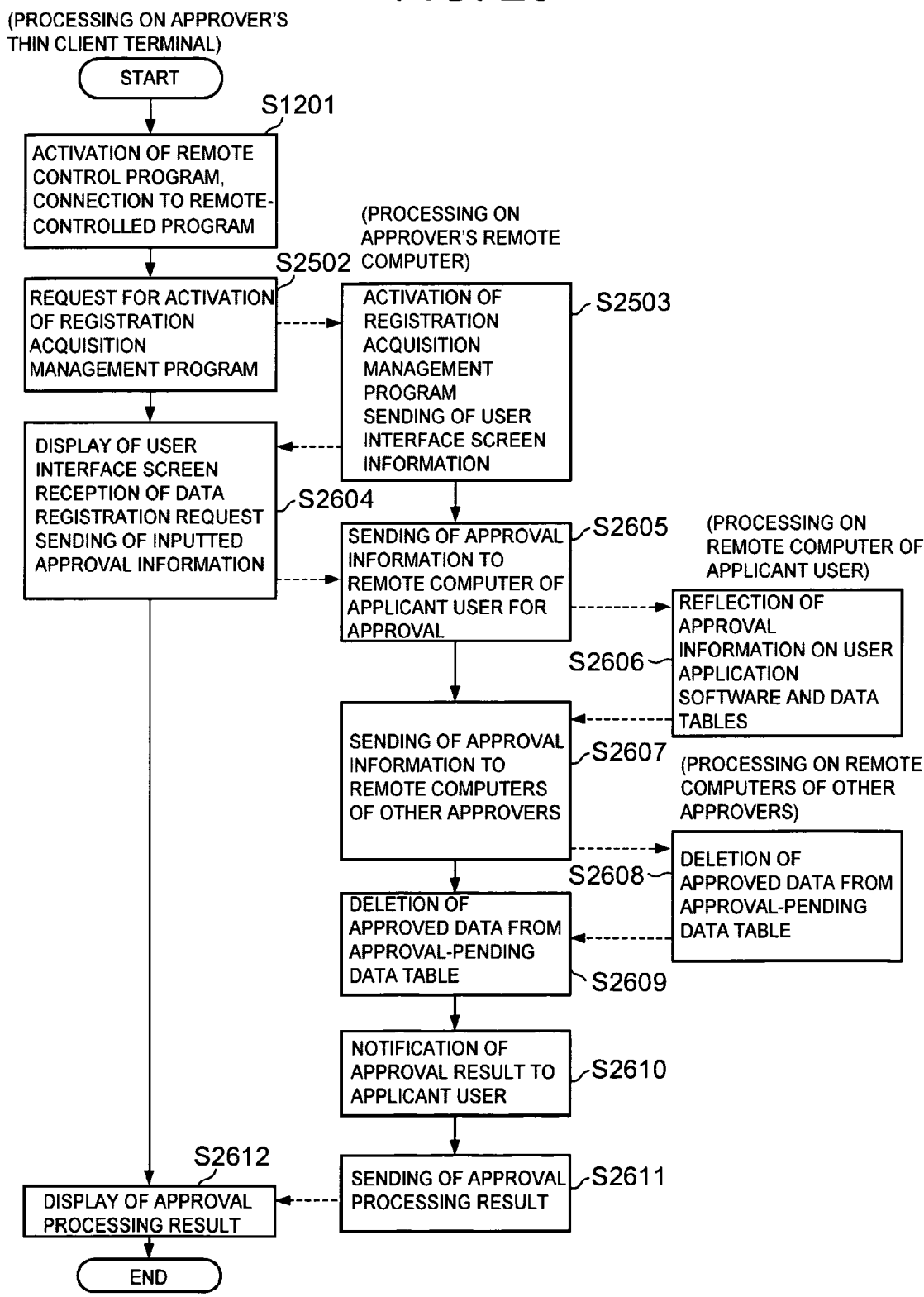
FIG. 26 is a flowchart showing flow of processing extending until an approver approves a case for which the user has requested approval.
Figure 27:
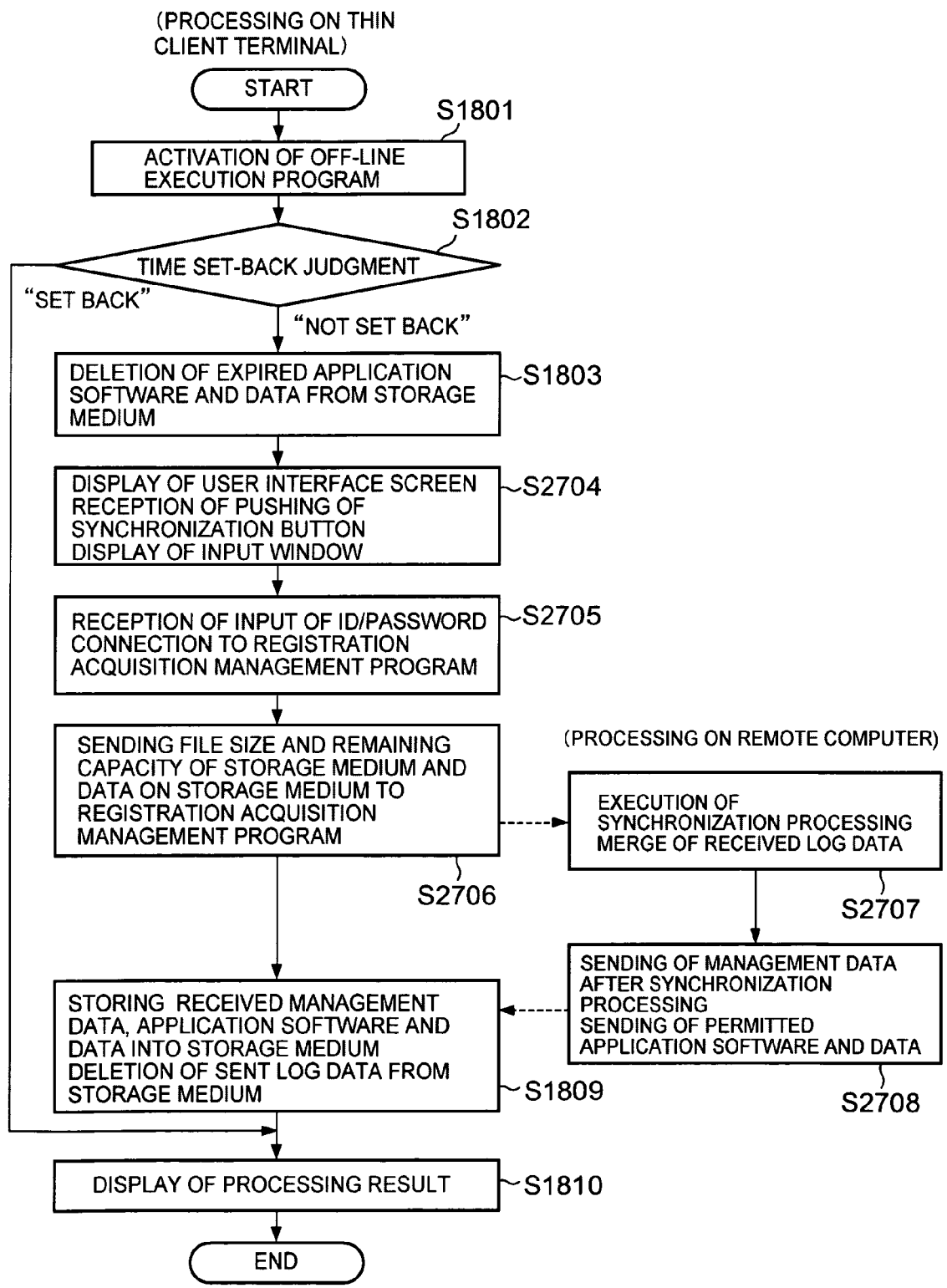
FIG. 27 is a flowchart showing flow of processing for sending application software and data used on a thin client terminal in an off-line state from a management server to a storage medium, up to upload of data generated on the thin client terminal in the off-line state from the storage medium to the management server, according to the second embodiment.
Figure 28:
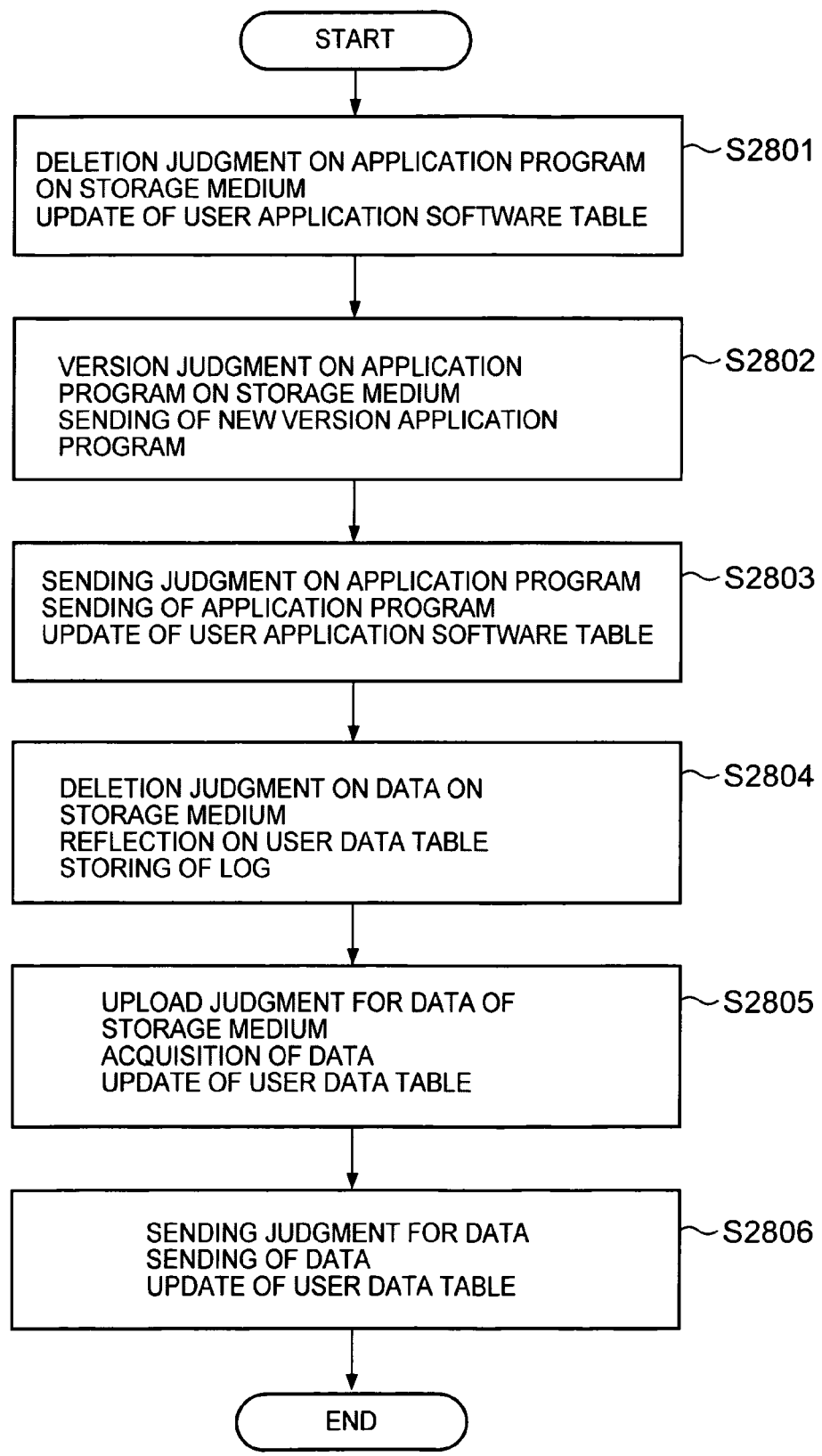
FIG. 28 is a flowchart showing flow of synchronization processing according to the second embodiment.

Next, processing in the application software and data management system according to the second embodiment will be described referring to FIGS. 25-29. FIG. 25 is a flowchart showing processing extending until the data, to be used off-line by a user on the thin client terminal, are registered at a remote computer. FIG. 26 is a flowchart showing processing extending until an approver approves a case for which the user has requested approval. FIG. 27 is a flowchart showing processing for sending the application software and data to be used off-line on the thin client terminal from the remote computer 104 to the storage medium 110 until data generated off-line on the thin client terminal are uploaded from the storage medium 110 to the remote computer 104. FIG. 28 is a flowchart showing details of the synchronization processing performed in the flowchart of FIG. 27. FIG. 29 is a chart showing processing between apparatuses in the flowchart of FIGS. 26 and 27.

Processing extending until registration of data to be used off-line by the user on the thin client terminal 101*a* will be described referring to FIG. 25. Here, processing steps common to ones shown in FIG. 12 will be given the same step numbers respectively, and their description will be omitted or simplified.

The step S1201 is similar to the step S1201 in the first embodiment, and its description is omitted. Next, receiving an instruction from the user through the input device 211, the thin client terminal 101*a* uses the remote control program 102 to request a remote computer 104 to activate the registration acquisition management program 2301 (S2502).

Receiving the request, the remote computer 104 activates the registration acquisition management program 2301. Further, the registration acquisition management program 2301 sends information for displaying, as a user interface, the data registration acquisition interface screen 1301 shown in FIG. 13 to the thin client terminal 101*a* (S2503).

The thin client terminal 101*a* displays the data registration acquisition interface screen 1301 on the display device 210. This data registration acquisition interface screen 1301 is similar to the one in the first embodiment, and its description is omitted.

Next, for registering data to be used off-line, the thin client terminal 101*a* receives, through the input device 211, an operation on the data addition button 1309 in the column of the application software corresponding to the data on the data registration acquisition interface screen 1301. The thin client terminal 101*a* sends the addition instruction given by the received operation on the data addition button 1309 to the remote computer 104. In response, the registration acquisition management program 2301 sends, as a user interface, the data addition interface screen shown in FIG. 14, to make the screen displayed on the display device 210. This data addition interface screen 1401 is similar to the one in the first embodiment, and its description is omitted.

Then, on this data addition interface screen 1401, the thin client terminal 101*a* receives user's input of information on the data to be used off-line, through the input device 211. Further, the thin client terminal 101*a* receives a push operation on the execution button 1404 on the data addition interface screen 1401 through the input device 211. Receiving the operation, the thin client terminal 101*a* requests the registration acquisition management program 2301 to add the data (S2508).

The remote computer 104 receives the information inputted in the thin client terminal 101*a*. Receiving the information, the registration acquisition management program 2301 checks whether the data whose registration has been requested by the user are illegal data or not, for example by checking for viruses (S2510). When the data is judged to be illegal data, the data addition is aborted and the processing is ended (S2511).

When the data are not illegal, the data whose registration has been requested are stored in the user data area 409. As the data, the data encrypted using the password inputted by the user on the data addition interface screen 1401 are stored in addition to the unencrypted data. Further, the application software concerned is added to the user application software table 413, and the data in question are added to the user data table 414 (S2512). Detailed processing of data addition is similar to the processing in the first embodiment, and its description is omitted.

Then, the registration acquisition management program 2301 sends the designated application software added to the user application software table 413, the registered data added to the user data table 414, and the unencrypted data stored in the user data area 409 to each of the remote computers 104 of the approvers described in the approver user ID list 602 (S2513).

Then, the registration acquisition management program 2301 of each of the remote computers 104 of the approvers adds the designated application software to the approval-pending application software table 415 and the data whose registration has been requested to the approval-pending data table 416, and stores the received unencrypted data into the user data storage area 409 (S2514). Details of the addition of the application software and data to the approval-pending application software table 415 and the approval-pending data table 416 are similar to those in the first embodiment, and their description is omitted.

Then, the registration acquisition management program 2301 sends an E-mail requesting approval to each of the approvers described in the approver user ID list 602 (S2515).

The registration acquisition management program 2301 sends information on the registration result of the data to be used off-line to the thin client terminal 1101*a* (S2516). The thin client terminal 101*a* displays the information on the display device 210 (S2517).

Thus, according to the procedure shown in the flowchart of FIG. 25, the thin client terminal 101*a* can register the data to be used off-line, following the instruction of the user.

As shown in FIG. 25, the processing differs from the first embodiment in that the registration acquisition management program 2301 of the remote computer 104, rather than the management server 107, provides the user interface (S2503), that the registration acquisition management program 2301 makes the check of illegal file data, registers the data, and sends the E-mail to each approver (S2510-S2516), and that the data used for approval are sent to the remote computer 104 of each approver (S2514).

Processing extending until an approver approves the application software and data for which the user has requested approval will be described referring to FIG. 26. Processing steps common to the ones shown in FIGS. 15 and 25 are given the same step numbers respectively, and descriptions thereof are omitted or simplified.

The step S1201 is similar to the step S1201 in the first embodiment, and its description is omitted. Next, receiving an instruction from the user through the input device 211, the thin client terminal 101*b* uses the remote control program 102 to request a remote computer 104 to activate the registration acquisition management program 2301 (S2502).

Receiving the request, the remote computer 104 activates the registration acquisition management program 2301. Further, the registration acquisition management program 2301 sends information for displaying, as a user interface, the data registration acquisition interface screen 1301 shown in FIG. 13 to the thin client terminal 101*b* (S2503).

The thin client terminal 101*b* displays the data registration acquisition interface screen 1301 on the display device 210. The data registration acquisition interface screen 1301 is similar to the user interface screen shown in FIG. 13, and includes also information and buttons used by the approver as a user. This data registration acquisition interface screen 1301 is similar to the one in the first embodiment, and its description is omitted.

Next, the thin client terminal 101*b* receives an approver's push operation on the permission/rejection button 1307 on the data registration acquisition interface screen 1301 through the input device 211. The thin client terminal 101*b* sends a permission/rejection instruction given by the received operation on the permission/rejection button 1307 to the remote computer 104. Receiving the instruction, the registration acquisition management program 2301 sends, as a user interface, the permission/rejection interface screen 1701 shown in FIG. 17 to the client terminal 101*b*, to make the interface screen 1701 displayed on the display device 210. This permission/rejection interface screen 1701 is similar to the one in the first embodiment, and its description is omitted.

Then, the thin client terminal 101*b* receives the approver's operation for selecting permitted or rejected application software and data on the permission/rejection interface screen 1701 through the input device 211. Further, the thin client terminal 101*b* receives a push operation on the permission execution button 1706 or the rejection execution button 1707 on the permission/rejection interface screen 1701 through the input device 211. Receiving the operation, the thin client terminal 101*b* requests the registration acquisition management program 2301 to permit or reject the application software and data in question (S2604).

The remote computer 104 receives the information inputted in the thin client terminal 101*b*. Further, the registration acquisition management program 2301 sends the result of approver's permission or rejection of the application software and data for which the approver has requested approval to the remote computer 104 of the user who is the applicant for approval (S2605).

The registration acquisition management program 2301 of the remote computer 104 of the applicant for approval registers the received result to the user application software table 413 and the user data table 414. Details are similar to that in the first embodiment, and the description is omitted (S2606).

Then, the registration acquisition management program 2301 sends the result of the approver's permission or rejection to the remote computers 104 of approvers other than the approver who is using the remote computer 104 of the registration acquisition management program 2301 itself, among the approvers described in the approver user ID list 602 (S2607).

Then, for each piece of the application software and data that are objects for approval, the registration acquisition management program 2301 of each remote computer 104 that has received the result, deletes the row of the application software or data that have been subjected to the approval processing, from the approval-pending application software table 415 or the approval-pending data table 416 of each approver described in the approver user ID list 1005, in the case of application software, or the approver user ID list 1105, in the case of data (S2608).

Further, for each piece of the application software and data that are objects for approval, the registration acquisition management program 2301 deletes the row of the application software or data that has been subjected to the approval processing, from the approval-pending application software table 415 or the approval-pending data table 416 of each approver described in the approver user ID list 1005, in the case of application software, or the approver user ID list 1105, in the case of data (S2609).

Then, the registration acquisition management program sends the approval result to the user who is the applicant for approval, by E-mail (S2610).

The registration acquisition management program 2301 sends information on the above approval result to the thin client terminal 101*b* (S2611). The thin client terminal 101*b* displays the information on the display device 210 (S2612).

Thus, according to the procedure shown in the flowchart of FIG. 26, the thin client terminal 101*b* can permit or reject the user's application for approval, after receiving an instruction of the user.

As shown in FIG. 26, the processing differs from the first embodiment in that the registration acquisition management program 2301 of the remote computer 104, rather than the management server 107, provides the user interface (S2503), that the registration acquisition management program 2301 performs the permission/rejection processing up to the sending of the E-mail to the user who is the applicant for approval (S2605-S2611), and that the approval result is reflected on the remote computer of the user who has requested approval and the remote computers of the other approvers (S2606, S2608).

Next, processing for sending the application software and data used off-line on a thin client terminal, from the remote computer 104 to the storage medium 110, until data generated off-line on the thin client terminal is uploaded from the storage medium 110 to the remote computer, will be described referring to FIG. 27. Here, processing steps common to those shown in FIG. 18 are give the same step numbers respectively, and their description is omitted or simplified.

Steps S1801-S1803 are similar to Steps S1801-S1803 in the first embodiment, and their description is omitted. In the thin client terminal 101*a*, the off-line execution program 103 makes the display device 210 display, as a user interface, the off-line execution interface screen 1901 shown in FIG. 19. The off-line execution interface screen 1901 is similar to the one in the first embodiment, and its description is omitted.

Further, the thin client terminal 101*a* performs processing for sending the application software and data to be used off-line from the remote computer 104 to the storage medium 110, and uploading data generated off-line on the thin client terminal 101*a* from the storage medium 110 to the remote computer 104. To this end, a push operation on the synchronization button 1906 displayed on the off-line execution interface screen 1901 is received through the input device 211, and a window for logging in to the registration acquisition management program 2301 through the network 109 is displayed (S2704). Receiving input of a user ID and a password through the input device 211, the off-line execution program 103 uses the user ID and password to connect and log in to the registration acquisition management program 2301 (S2705).

Then, the off-line execution program 103 sends, to the registration acquisition management program 2301, the file size and remaining capacity of the storage medium 110, the application software table 412, the user application software table 413 and the user data table 414 on the storage medium 110, the log data of the log data area 410, and data whose sending statuses are "un-uploaded" in the user data table 414 among the data in the user data area 409 (S2706).

The registration acquisition management program 2301 performs processing of synchronization of the received user application software table 413 and user data table 414 with the user application software table 413 and the user data table 414 on the remote computer 104 (S2707).

FIG. 28 is a flowchart showing details of the synchronization processing performed in the flowchart of FIG. 27. First, in the synchronization processing, with respect to each piece of application software whose sending status 804 is "erased" in the user application software table 413 sent from the storage medium 110, the sending status 804 in the user application software table 413 on the remote computer 104 is changed to "erased" (S2801).

Next, with respect to each piece of application software for which the sending status 804 in the user application software table 413 sent from the storage medium 110 is "sent" and the version described in the application software version 703 of the application software table 412 sent from the storage medium 110 is older than the version described in the application software version 703 of the application software table 412 on the remote computer 104, the relevant application program in the application program area 408 is sent to the storage medium 110 (S2802)

Further, with respect to each piece of application software for which the approval status 803 is "permitted", the sending status 804 is "unsent" and the license period 805 has not elapsed in the user application software table 413 on the remote computer 104, the application program in question in the application program area 408 is sent to the storage medium 110, and the sending status 804 in the user application software table 413 on the remote computer 104 is changed to "sent" (S2803).

Then, with respect to data for which the sending status 904 in the user data table 414 sent from the storage medium 110 is "erased", the unencrypted data in the user data area 409 on the remote computer 104 are moved to the log data area 410, the encrypted data in the user data area 409 are erased, and the data row concerned is deleted from the user table 414 on the remote computer 104 (S2804).

Further, with respect to data for which the sending status 904 in the user data table 414 sent from the storage medium 110 is "un-uploaded", the data in question are acquired from the storage medium 110 and stored into the user data area 409 on the remote computer 104, and the sending status 904 in the user data table 414 on the remote computer 104 is changed to "sent" (S2805).

Further, with respect to data for which the approval status 903 is "permitted", the sending status 904 is "unsent", the license period 905 has not elapsed in the user data table 414 on the remote computer 104, and, in addition, the approval status 803 of the application software corresponding to the application software ID 907 is "permitted", and the license period 805 of that application software has not elapsed in the user application software table 413, the data in question are sent to the storage medium 110 and the sending status 904 in the user data table 414 on the remote computer 104 is changed to "sent" (S2806).

Further, the received uploaded data are stored into the user data area 409 on the remote computer 104. Further, the received log data are merged into the log data area 410 on the remote computer 104 (S2707).

Then, the registration acquisition management program 2301 returns the time information of the remote computer 104, the application software table 412 of the remote computer 104, the synchronized user application software table 413, and the synchronized user data table 414, to the off-line execution program 103. Further, as far as the capacity of the storage medium 110 allows judging from the received file size and remaining capacity of the storage medium 110, the registration acquisition management program 2301 returns the permitted and unsent application programs and data to the off-line execution program 103 (S2708). Steps S1809 and S1810 are similar to Steps S1809 and S1810 in the first embodiment, and their description is omitted.

Thus, according to the procedure shown in the flowchart of FIG. 27, the thin client terminal 101a can store the application program, data and the like, to be used off-line, into the storage medium 110, following the instruction of the user.

The processing differs from the first embodiment in that the off-line execution program 103 connects to the registration acquisition management program 2301 (S2704, S2705), and that the synchronization processing is performed by the registration acquisition management program 2301 (S2707-S2708). Further, in the synchronization processing, the data of the storage medium 110 are compared not with the data of the management server 107 but with the data of the remote computer 104.

The processing of using the application software and data off-line on the thin client terminal 101a is similar to the processing in the first embodiment, and its description is omitted.

FIG. 29 is a chart showing processing between the user, the approver, the programs and the storage medium in a series of flowcharts covering registration of data, approval by the approver, and storing into the storage medium. Difference from the first embodiment lies in that the processing by the management server 107 does not exist and the registration acquisition management program 2301 on the remote computer 104 performs the processing.

Hereinabove, the second embodiment has been described. According to the second embodiment, a thin client terminal as a component of a thin client system can be used off-line in a state in which information leakage does not easily occur, without providing a management server. Further, it is possible to handle the minimum necessary data by arranging the system such that off-line execution of the designated application software and the designated data requires approval. This improves safety from information leakage.

In the second embodiment, a thin client terminal performs the processing of approval. However, an ordinary PC may be used for performing the approval processing.

Now, a third embodiment will be described referring to FIGS. 5, 30, 35, 36, 37, 40 and 41. In the following, different points from the first and second embodiments will mainly be described.

Figure 30:
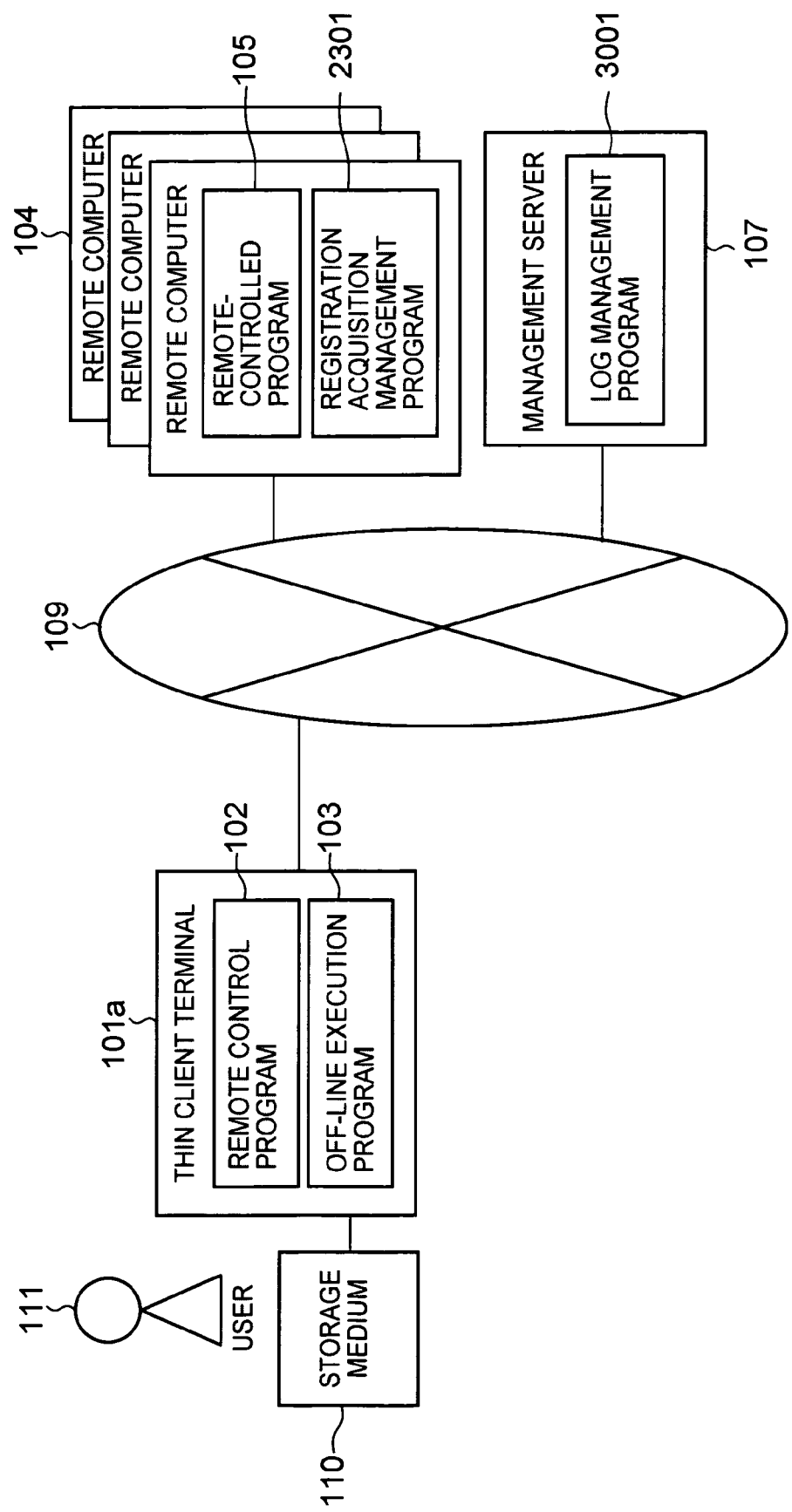
FIG. 30 is a block diagram showing a general configuration of a system according to a third embodiment.

As shown in FIG. 30, a system configuration of the third embodiment has a server for managing a log, in addition to the system configuration shown in FIG. 23. That is, the system comprises one or more thin client terminals 101a, 101b, one or more remote computers 104, and a management server 107. Further, the arrangement of the third embodiment does not require the approval processing in the second embodiment.

A functional configuration of each thin client terminal 101 is similar to the one (FIG. 37) in the second embodiment, and its description is omitted.

Also, a functional configuration of each remote computer 104 is similar to the one (FIG. 40) in the second embodiment, and its description is omitted.

Figure 41:
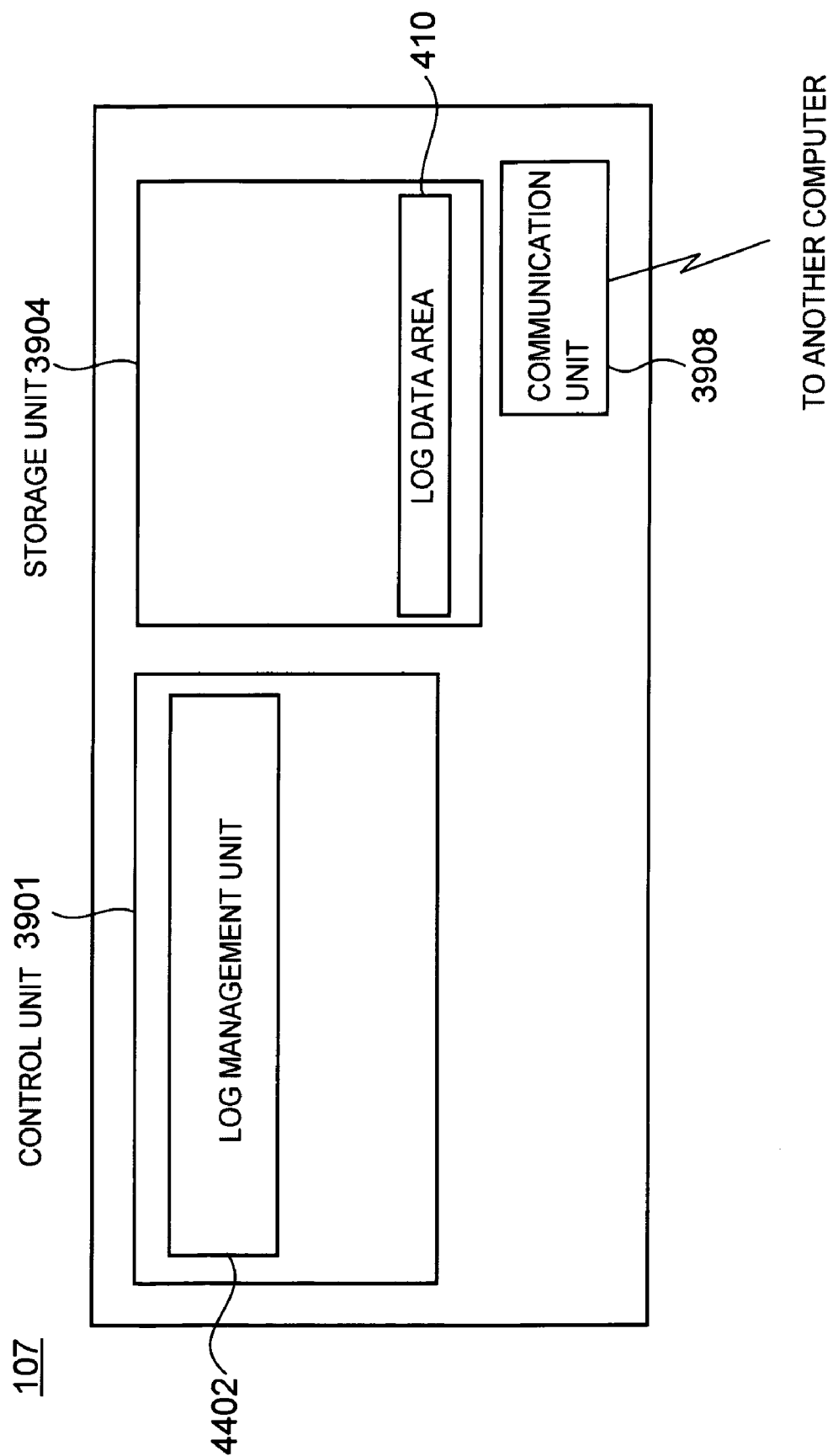
FIG. 41 is a block diagram showing a functional configuration of the management server according to the third embodiment.

The management server 107 will be described referring to FIGS. 37, 40 and 41.

The management server 107 comprises a control unit 3901, a storage unit 3904 and a communication unit 3908.

On the control unit 3901, a log management unit 4402 is implemented. The log management unit 4402 is stored beforehand as a program in a storage device 402 (see FIG. 4) on the management server 107, for example, and read by a processor 404 onto a memory 401 and executed. This program can be installed from the outside. For example, this program is installed through a storage medium or a network. The storage unit 3904 is implemented, for example, by the storage device 402 for storing data and the like continuously, and by the memory 401 for storing data and the like temporarily. The communication unit 3908 is implemented, for example, by communication hardware 405 such as a network interface.

The storage unit 3904 has a log data area 410. The log data area 410 stores a log and the like of a thin client terminal 101.

The log management unit 4402 stores log data received from a remote computer 104 into the log data area 410.

A configuration of a storage medium 110 is similar to the one (FIG. 5) in the second embodiment, and its description is omitted.

Next, operation of a thin client system to which an application software and data management system is applied will be described referring to FIGS. 5, 35, 36, 37, 40 and 41.

With respect to processing extending until data to be used off-line by a user on a thin client terminal 101, points different from the second embodiment will be described referring to FIGS. 35 (S3501), 37, 40 and 41.

The registration acquisition management unit 4203 stores information that includes the data whose registration has been requested in the registration information, the received registration information, information specifying the designated data and application software, and statuses of the designated data and application software, into its own storage device, and sends the registration information stored in the management data area 3940 and the data stored in the user data area 409 to the management server 107.

The log management unit 4402 on the management server 107 receives the registration information and the data, and stores them as log data into the log data area 410.

Thus, the thin client terminal 101a can register the data to be used off-line, following an instruction of the user. Further, the management server 107 can collect logs.

Next, with respect to processing for sending the application software and data to be used off-line on the thin client terminal 101 from the remote computer 104, to the storage medium 110, until data generated off-line on the thin client terminal 101 is uploaded from the storage medium 110 to the remote computer 104, points that differ from the second embodiment will be described referring to FIGS. 5, 35 (S3503), 37, 40 and 41.

The registration acquisition management unit 4203 performs synchronization processing based on the registration information sent from the off-line execution unit 3703. The synchronization processing is similar to the processing in the second embodiment, and its description is omitted. After performing the synchronization processing, the registration acquisition management unit 4203 sends the log data stored in the log data area 410 to the management server 107.

The log management unit 4402 on the management server 107 stores the received log data into the log data area 410.

Thus, the management server 107 can collect logs.

Processing of performing off-line execution on the thin client terminal 101 using the data and application software stored in the storage medium 110 is similar to the processing in the second embodiment, and its description is omitted.

In the following, the third embodiment will be described in greater detail referring to FIGS. 30-35.

FIG. 30 is a system configuration diagram of the application software and data management system according to the third embodiment. The system configuration differs from the one in the second embodiment in that the management server 107 having a log management program 3001 exists.

Each thin client terminal has an internal configuration as shown in FIG. 2 similarly to the first and second embodiments.

Figure 31:
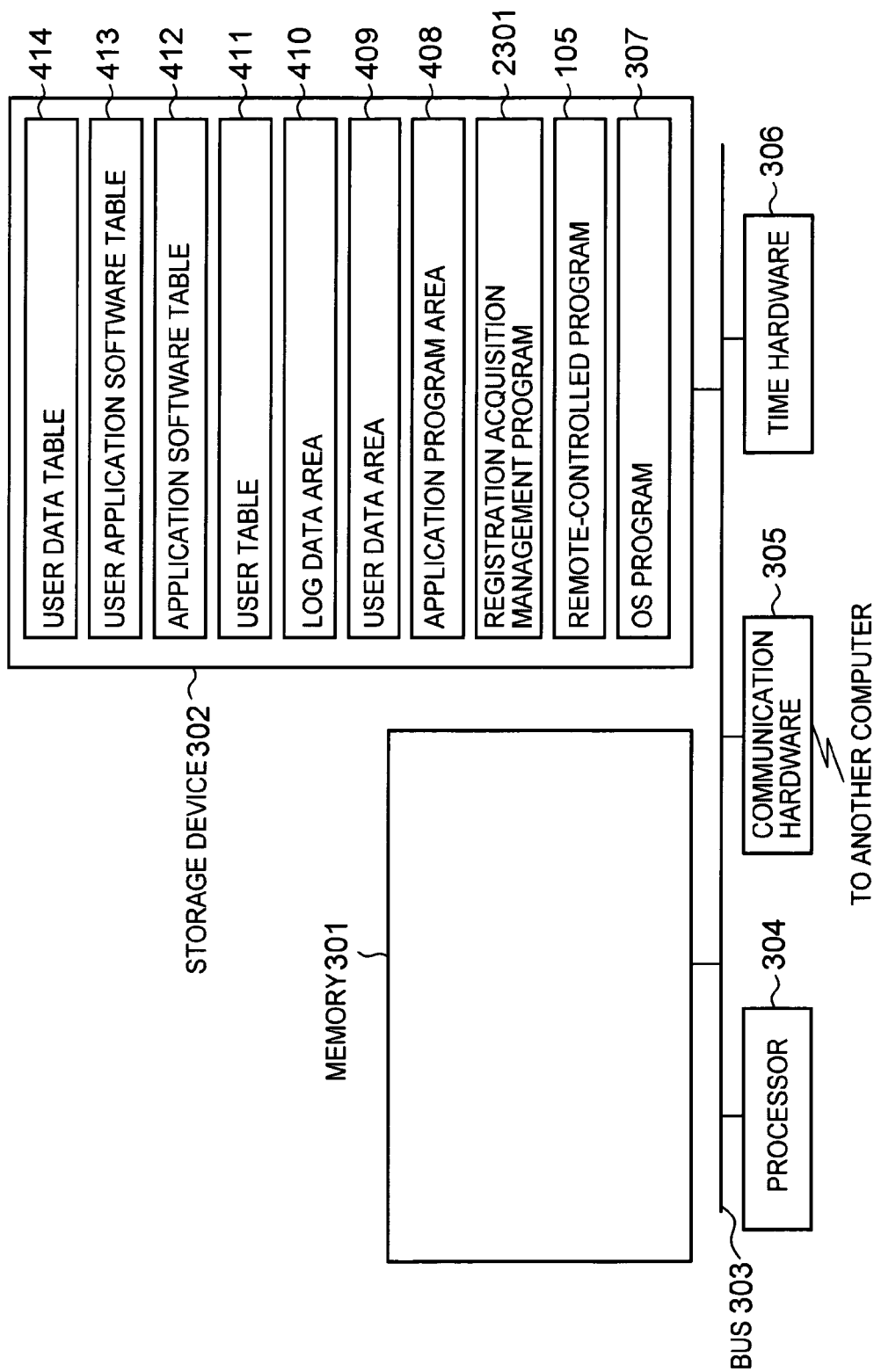
FIG. 31 a block diagram showing an internal configuration of a remote computer according to the third embodiment.

Each remote computer 104 has an internal configuration as shown in FIG. 31. This internal configuration is different from the one in the second embodiment in that the approval-pending application software table 415 and the approval-pending data table 416 on the storage device 302 are not required.

Figure 32:
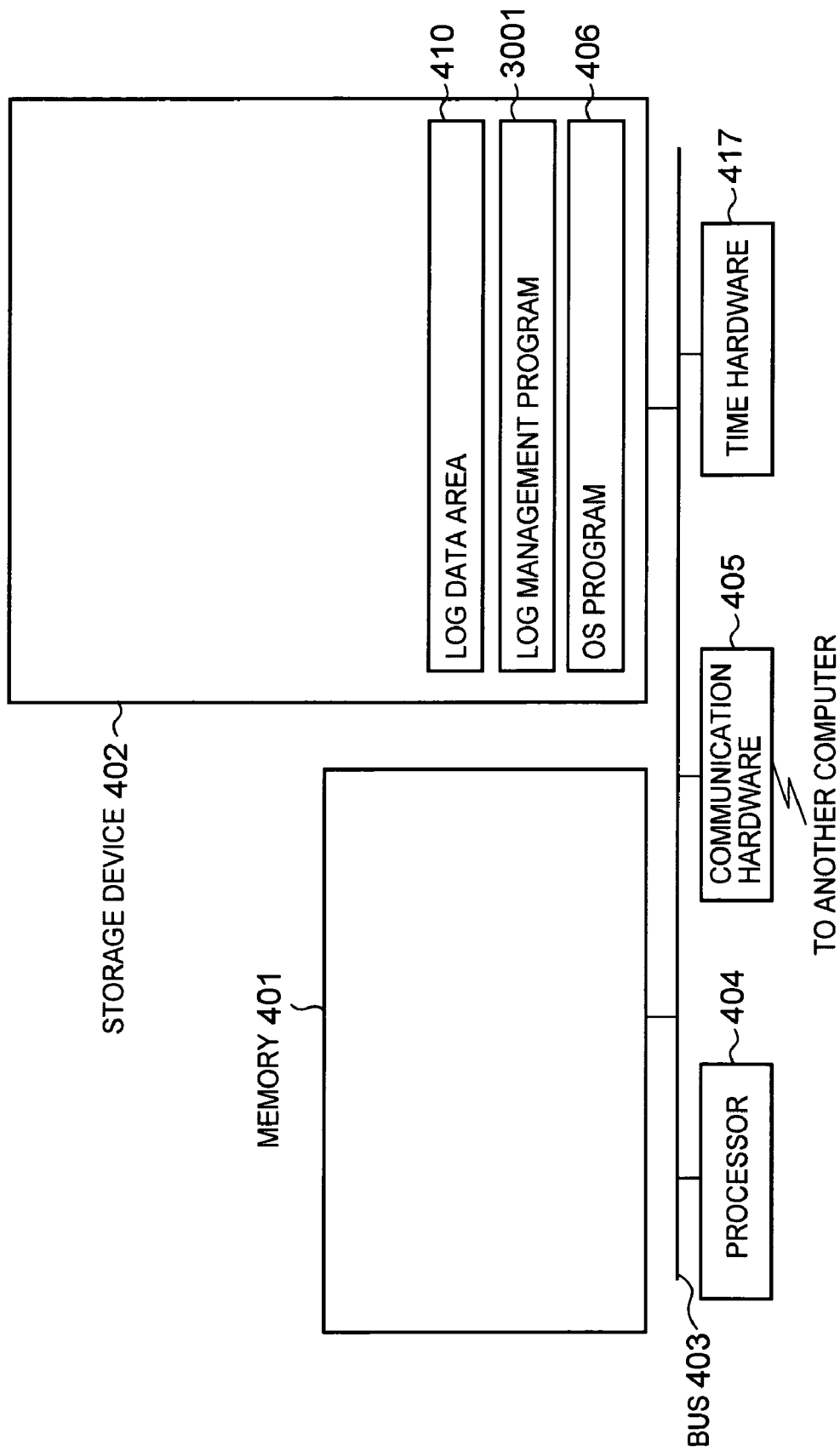
FIG. 32 is a block diagram showing an internal configuration of a management server according to the third embodiment.

The management server 107 has an internal configuration as shown in FIG. 32. This internal configuration is different from the one in the first embodiment in that the log management program 3001 and a log data area 410 are provided instead of various programs and data of the storage device 302.

Each storage medium 110 has an internal configuration as shown in FIG. 5, similar to the first and second embodiments.

Figure 33:
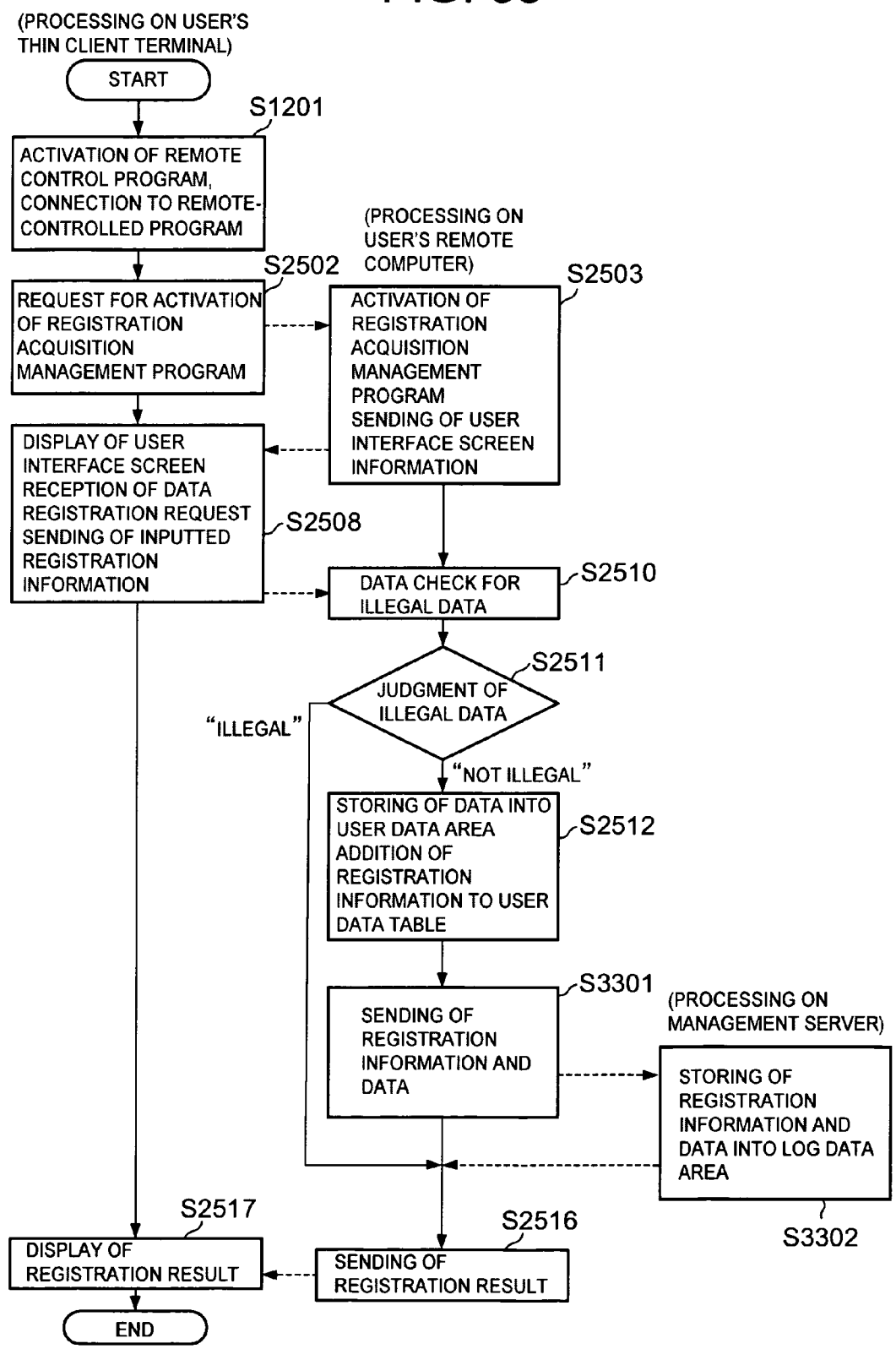
FIG. 33 is a flowchart showing flow of processing extending until data to be used by a user on a thin client terminal in an off-line state are registered at the remote computer, according to the third embodiment.
Figure 34:
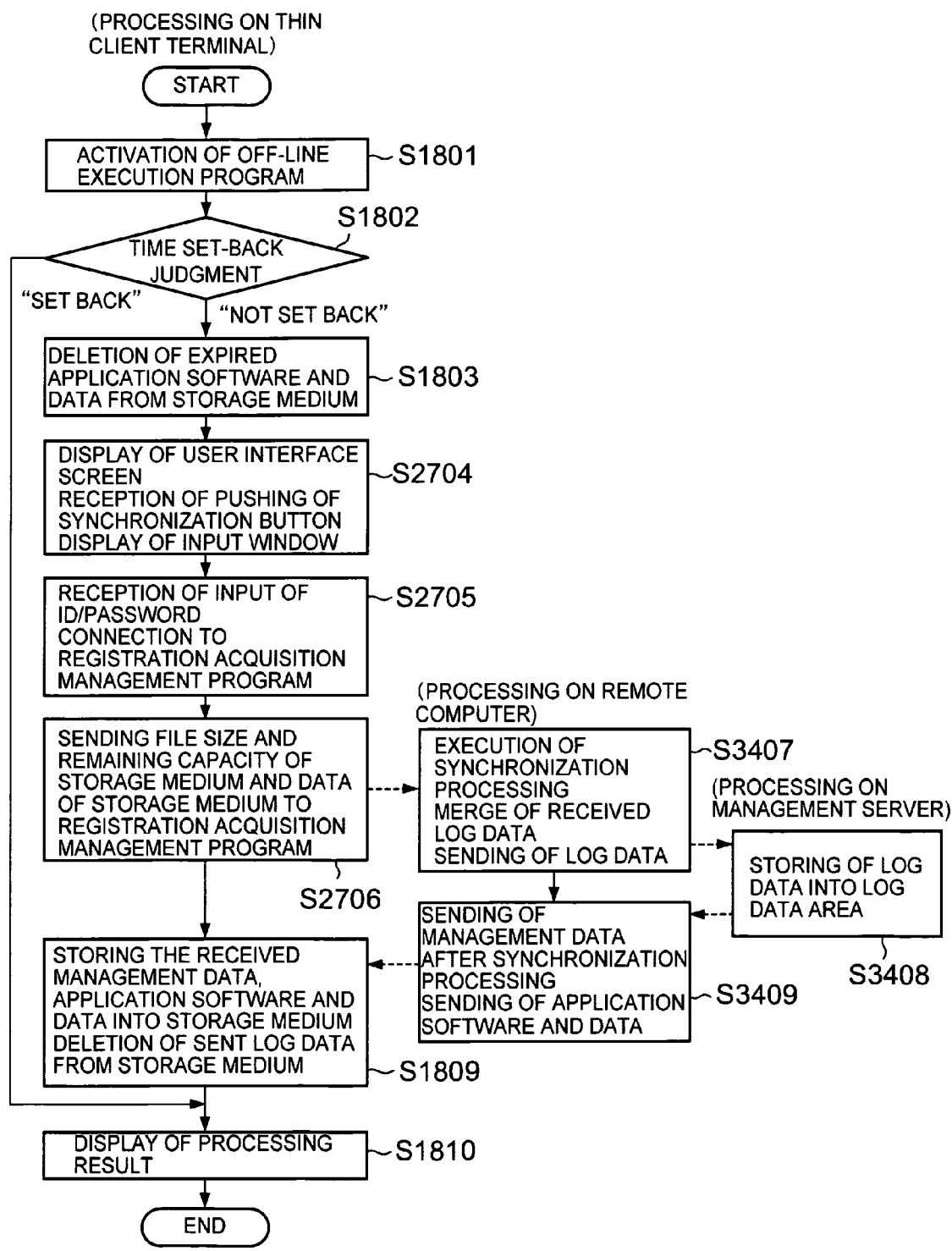
FIG. 34 is a flowchart showing flow of processing for sending application software and data to be used on a thin client terminal in an off-line state from a remote computer to the storage medium, up to upload of data generated on the thin client terminal in the off-line state from the storage medium to the remote computer, according to the third embodiment.

Next, processing in the application software and data management system according to the third embodiment will be described referring to FIGS. 33-35. FIG. 33 is a flowchart showing processing extending until registration of data to be used off-line by a user on a thin client terminal at a remote computer 104. FIG. 34 is a flowchart showing processing for sending an application and data used off-line on a thin client terminal, from a remote computer 104 to the storage medium 110, until data generated off-line on the thin client terminal are uploaded from the storage medium 110 to the remote computer 104. FIG. 35 is a chart showing processing between apparatuses in the flowcharts of FIGS. 33 and 34.

Processing extending until data to be used off-line by a user on a thin client terminal 101a is registered will be described referring to FIG. 33. Here, processing steps common to those shown in FIGS. 12 and 25 are given the same step numbers respectively, and their description will be omitted or simplified.

Steps S1201, S2502-S2512 are similar to Steps S1201, S2502-S2512 in the second embodiment, and their description is omitted. Thereafter, the registration acquisition management program 2301 sends the registration data added to the user data table 414 and the unencrypted data stored in the user data area 409, to the management server 107 (S3301).

The log management program 3001 on the management server 107 stores the received registration data and the unencrypted data into the log data area 410 (S3302).

The registration acquisition management program 2301 sends information on the registration result of the data to be used off-line to the thin client terminal 101a (S2516). The step S2517 is similar to the step S2517 in the second embodiment, and its description is omitted.

Thus, according to the procedure shown in the flowchart shown in FIG. 33, the thin client terminal 101a can register the data to be used off-line, following the instruction of the user. Further, the management server 107 can collect logs.

As shown in FIG. 33, the processing is different from the processing in the second embodiment in that the approval processing is not performed and a log is stored in the management server (S3301-S3302).

Next, processing for sending the application software and data used off-line on the thin client terminal, from the remote computer 104 to the storage medium 110, until data generated off-line on the thin client terminal are uploaded from the storage medium 110 to the remote computer 104, will be described referring to FIG. 34. Here, processing steps common to those shown in FIGS. 18 and 27 are given the same step numbers respectively, and their description is omitted or simplified.

Steps S1801-S2706 are similar to Steps S1801-S2706 in the second embodiment, and their description is omitted. The registration acquisition management program 2301 performs processing of synchronization of the received user application software table 413 and the received user data table 414 with the user application software table 413 and the user data table 414 on the remote computer 104. Further, the received uploaded data are stored into the user data area 409 on the remote computer 104. The received log data are merged into the log data area 410 on the remote computer 104. Then the log data in question are sent to the management server 107 (S3407).

The log management program 3001 on the management server 107 stores the received log data into the log data area 410 (S3408).

Then, the registration acquisition management program 2301 returns the time information of the remote computer 104, the application software table 412 of the management server 107, the synchronized user application software table 413, and the synchronized user data table 414 to the off-line execution program 103. Further, as far as the capacity of the storage medium 110 allows judging from the received file size and remaining capacity of the storage medium 110, the registration acquisition management program 2301 returns the unsent application programs and data to the off-line execution program 103. (S3409). Steps S1809 and S1810 are similar to Steps S1809 and S1810 in the second embodiment, and their description is omitted.

Thus, according to the procedure shown in the flowchart of FIG. 34, the user can store the application program, the data and the like to be used off-line on the thin client terminal 101*a*, into the storage medium 110. The thin client terminal 101*a* becomes able to store the application program, the data, and the like used off-line, into the storage medium, under the condition that the log has certainly delivered to the management server 107.

The third embodiment differs from the second embodiment in that the log data are sent to the management server and registered, and the registered application program, data, and the like are sent to the thin client terminal, since the approval processing does not exist (S3407-S3409).

Processing of using the application software and data off-line on the thin client terminal 101*a* is similar to the processing in the first embodiment, and its description is omitted.

Figure 35:
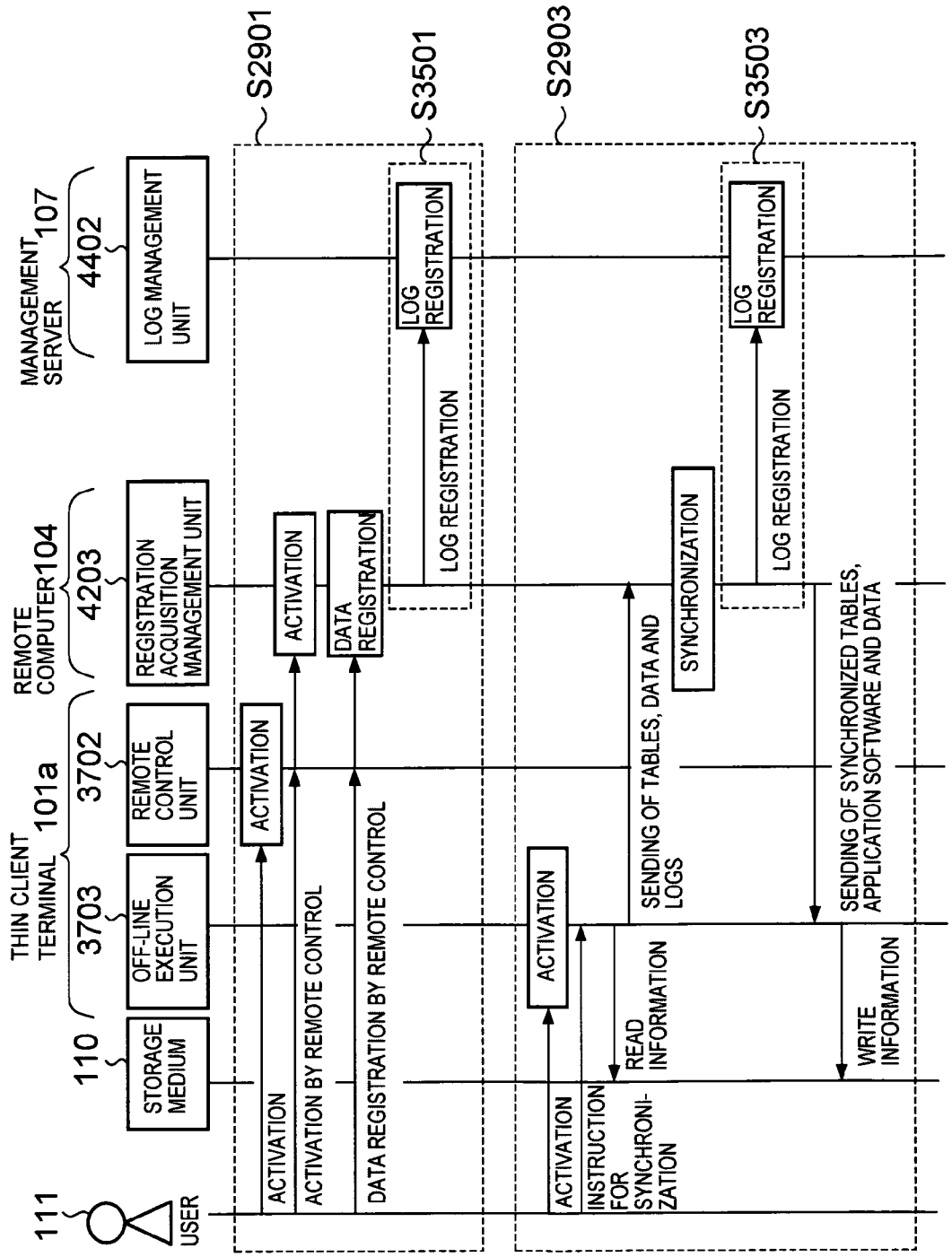
FIG. 35 is an explanatory chart showing processing between apparatuses in the flowcharts of FIGS. 33 and 34.

FIG. 35 is a chart showing processing between the user, the programs and the storage medium in a series of flowcharts covering registration of data, until storing into the storage medium. The processing differs from the processing in the second embodiment in that the approval processing does not exist and the log data are stored into the management server.

Hereinabove, the third embodiment of the present invention has been described. According to the third embodiment, a thin client terminal as a component of a thin client system can be used off-line in a state in which information leakage does not easily occur, without providing a management server. Further, since the log management server is provided, it is possible to perform log management of a thin client terminal and to improve safety from information leakage.

Thus, the first, second and third embodiments have been described. Structure of data held in each embodiment has been shown in the form of a table. However, the present invention is not limited to this. Further, a password is used for authentication at the time of log-in and for encrypting/decoding data. However, authentication information and the authentication method are not limited to this. For example, biometrics or an electronic certificate may be used.

Further, in the first embodiment, application software is stored beforehand in the application program area 408 on the management server. However, the management server may acquire application software designated by a thin client terminal at the time of data addition, from a remote computer used by the thin client terminal in question, and then store the acquired application software into the application program area 408.

Hereinabove, the present invention has been described in relation to the illustrative embodiments. Many substitutions, modifications and variations will be clear to persons skilled in the art. Therefore, it is intended that the above-described embodiments of the present invention illustrate but not limit the gist and scope of the invention.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An application software and data management method for using a thin client terminal for information processing in an off-line state, in a thin client system that performs information processing using the thin client terminal connected to a network, the application software and data management method using:

a remote computer that is connected to the network and is controlled remotely by the thin client terminal to perform the information processing;

a management server that is connected to the network and manages data and application software required for using the thin client terminal for the information processing in the off-line state, wherein the management server manages the data and the application software using first management data that includes information specifying the data required for using the thin client terminal for the information processing in the off-line state and information specifying the application software required for using the thin client terminal for the information processing in the off-line state in association with each other; and a storage medium that is connected to the thin client terminal, wherein the storage medium stores the data and the application software required for using the thin client terminal in the off-line state and stores second management data for managing the data that includes information specifying status of data uploading from the storage medium of the thin client terminal to the management server; wherein:

when the management server receives at least one request, from the thin client terminal, for sending information for registration of data to be used in the off-line state and designation of application software for performing processing on the data, then the management server sends, to the thin client terminal, input screen information for sending the information for registration;

when the management server receives, from the thin client terminal that has sent the at least one request for sending information for the registration of the data, information indicating the request for registration of the data and the designation of the application software for performing processing on the data, then the management server acquires the data, whose registration has been requested, from the remote computer, and stores the acquired data into a storage device of the management server itself, and makes the first management data of the storage device to include information specifying the data and information specifying the application software in association with each other;

the management server receives the second management data stored in the storage medium connected to the thin client terminal that has sent the information specifying the application software, refers to the received second management data, and when the management server judges that data generated by the thin client terminal in the off-line state exists in the storage medium connected to the thin client terminal, then the management server acquires the data generated from the storage medium and stores the acquired data into a storage medium of the management server itself;

the management server receives the information indicating the at least one request for the registration of data and the at least one request for the designation of the application software that performs processing of data, and performs judgment processing on whether off-line execution concerning the application software and data processing should be approved; and in cases of approval, the management server sends to the thin client terminal data and the application software whose off-line use has been approved, in reply to the at least one request from the thin client terminal.

2. The application software and data management method of claim 1, wherein:

in the judgment processing, upon receipt of the information indicating the request for the registration of the data and/or the request for the designation of the application software that performs the processing of the data, a request for approval of the off-line execution concerning data and the application software is sent to an address of a person who has authority to approve the off-line execution concerning data and the application software; and when approval information is received from the person to whom the request for approval has been sent, a result of approval is sent to the thin client terminal.

3. The application software and data management method of claim 1, wherein:

the first management data further includes information indicating license periods of the application software and data; and the information indicating the license periods is sent to the thin client terminal together with the application software and data.

4. The application software and data management method of claim 1, wherein:

the first management data further includes information indicating permitted operations concerning the application software and data; and the information indicating the permitted operations is sent to the thin client terminal together with the application software and data.

* * * * *